(12) United States Patent
Nakamura et al.

(10) Patent No.: US 6,501,429 B2
(45) Date of Patent: Dec. 31, 2002

(54) PORTABLE INFORMATION PROCESSING APPARATUS

(75) Inventors: Akiyoshi Nakamura, Suwa (JP); Akira Momose, Suwa (JP); Hidekazu Maezawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/881,426

(22) Filed: Jun. 14, 2001

(65) Prior Publication Data

US 2001/0029588 A1 Oct. 11, 2001

Related U.S. Application Data

(62) Division of application No. 09/402,183, filed as application No. PCT/JP99/00289 on Jan. 22, 1999.

(30) Foreign Application Priority Data

Feb. 2, 1998 (JP) ............................................. 10-21300
Apr. 21, 1998 (JP) ........................................... 10-111070

(51) Int. Cl.⁷ ............................................... H01Q 1/24
(52) U.S. Cl. ............................... 343/702; 343/700 MS
(58) Field of Search ......................... 343/702, 700 MS; 455/90; H01Q 1/24

(56) References Cited

U.S. PATENT DOCUMENTS

| | | | |
|---|---|---|---|
| 5,321,738 A | 6/1994 | Ha | 343/702 |
| 5,513,383 A * | 4/1996 | Tsao | 343/702 |
| 5,557,777 A | 9/1996 | Culbert | 364/280.2 |
| 5,786,789 A | 7/1998 | Janky | 342/357 |
| 5,898,933 A | 4/1999 | Kaschke | 455/90 |
| 5,905,460 A | 5/1999 | Odagiri et al. | 701/213 |
| 5,943,018 A * | 8/1999 | Miller | 343/702 |
| 5,983,119 A | 11/1999 | Martin et al. | 455/90 |
| 5,990,839 A * | 11/1999 | Schefte et al. | 343/702 |
| 5,990,846 A | 11/1999 | Dichter | 343/702 |
| 6,002,943 A | 12/1999 | Irvin et al. | 455/522 |
| 6,009,375 A | 12/1999 | Sakumoto et al. | 701/216 |
| 6,018,704 A | 1/2000 | Kohli et al. | 702/149 |
| 6,043,777 A | 3/2000 | Bergman et al. | 342/357.09 |
| 6,172,645 B1 * | 1/2001 | Hollander et al. | 343/702 |
| 6,259,418 B1 * | 7/2001 | Jones et al. | 343/702 |
| 6,337,666 B1 * | 1/2002 | Bishop | 343/795 |

FOREIGN PATENT DOCUMENTS

| | | |
|---|---|---|
| JP | 4-351981 | 12/1992 |
| JP | 5-143218 | 6/1993 |
| JP | 6-301446 | 10/1994 |
| JP | 7-55910 | 3/1995 |
| JP | 8-147071 | 6/1996 |
| JP | 9-145385 | 6/1997 |
| JP | 9-229711 | 9/1997 |
| JP | 9-311178 | 12/1997 |

* cited by examiner

*Primary Examiner*—Hoanganh Le
(74) *Attorney, Agent, or Firm*—Rosalio Haro

(57) ABSTRACT

The present invention relates to a small portable information processing apparatus. A GPS unit (11, 300) is attachable to and detachable from a rear surface of a portable information terminal (10, 350), so that the GPS unit (11, 300) can be mounted on the rear surface of the portable information terminal (10, 350) to make it serviceable only when necessary, thus improving convenience. Power is supplied to the GPS unit (11, 300, 650) only when an antenna unit (112, 500, 613) is set in a serviceable state. This prevents the exhaustion of a battery.

6 Claims, 38 Drawing Sheets

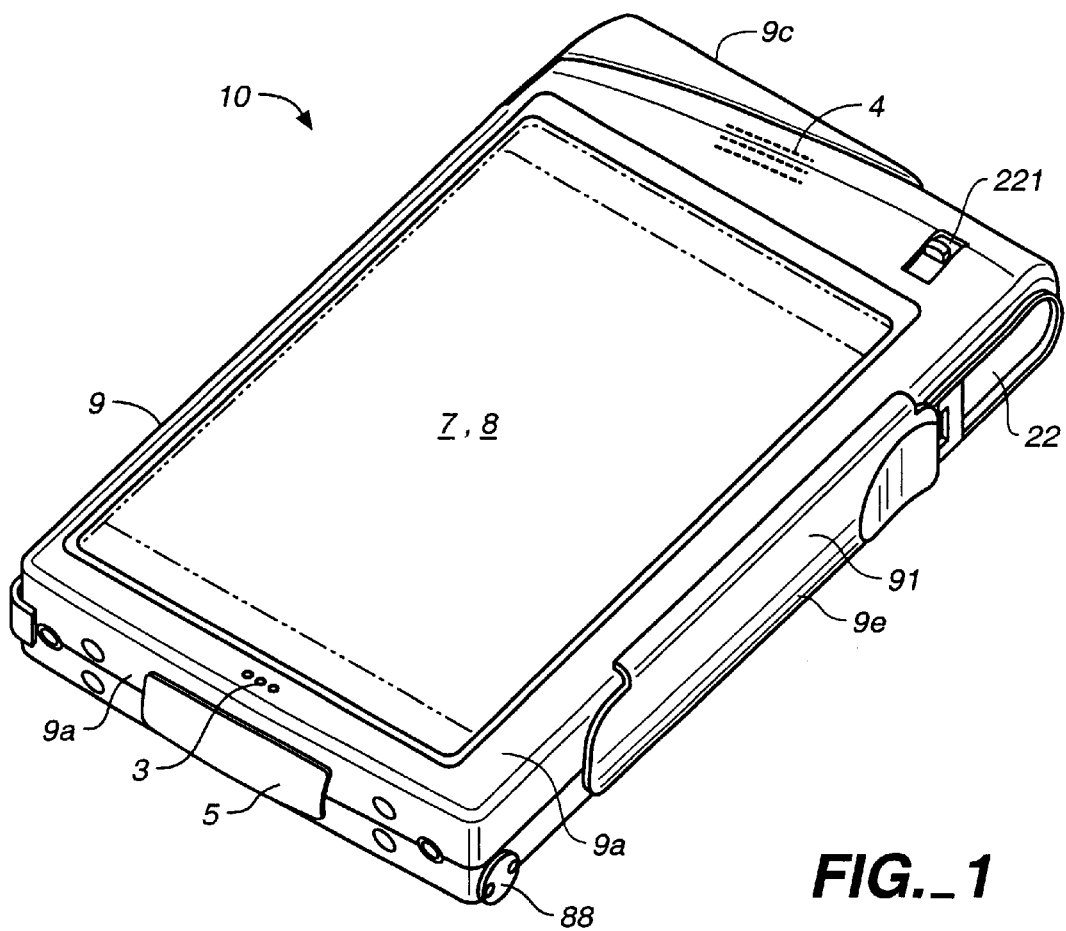
FIG._1

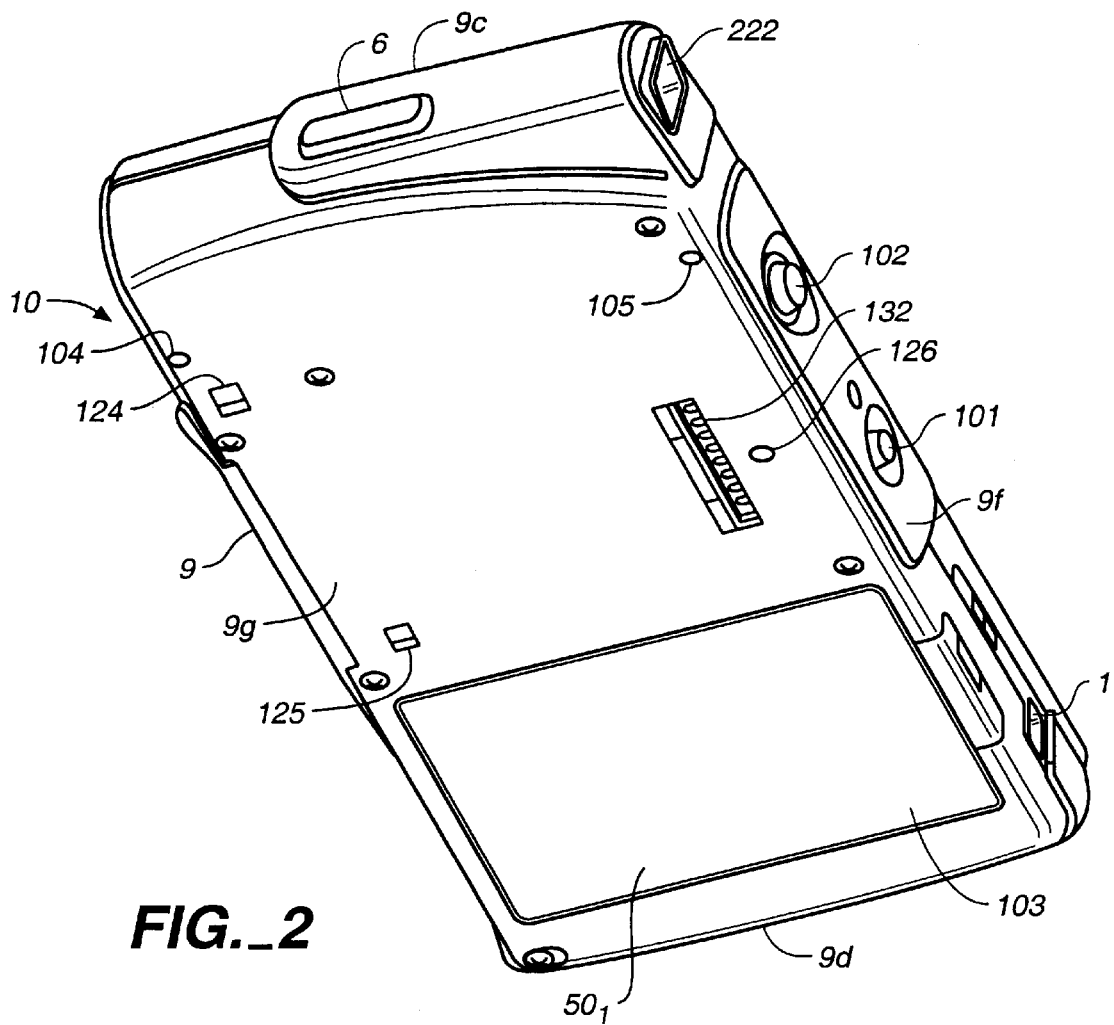
FIG._2

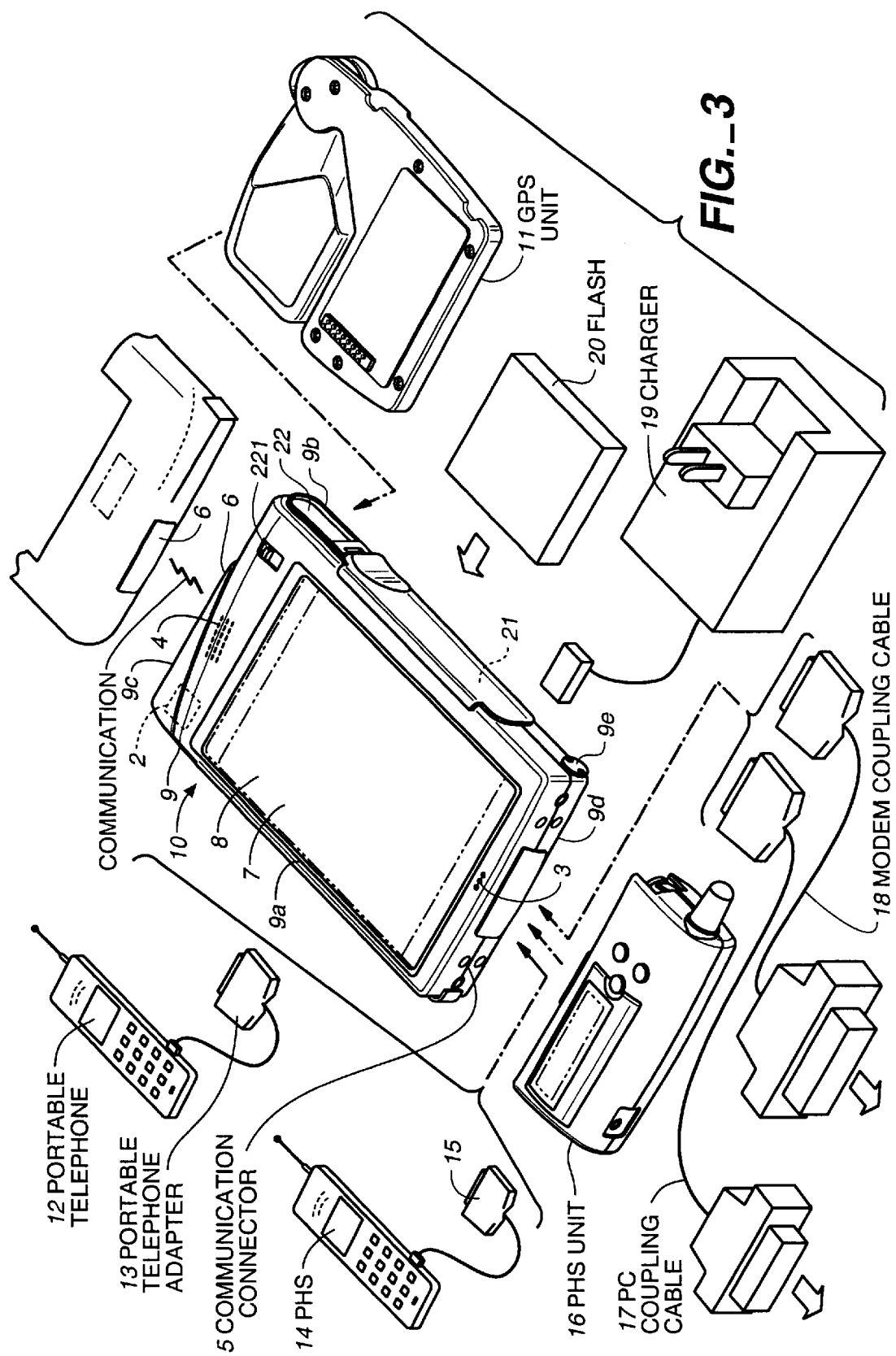

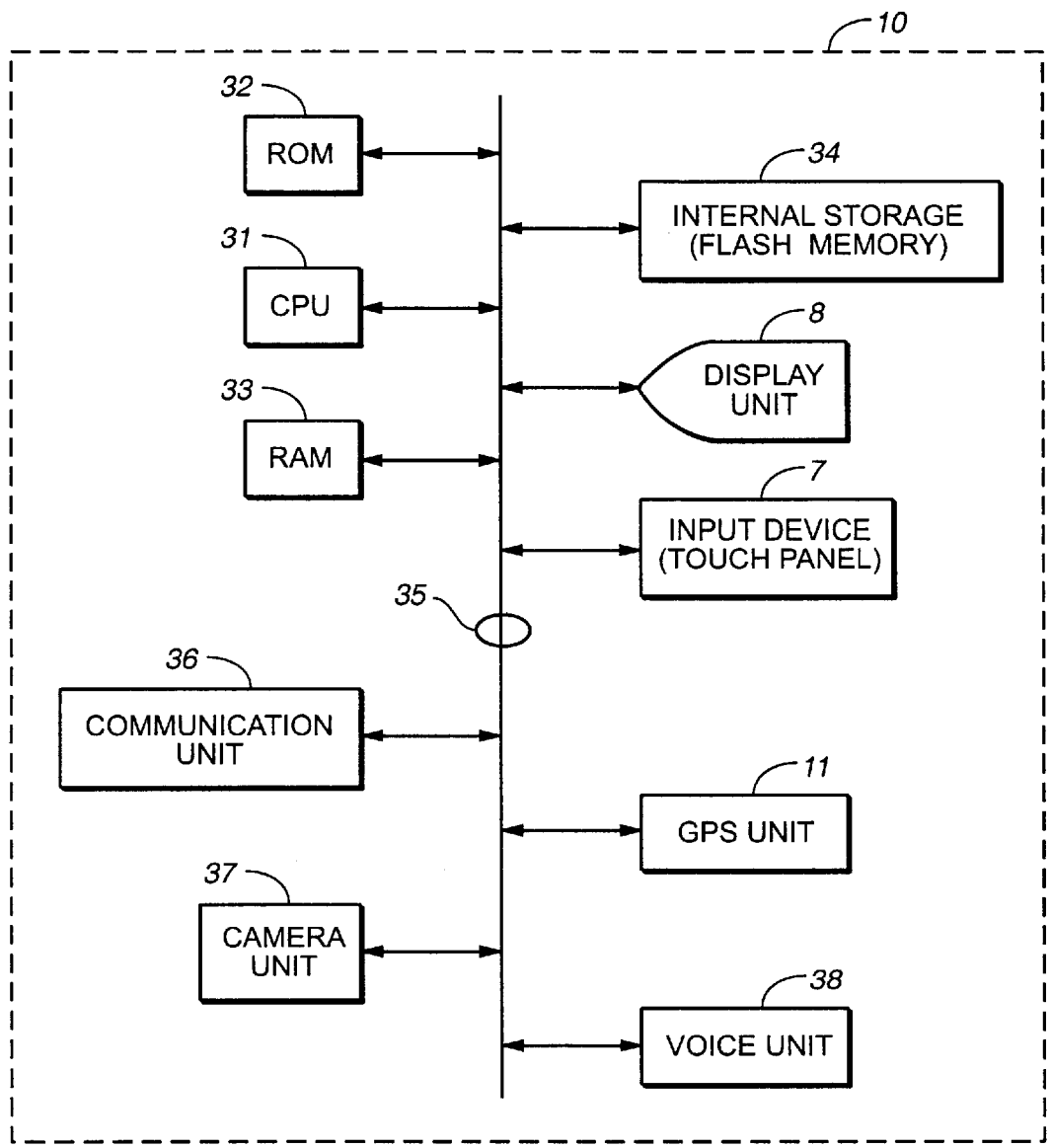
FIG._4

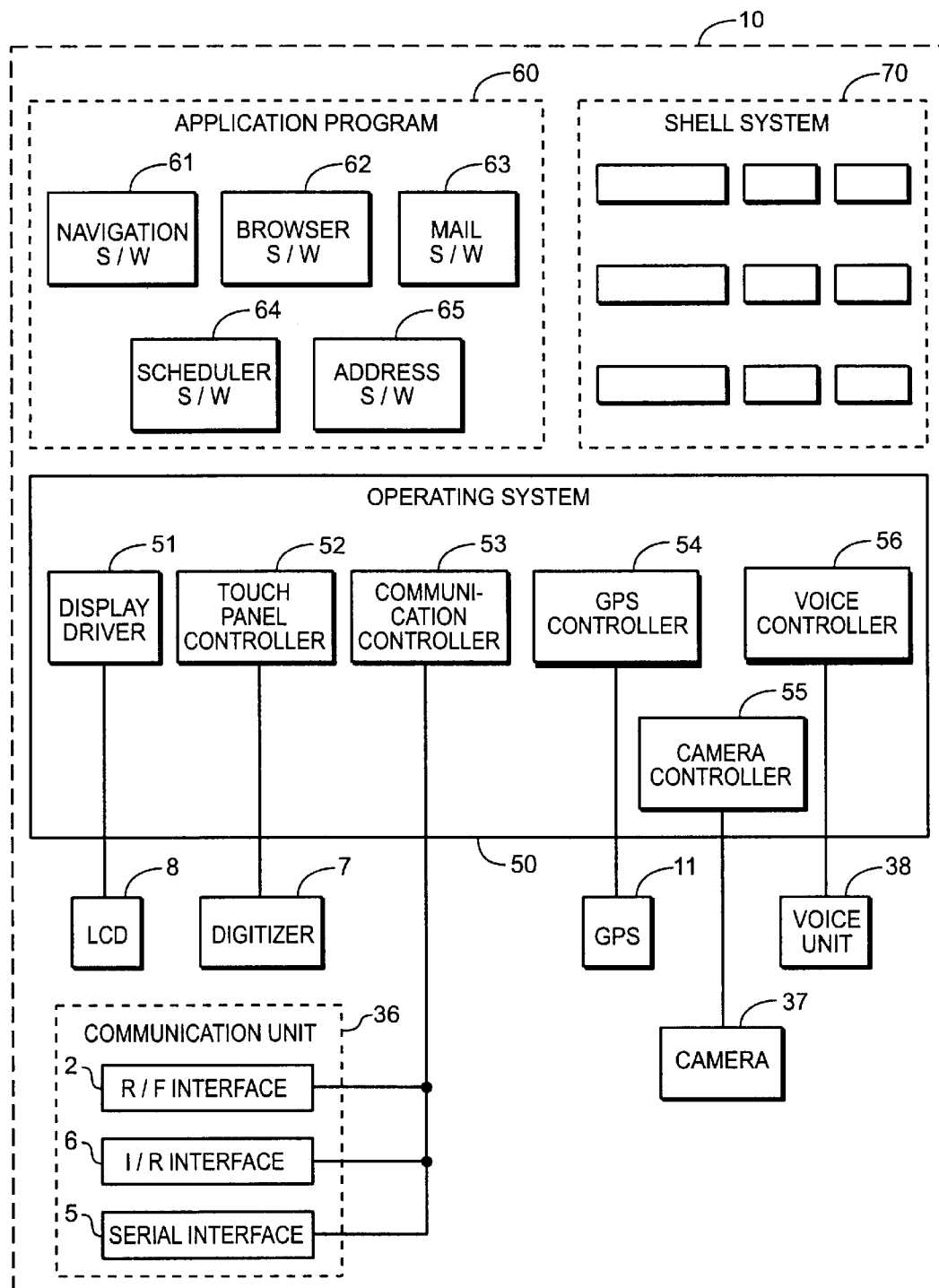
FIG._5

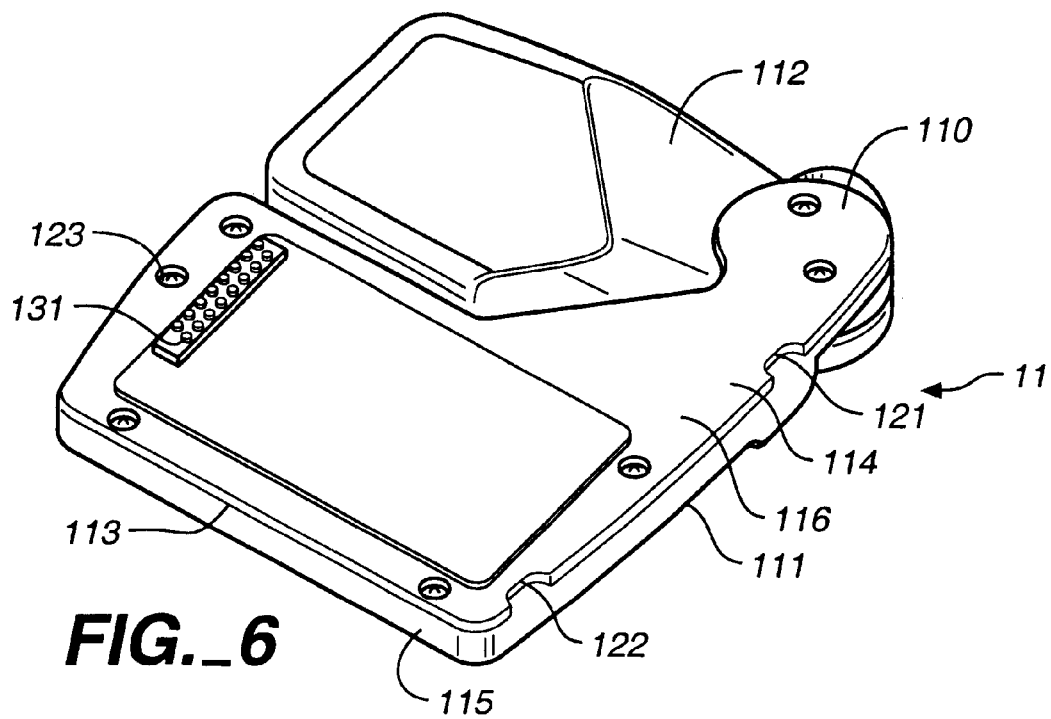
FIG._6
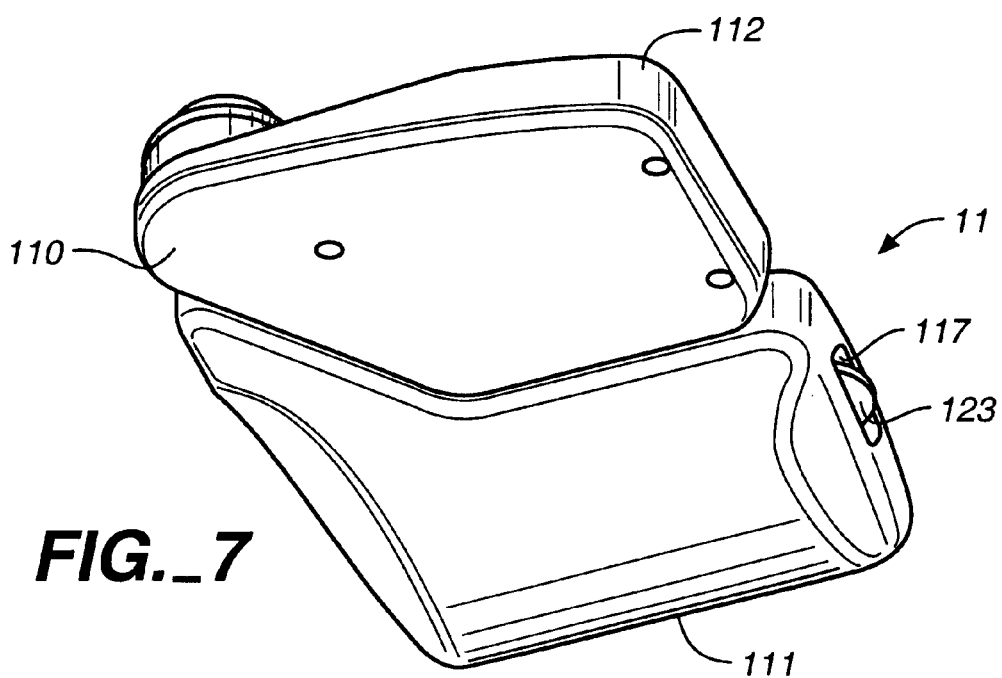
FIG._7

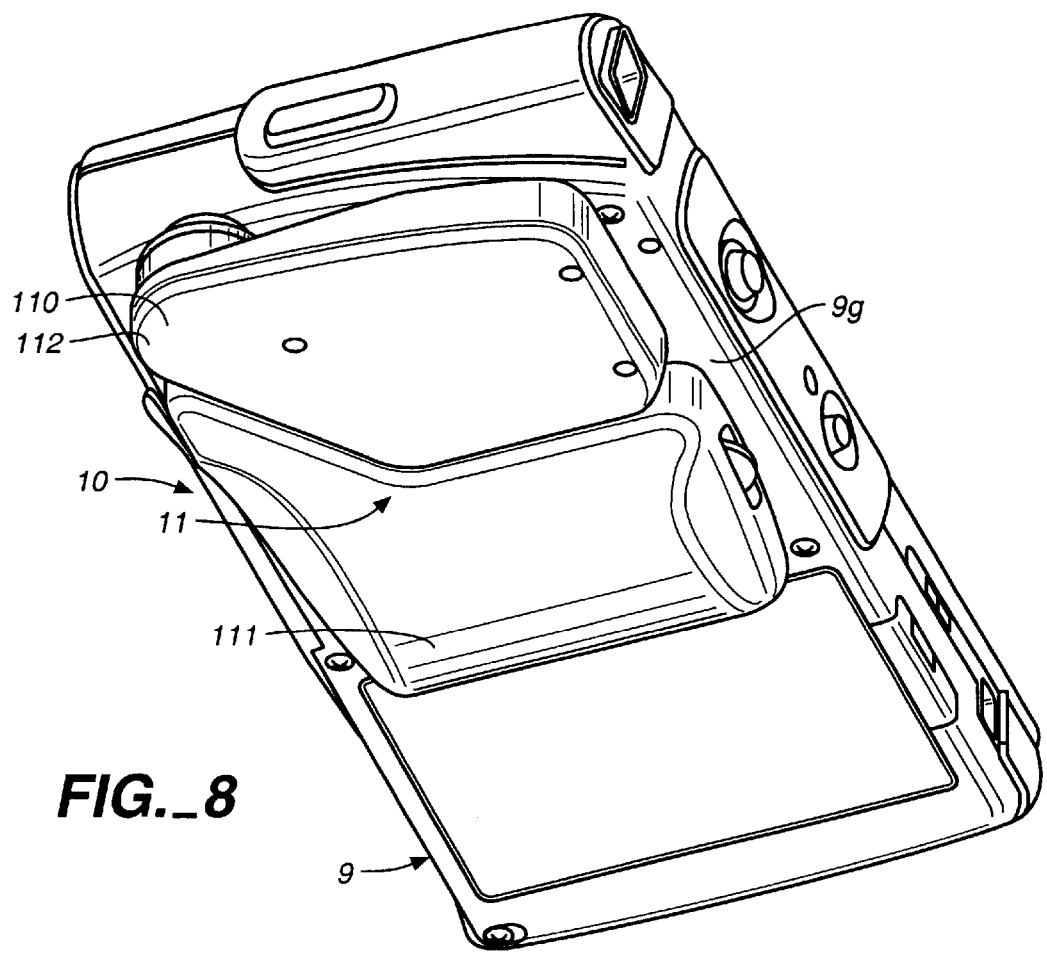
FIG._8
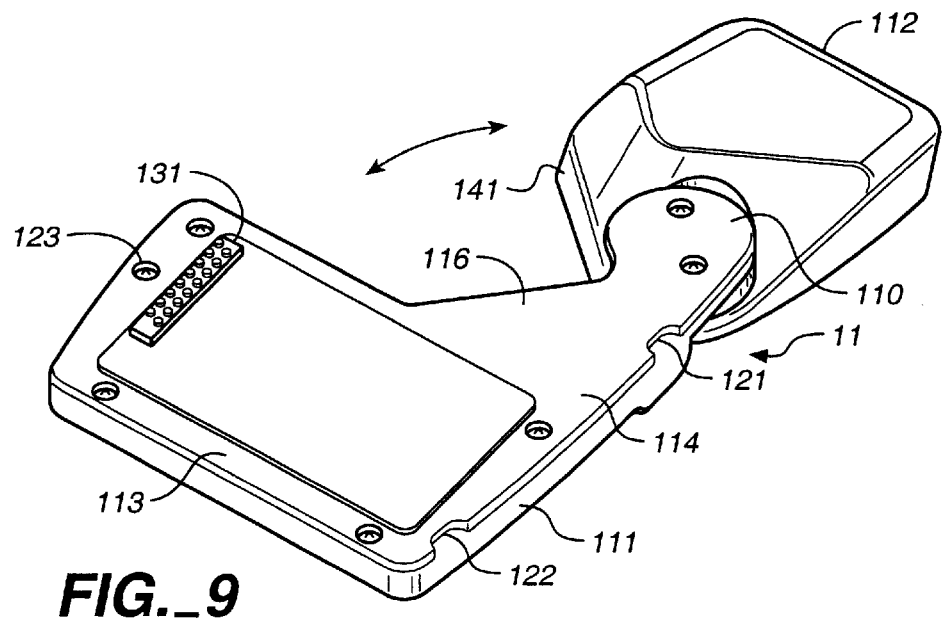
FIG._9

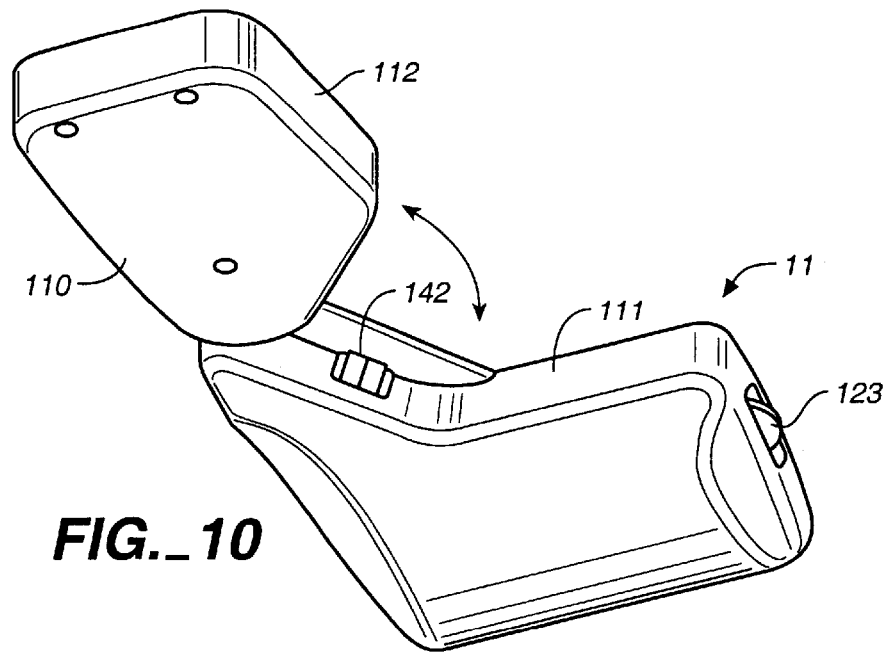
FIG._10
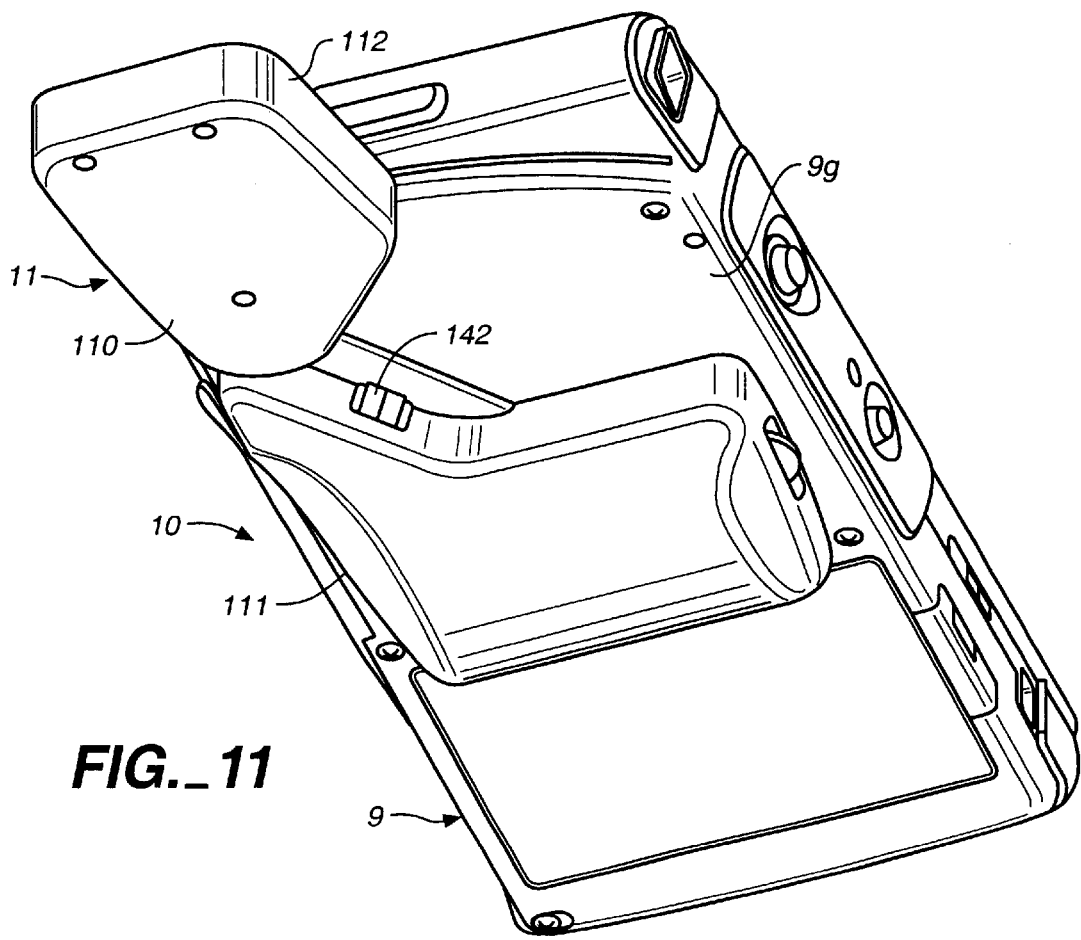
FIG._11

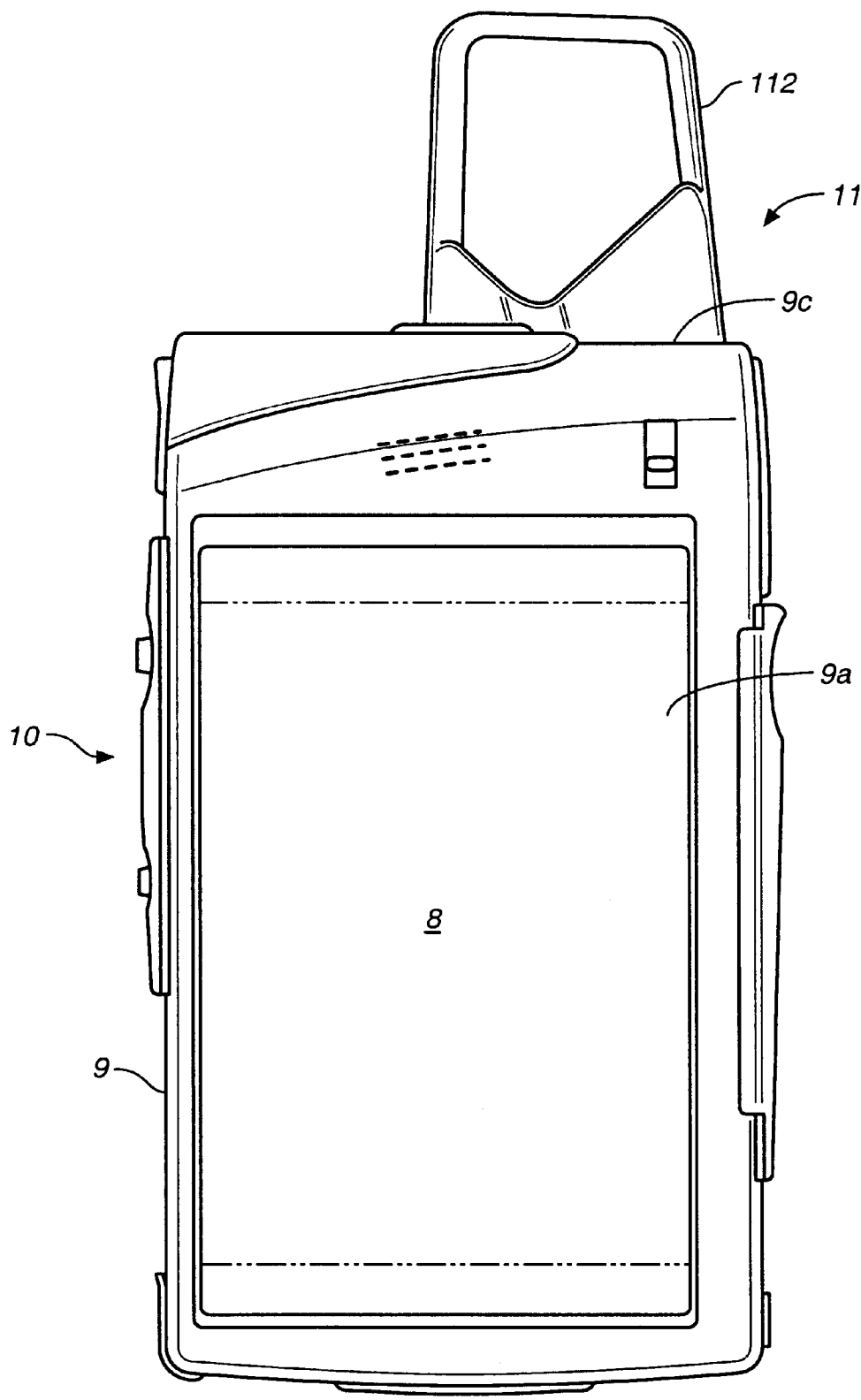
FIG._12

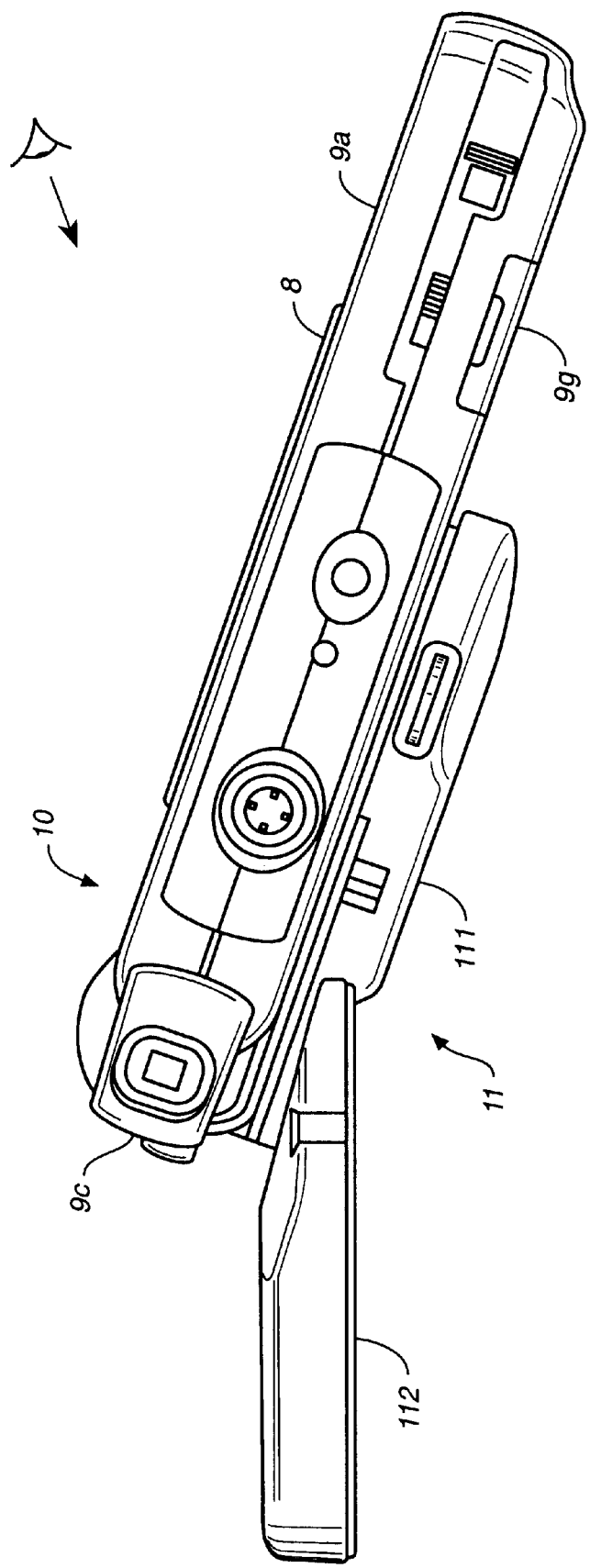
FIG._13

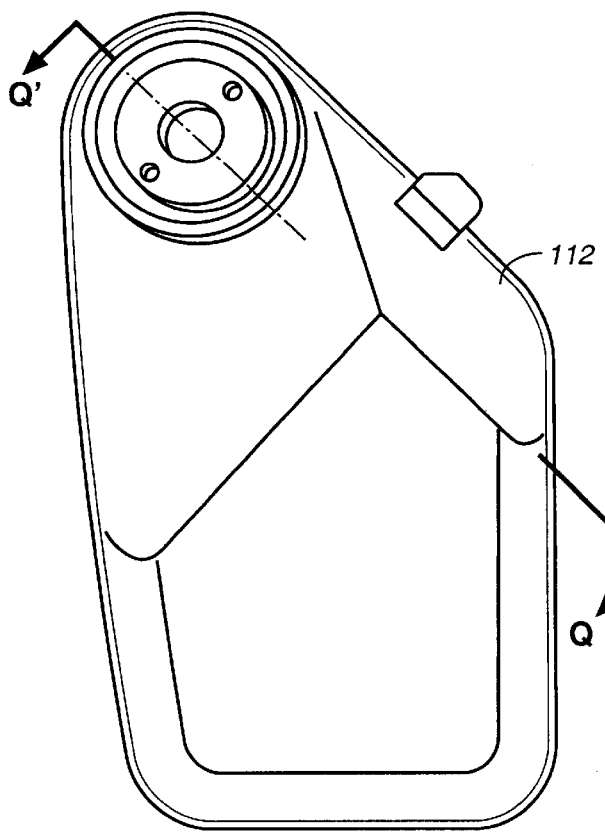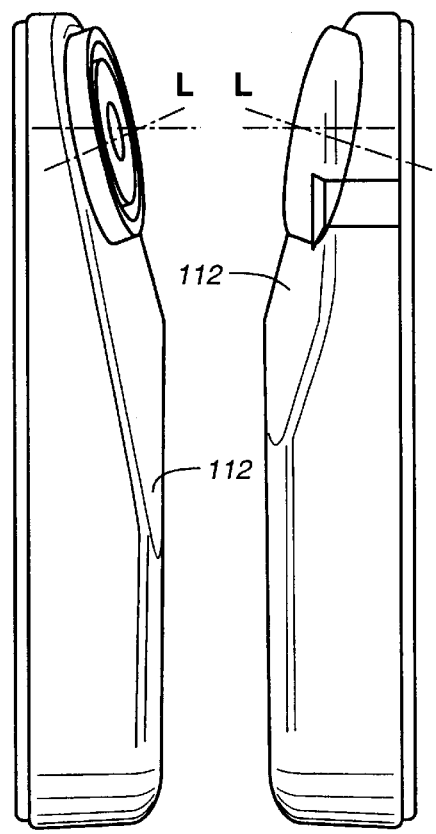
FIG._14A  FIG._14B  FIG._14C
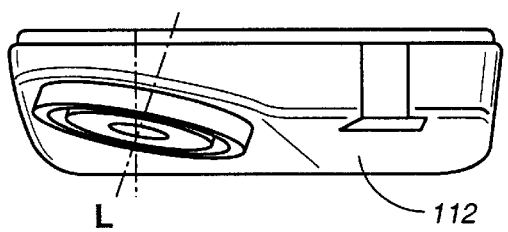
FIG._14D
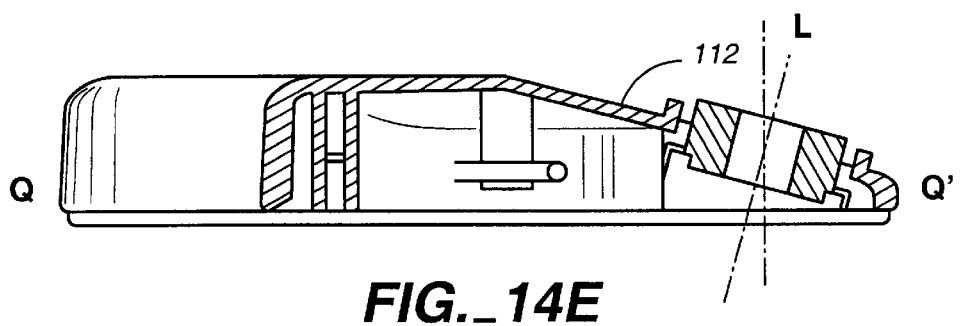
FIG._14E

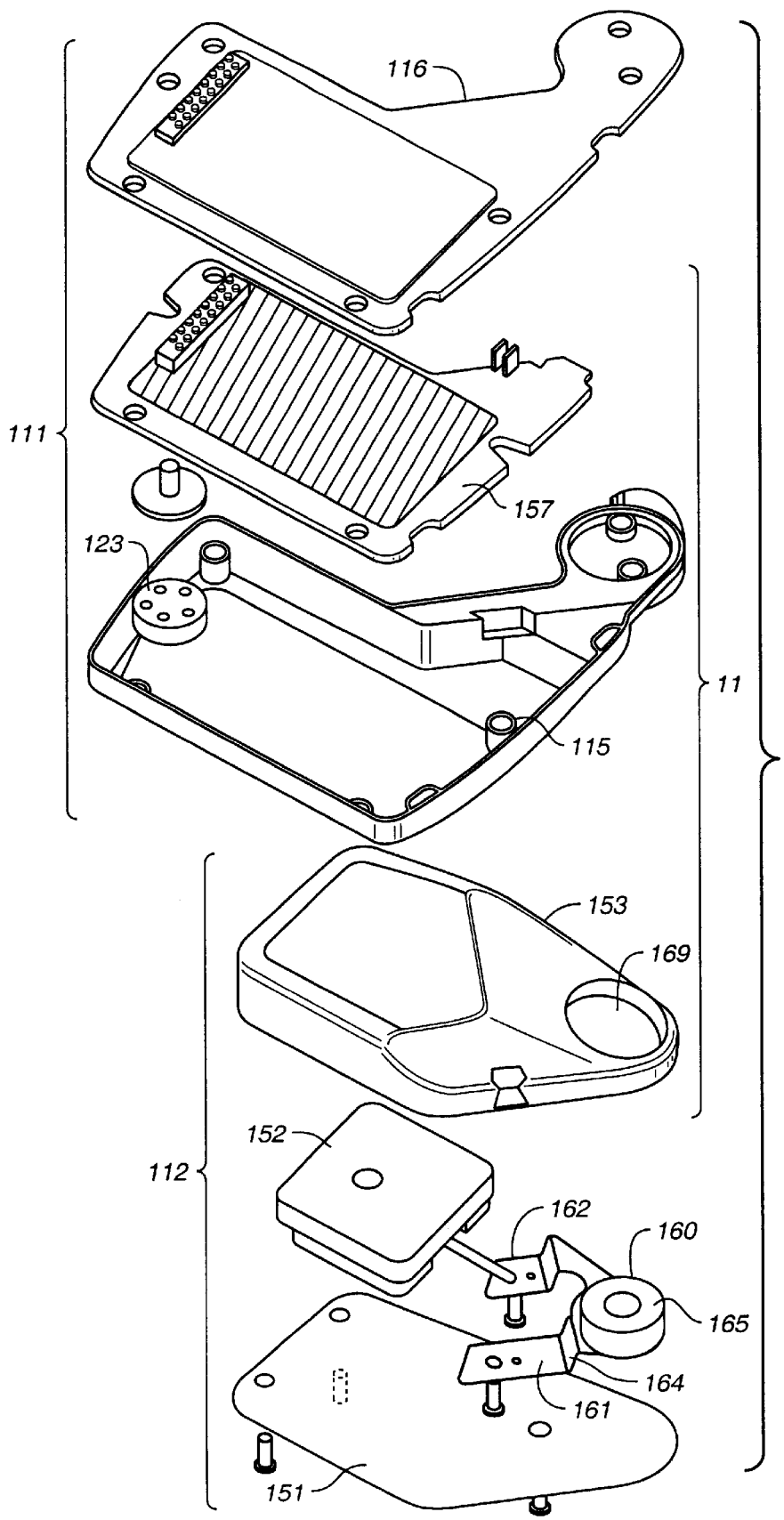
FIG._15

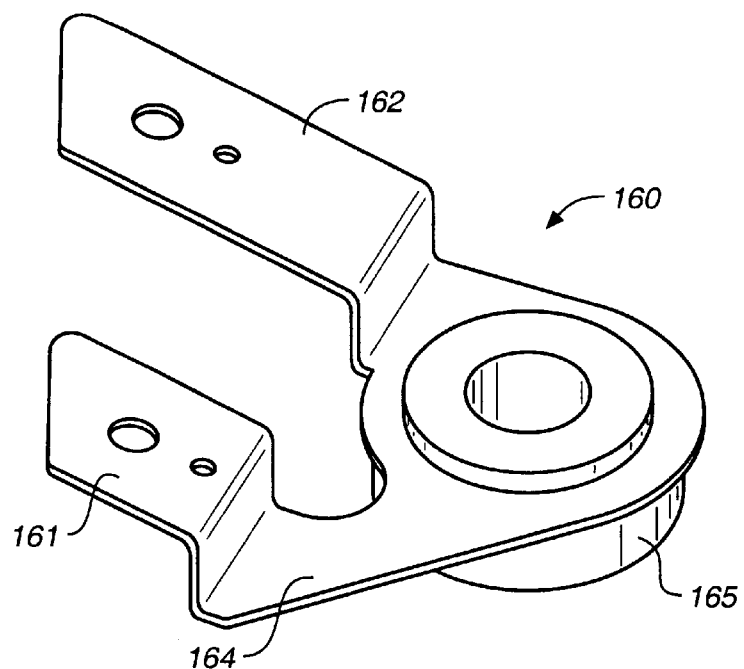
FIG._16
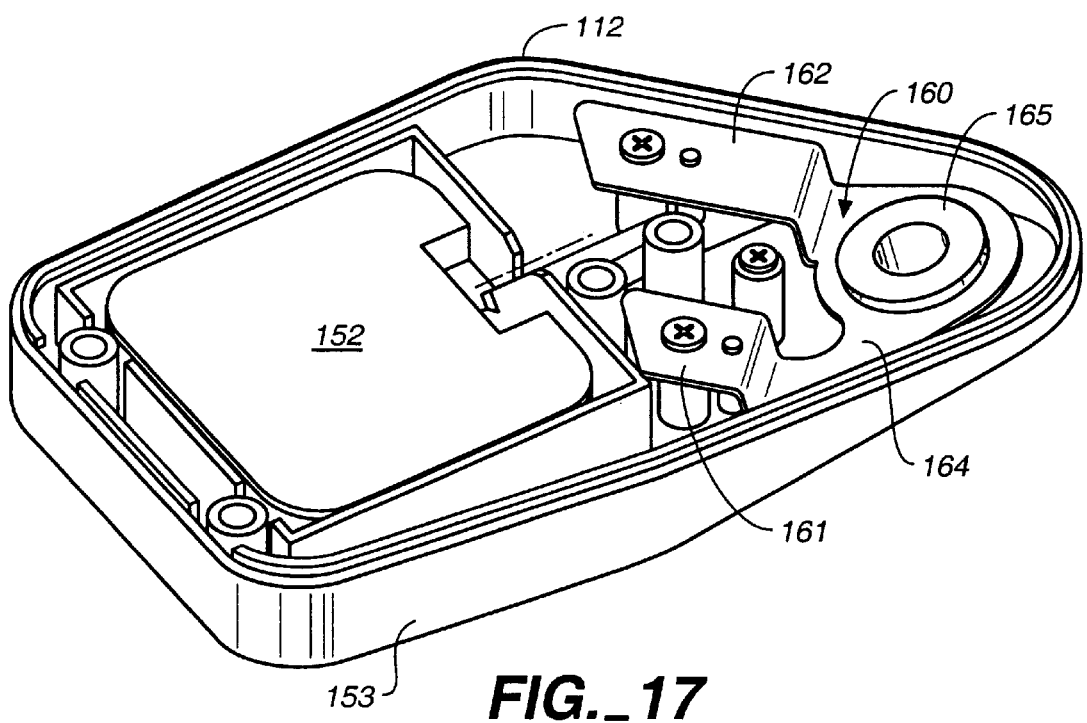
FIG._17

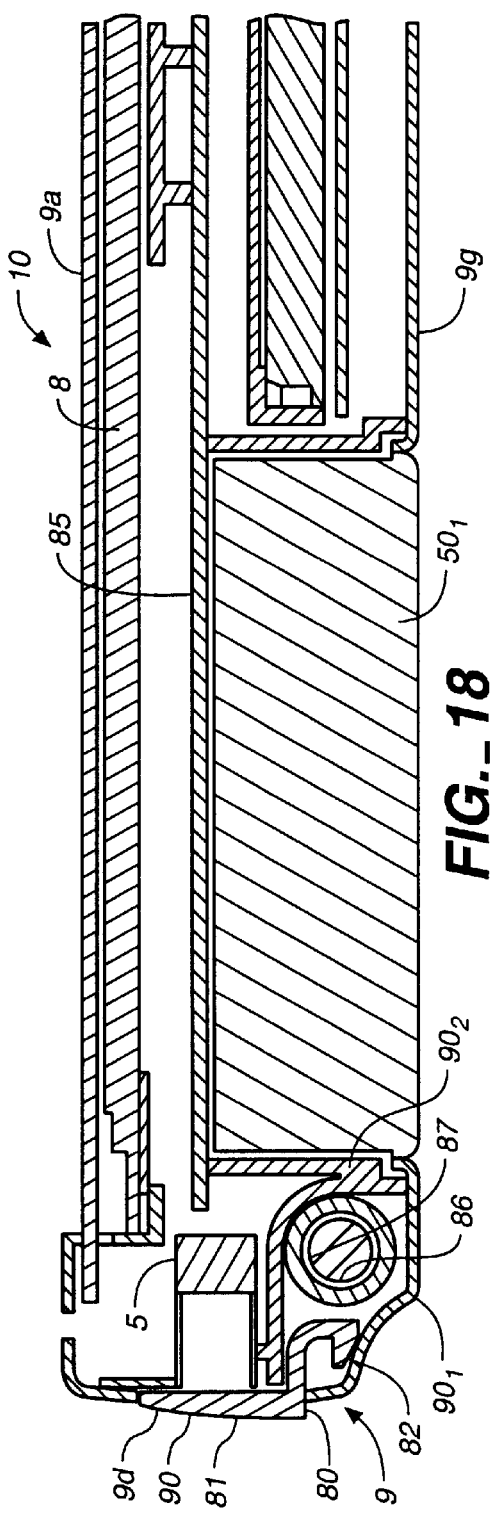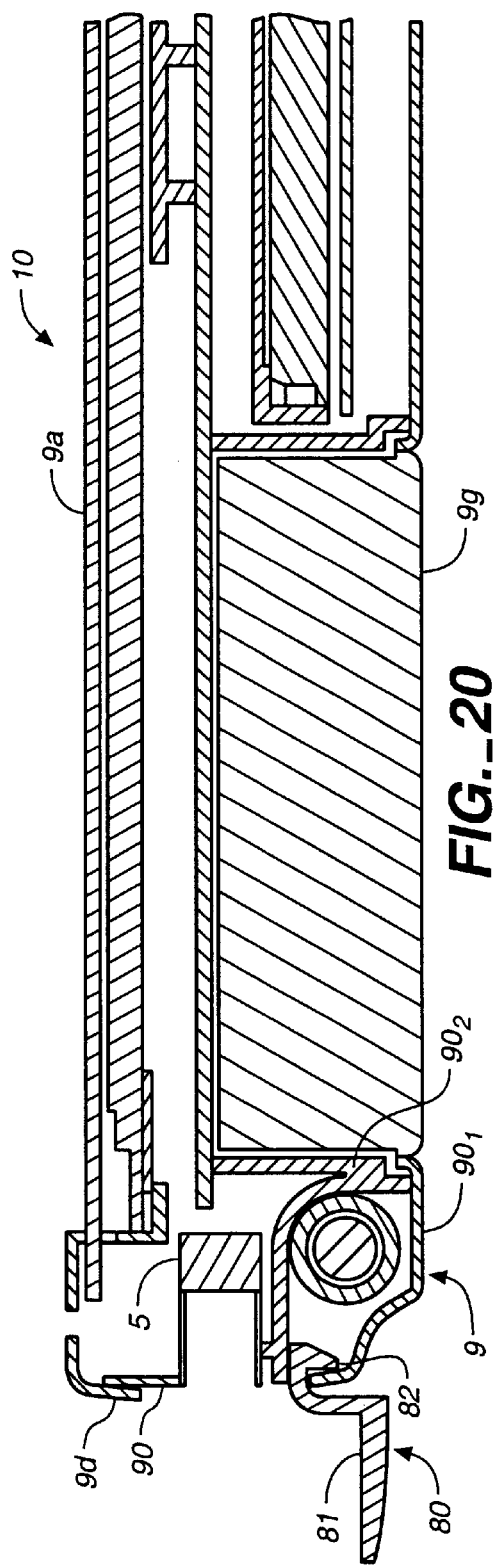

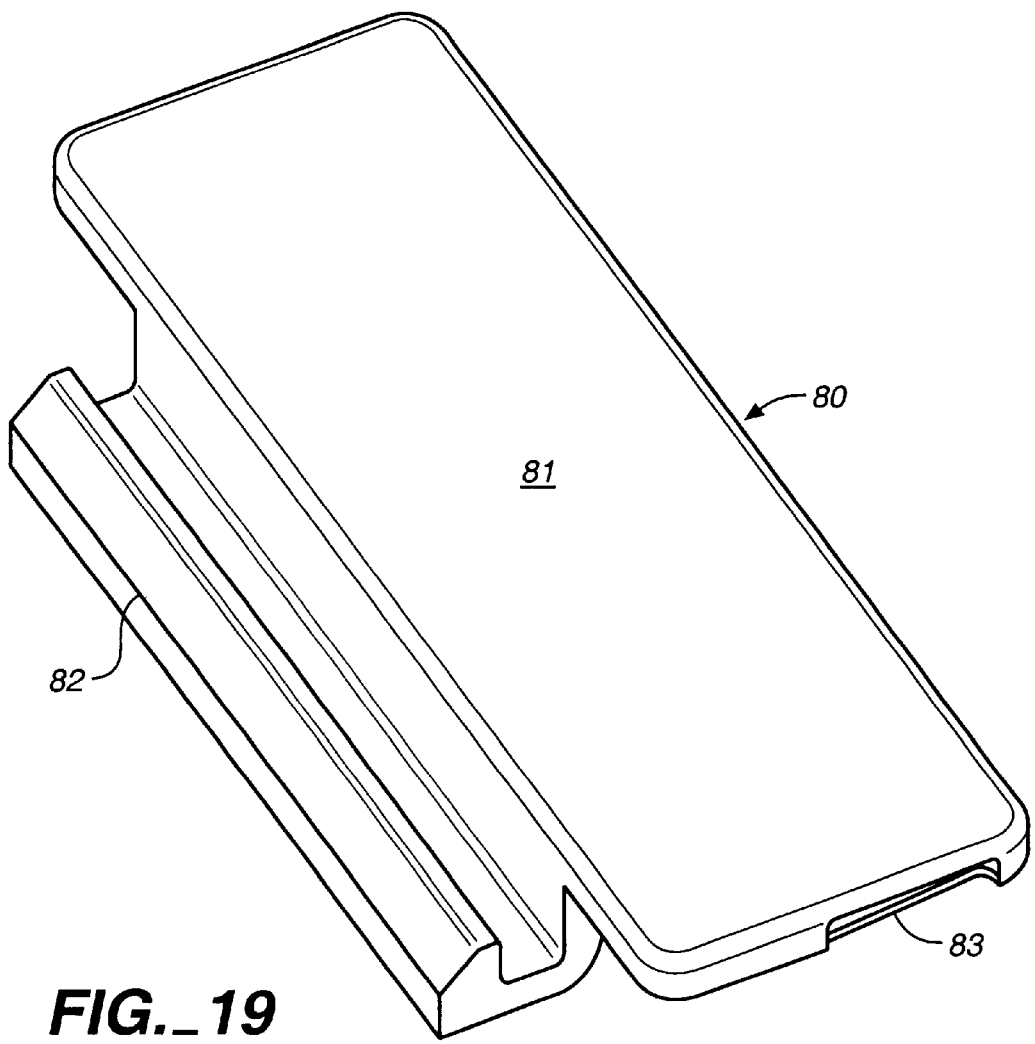
FIG._19

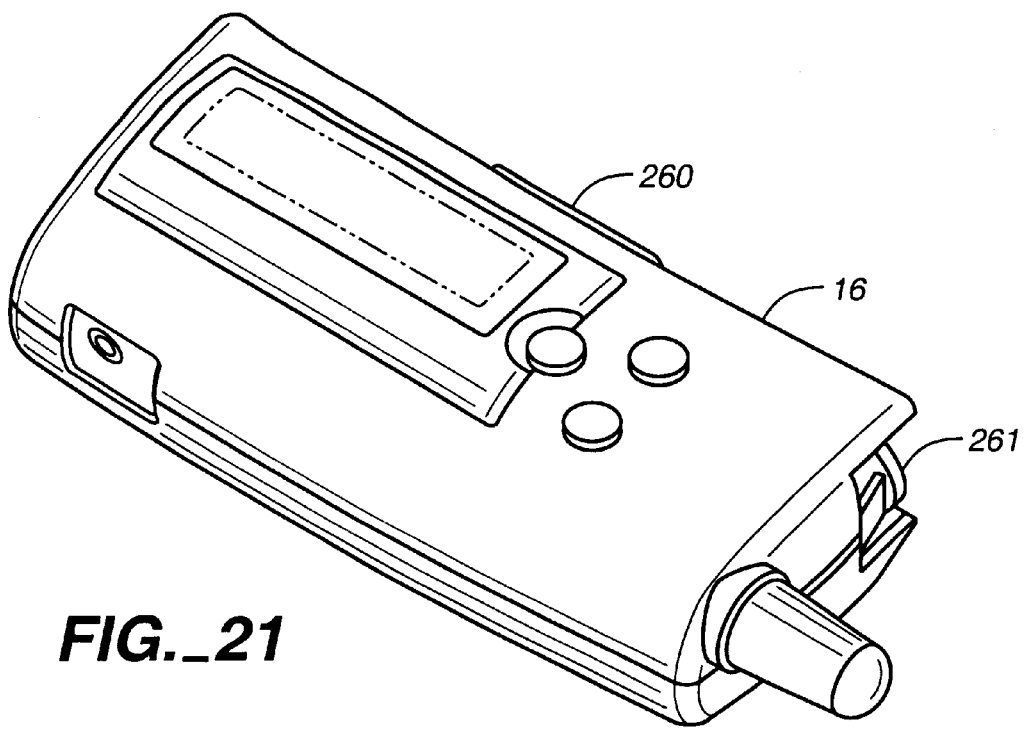
FIG._21
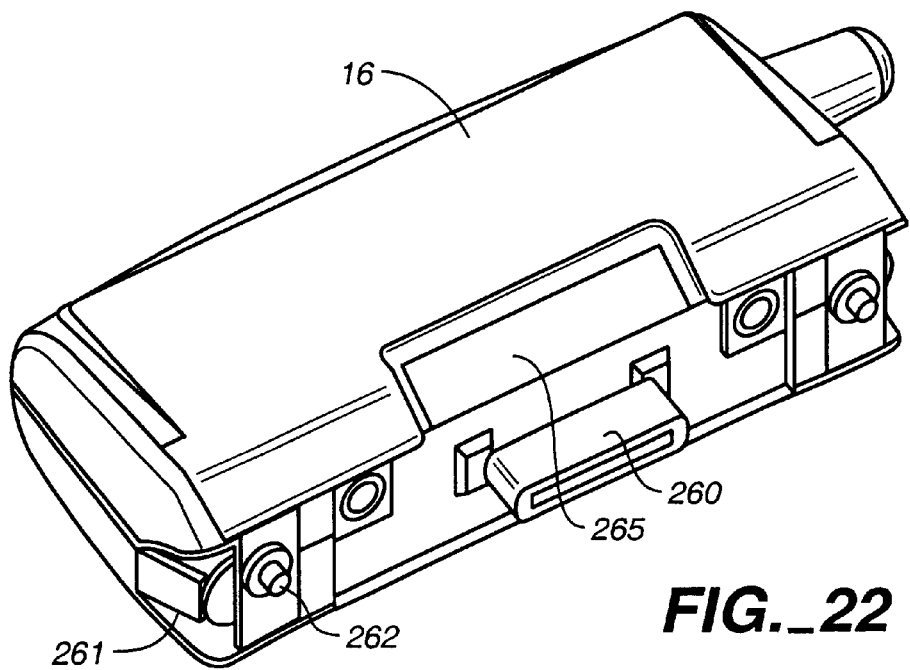
FIG._22

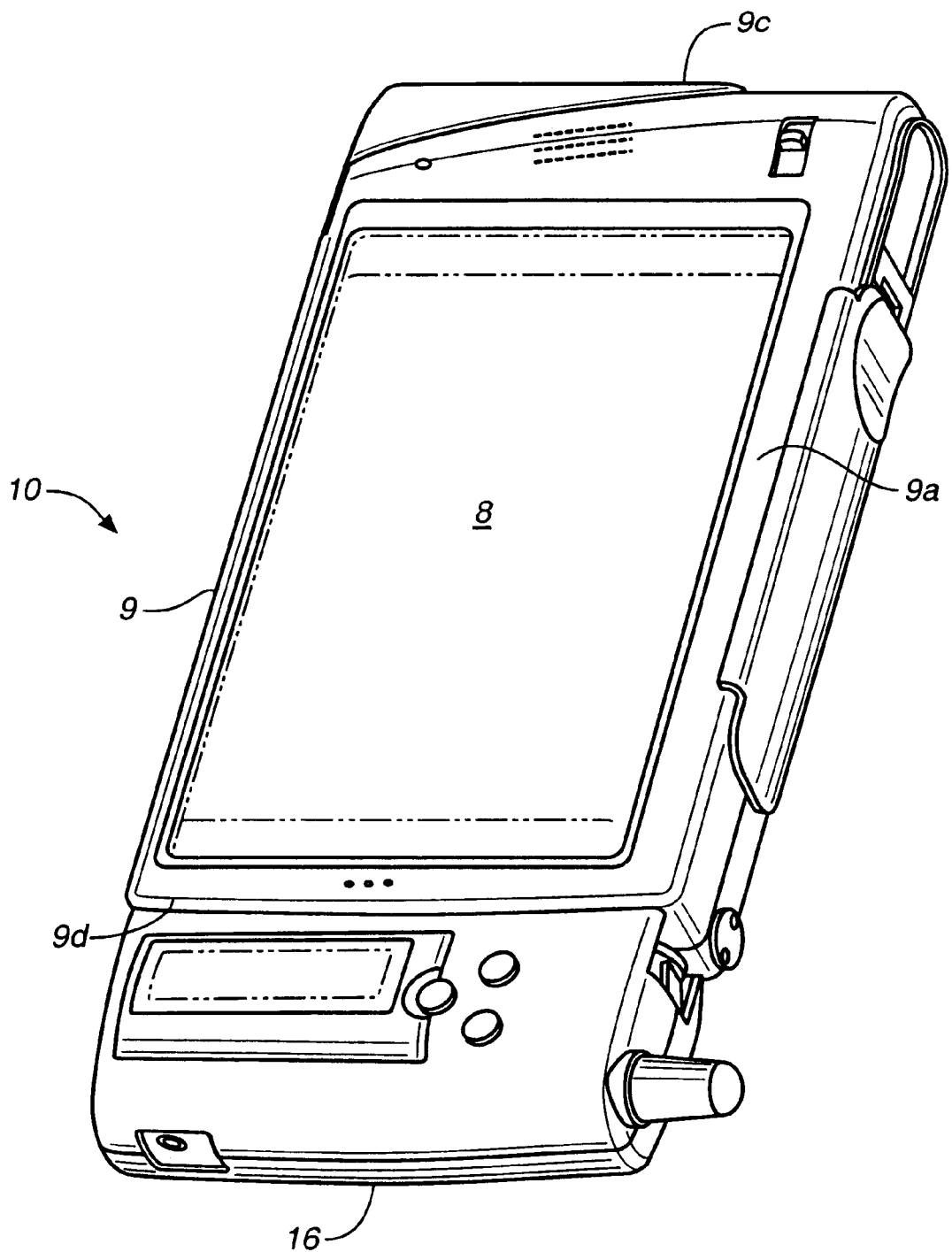
FIG._23

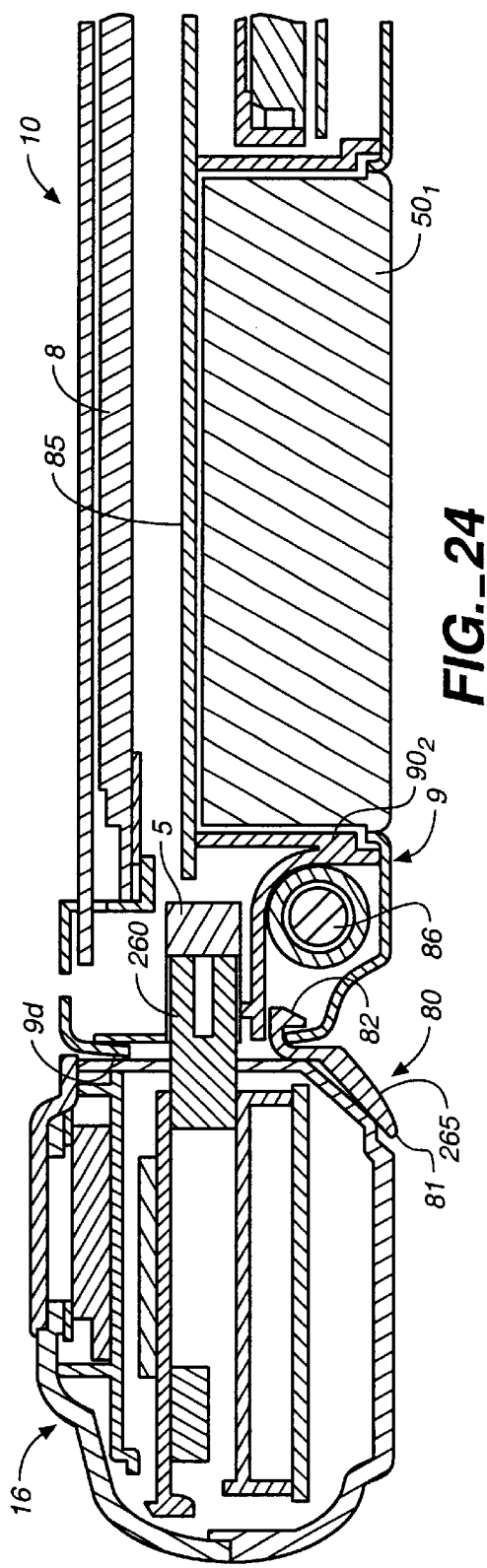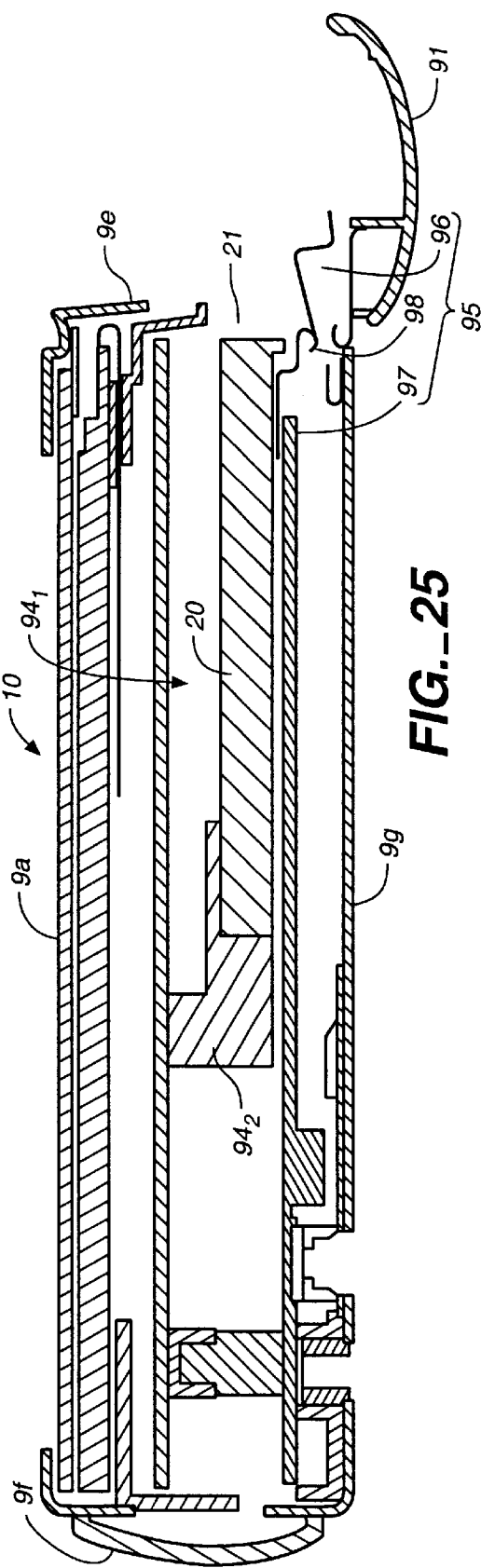

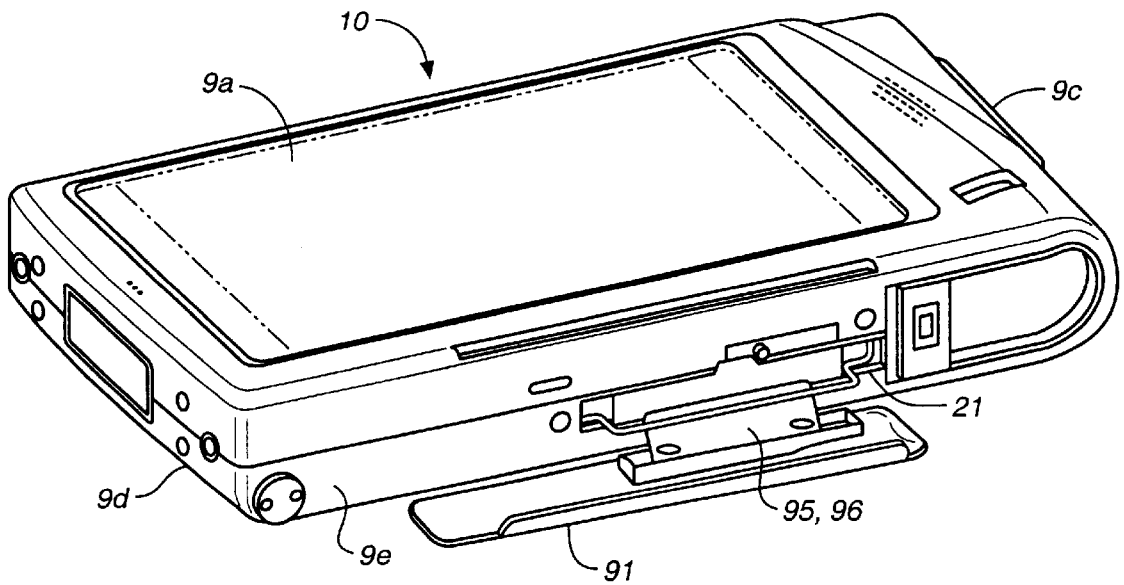
FIG._26
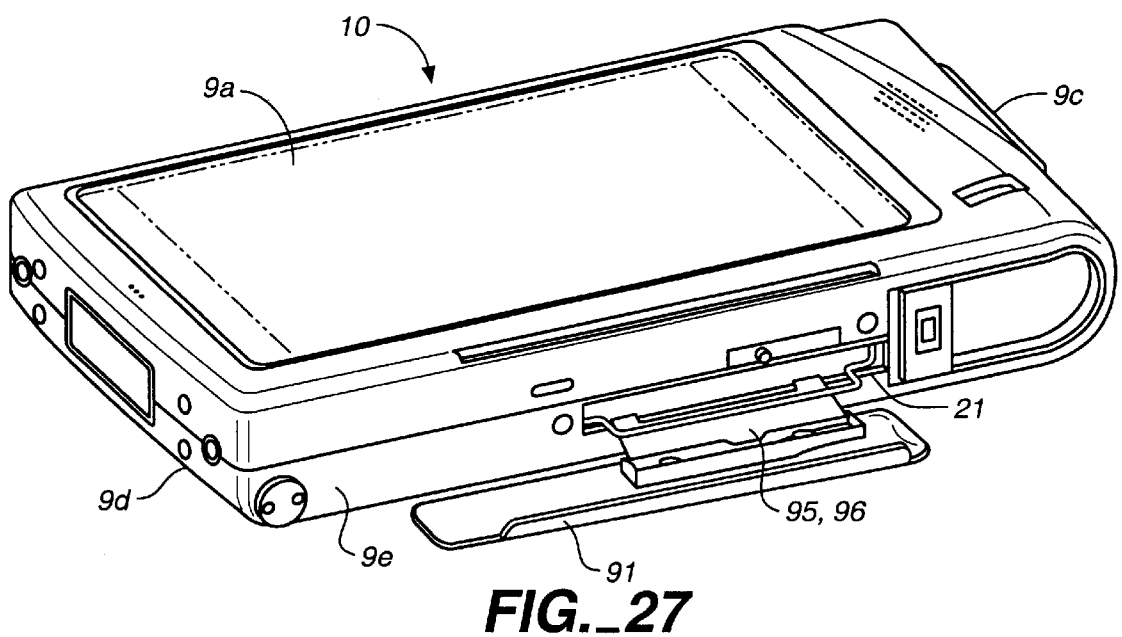
FIG._27

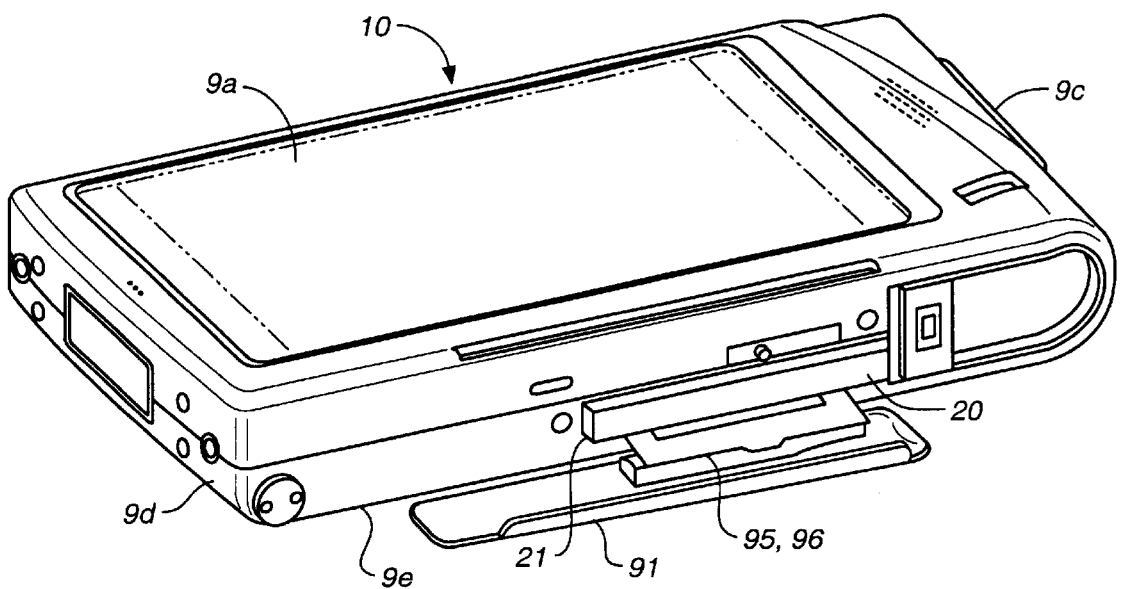
FIG._28
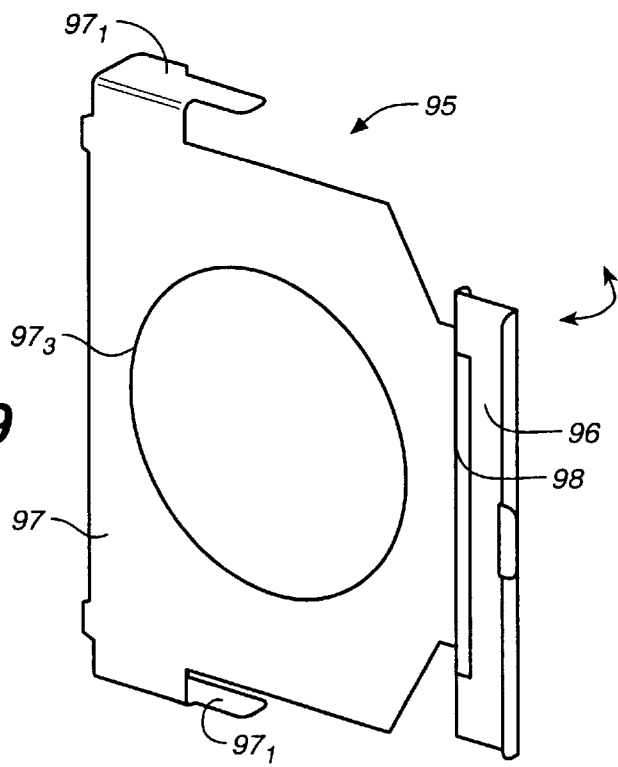
FIG._29

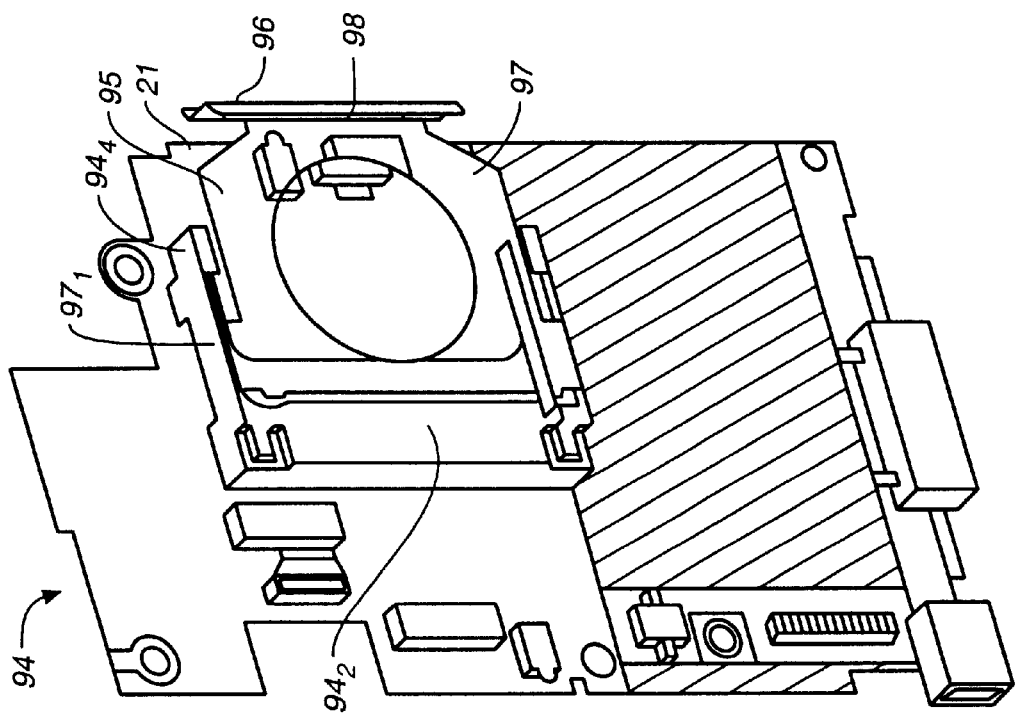
FIG._31
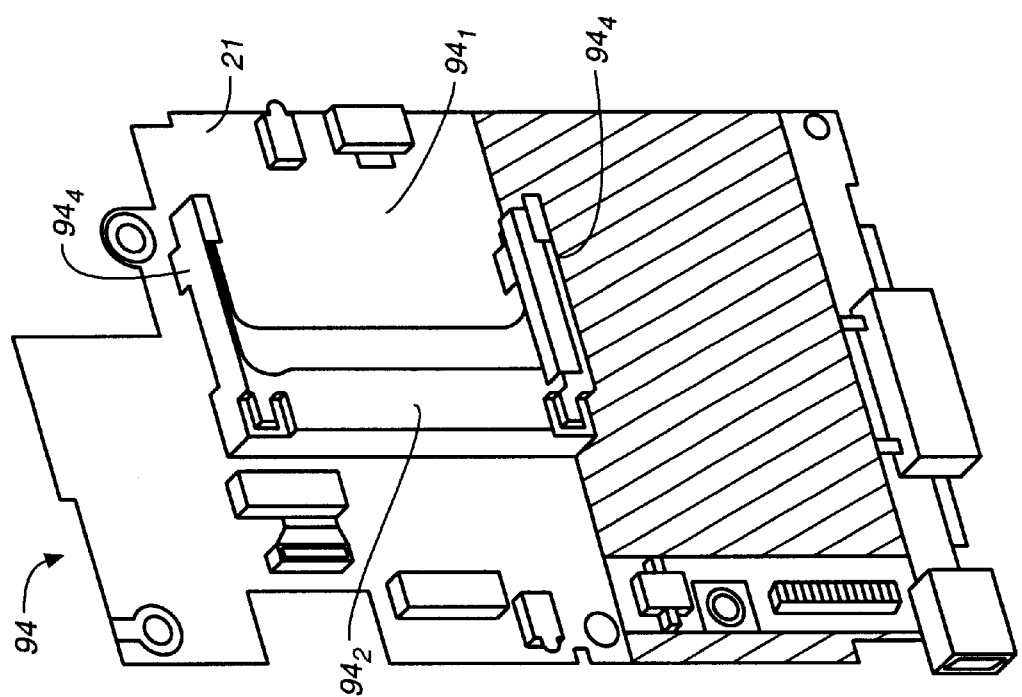
FIG._30

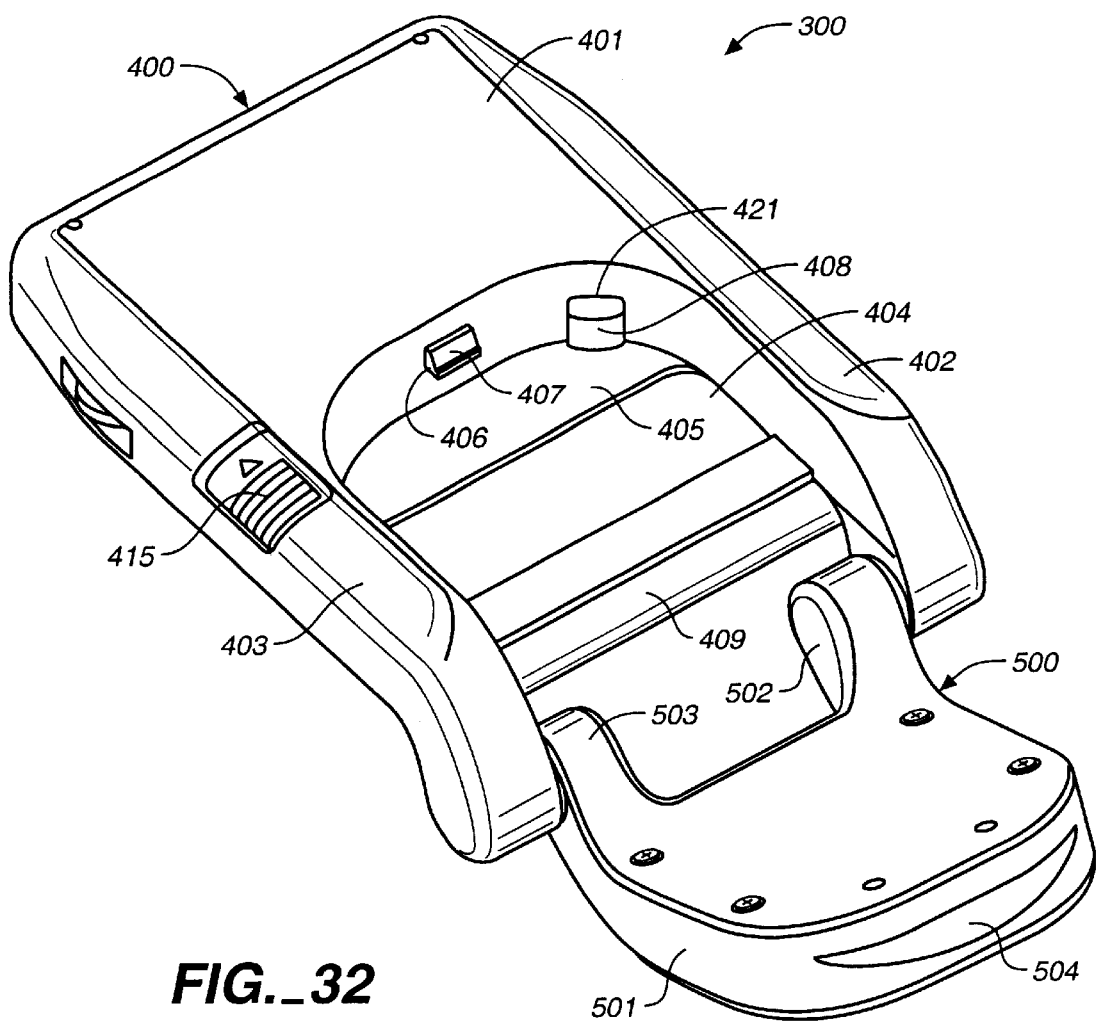
FIG._32

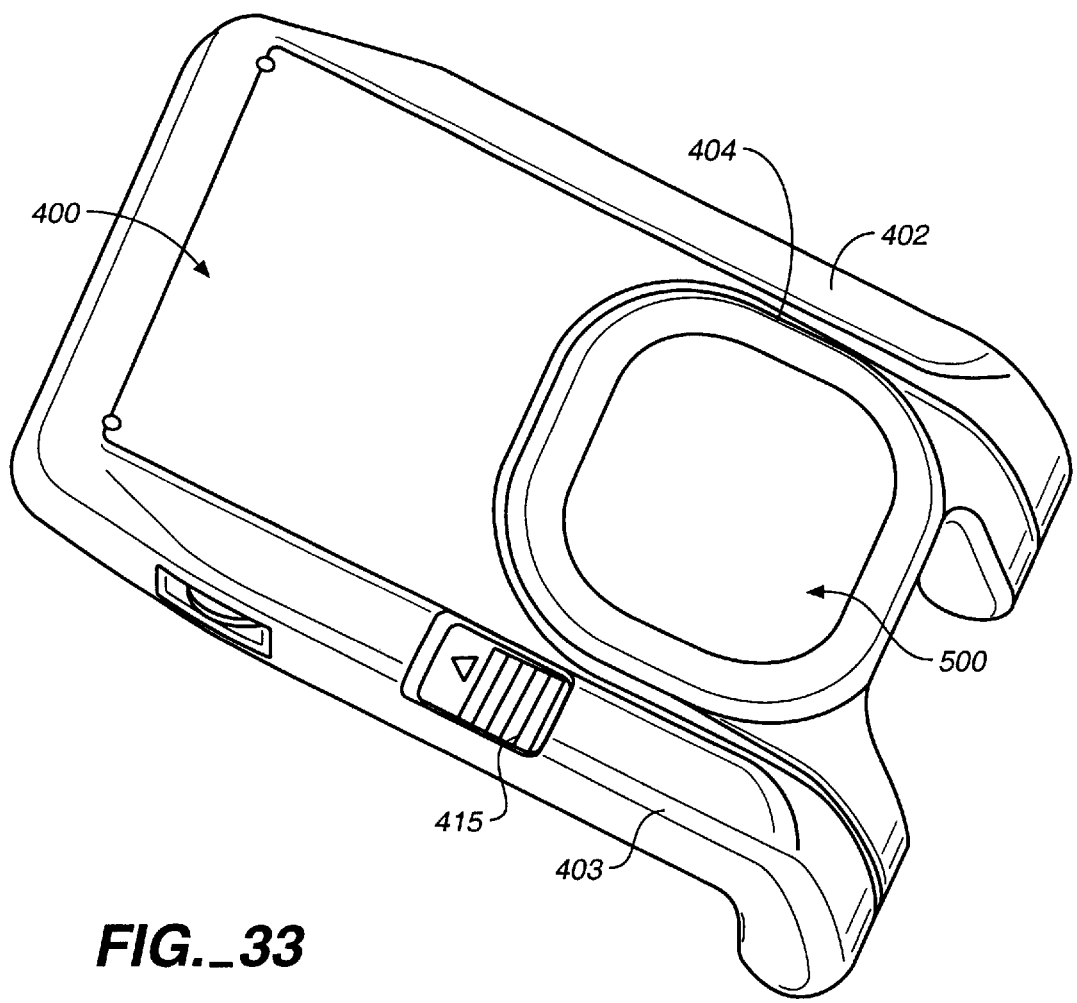
FIG._33

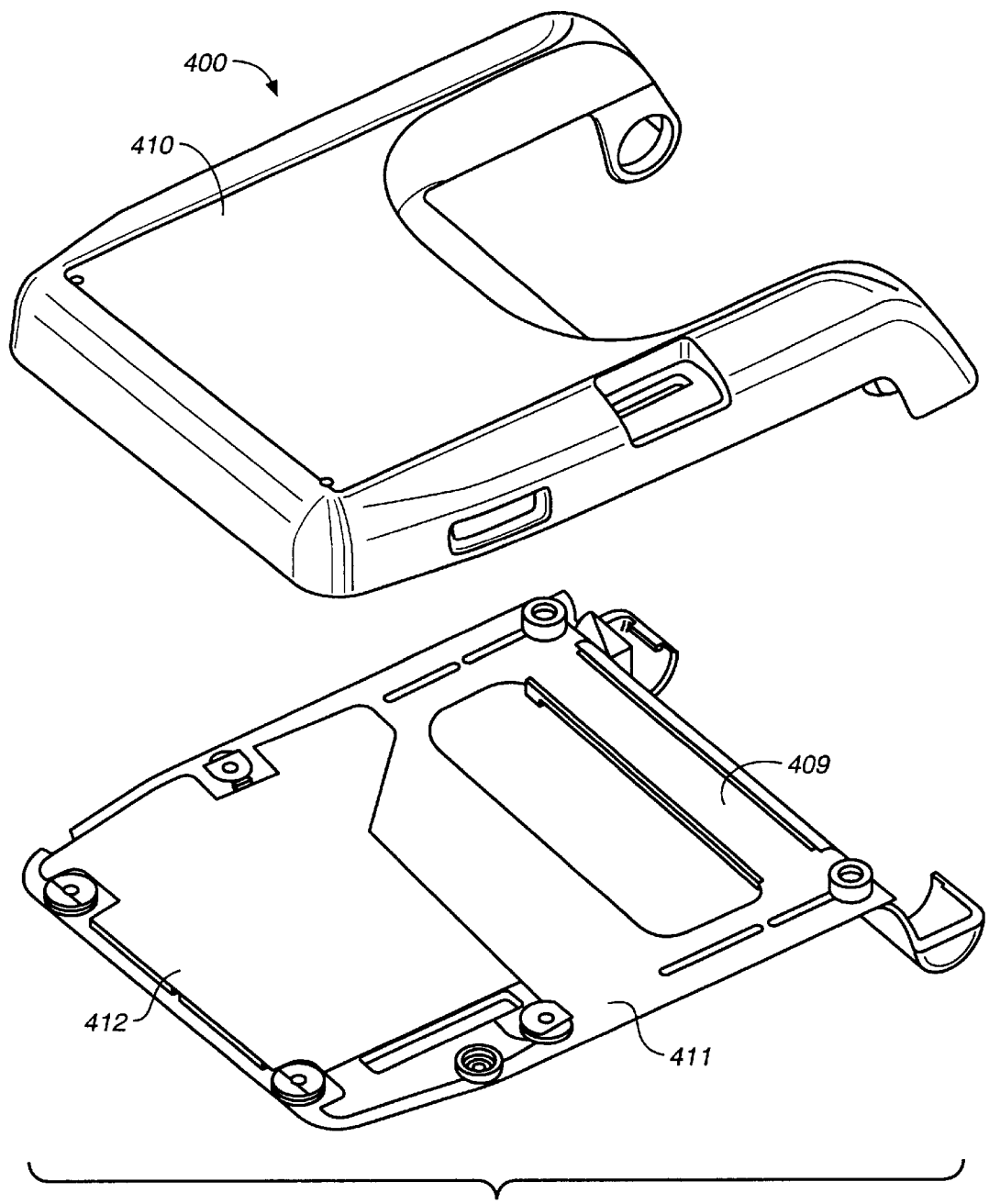
FIG._34

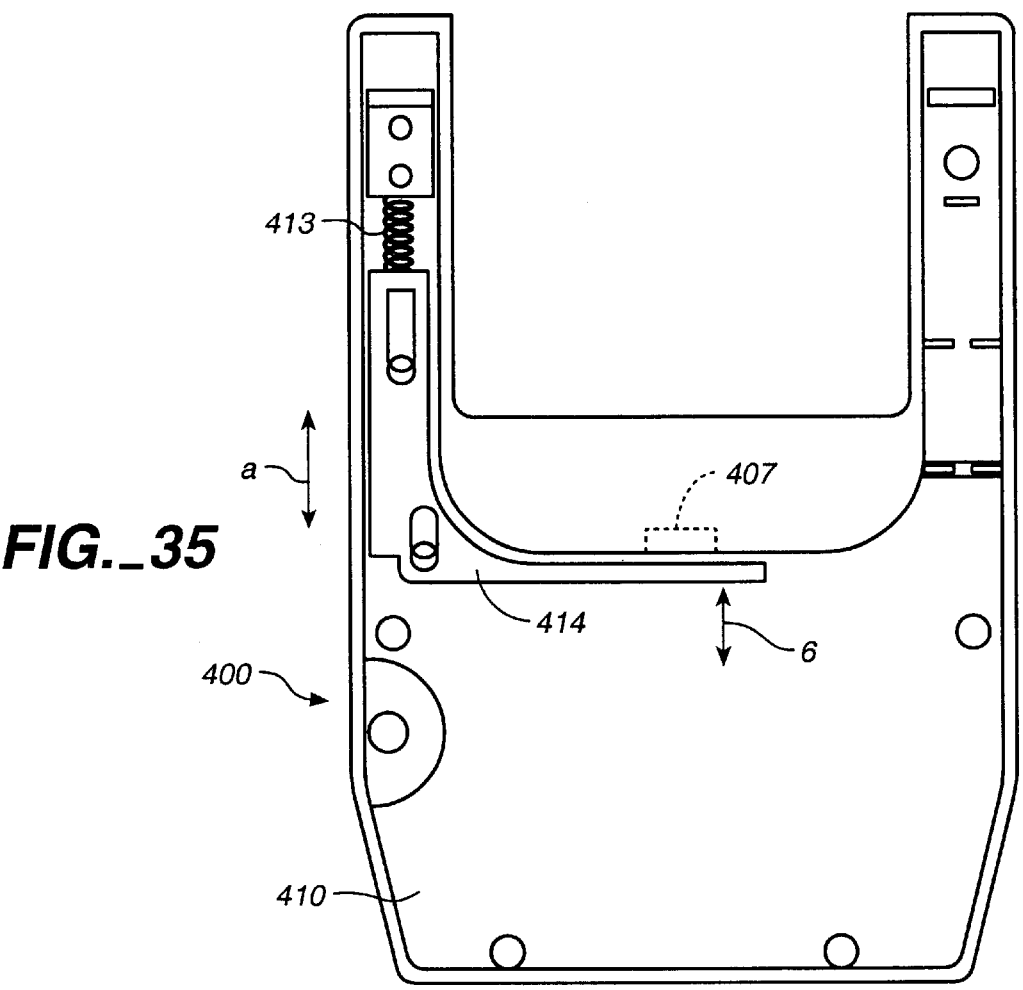
FIG._35
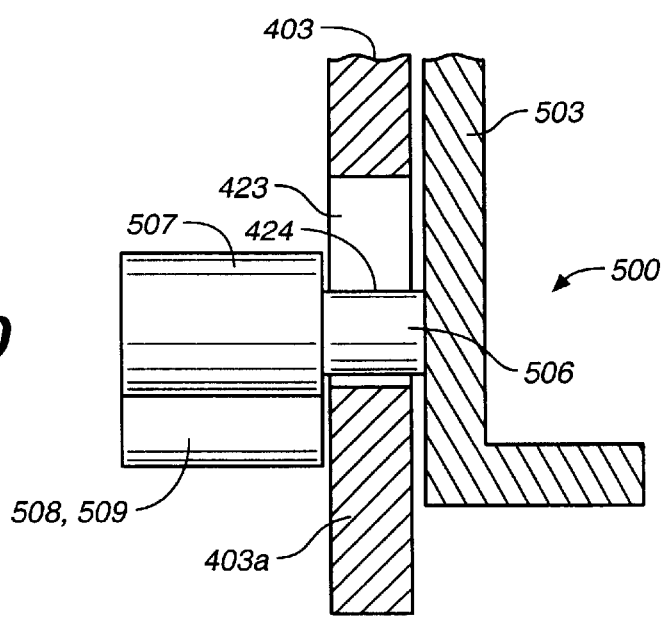
FIG._40

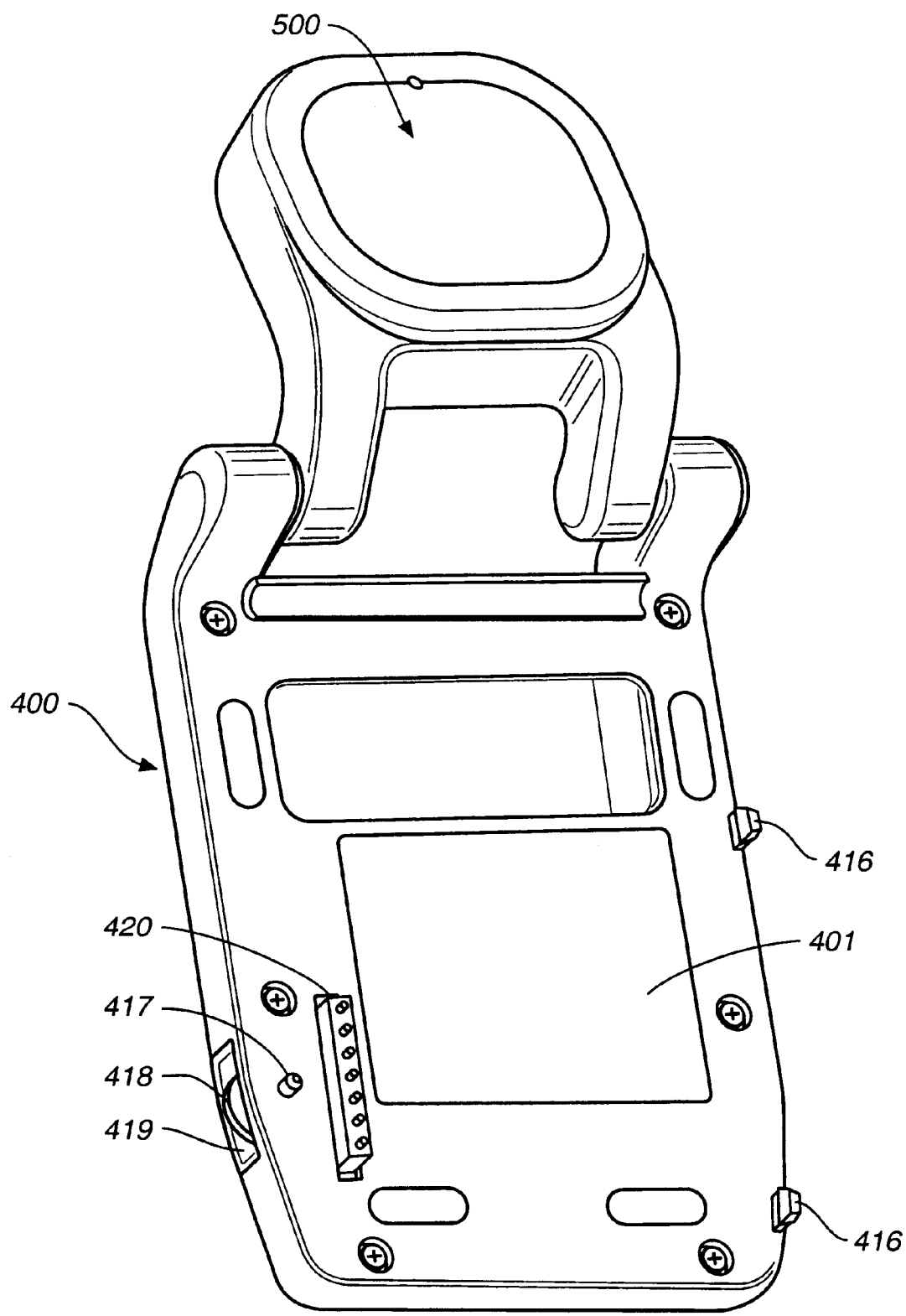
FIG._36

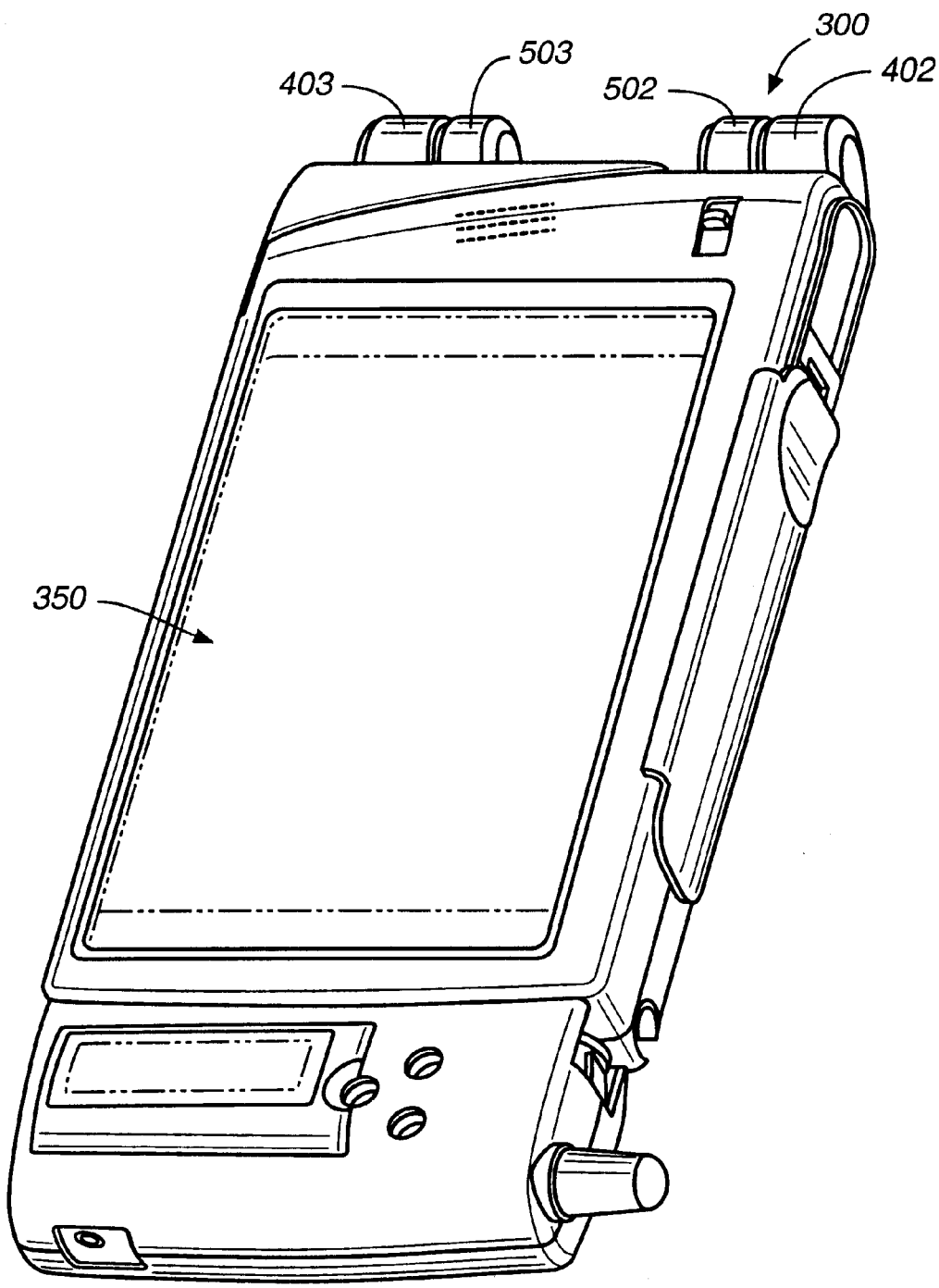
FIG._37

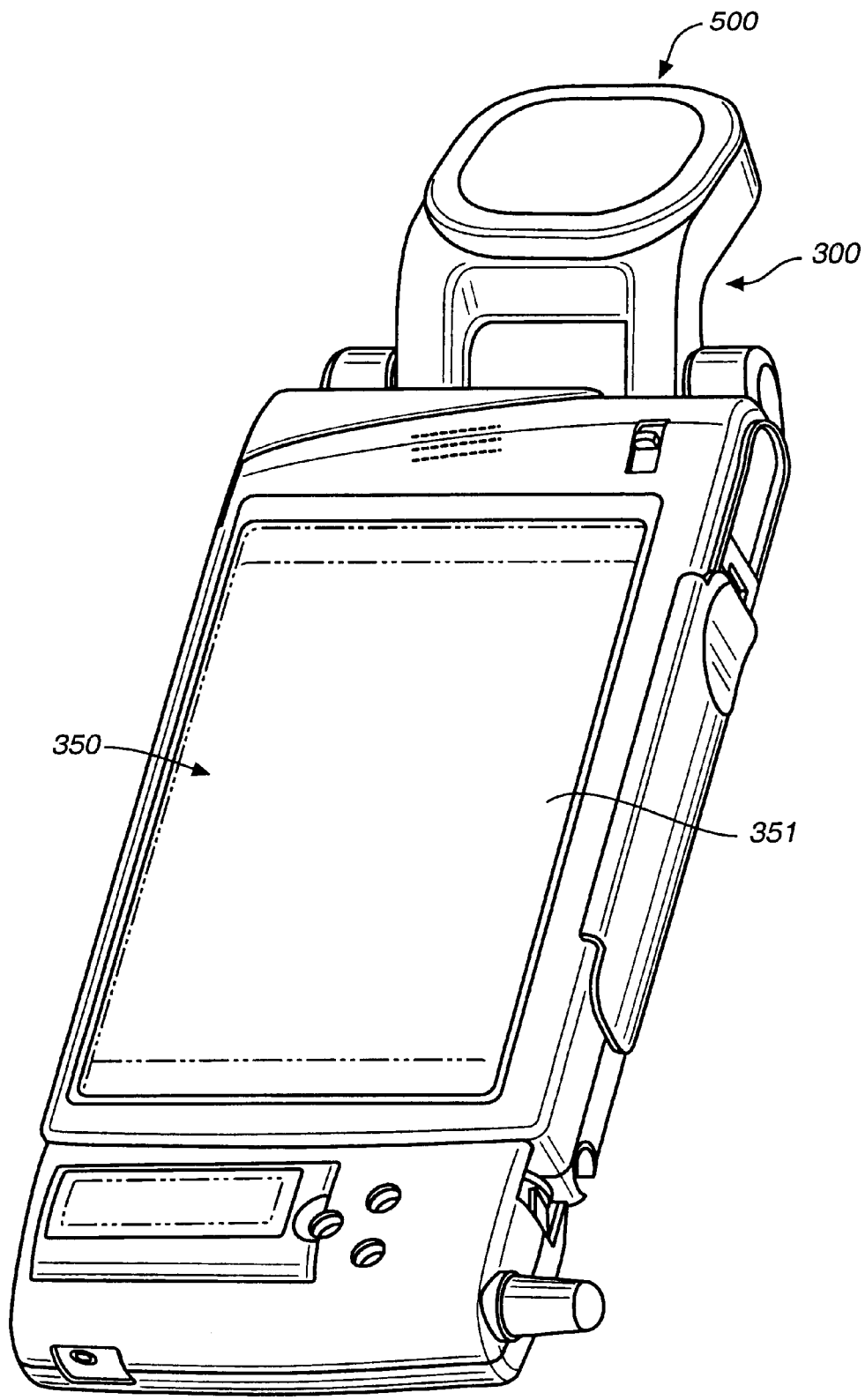
FIG._38

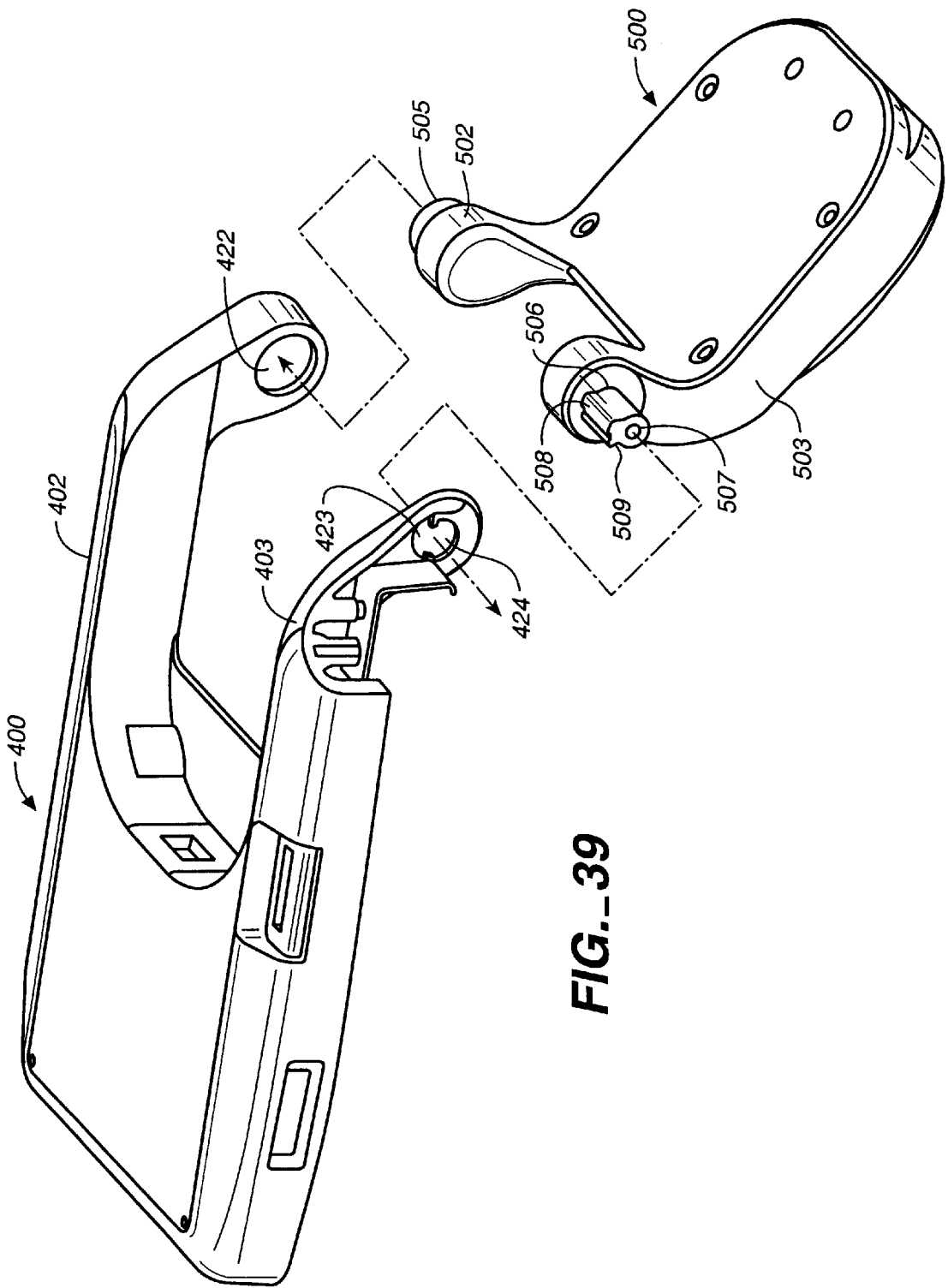
FIG._39

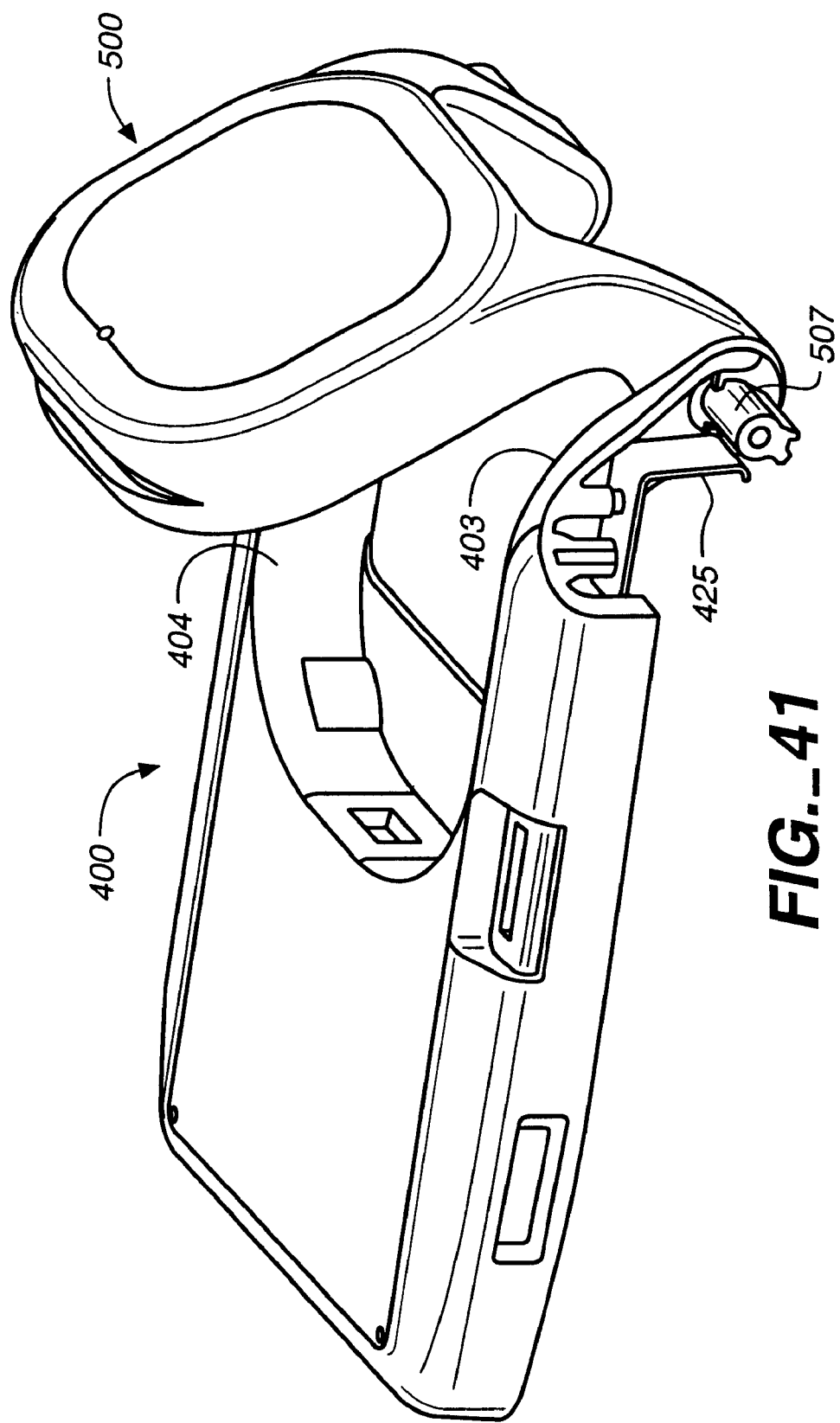
FIG._41

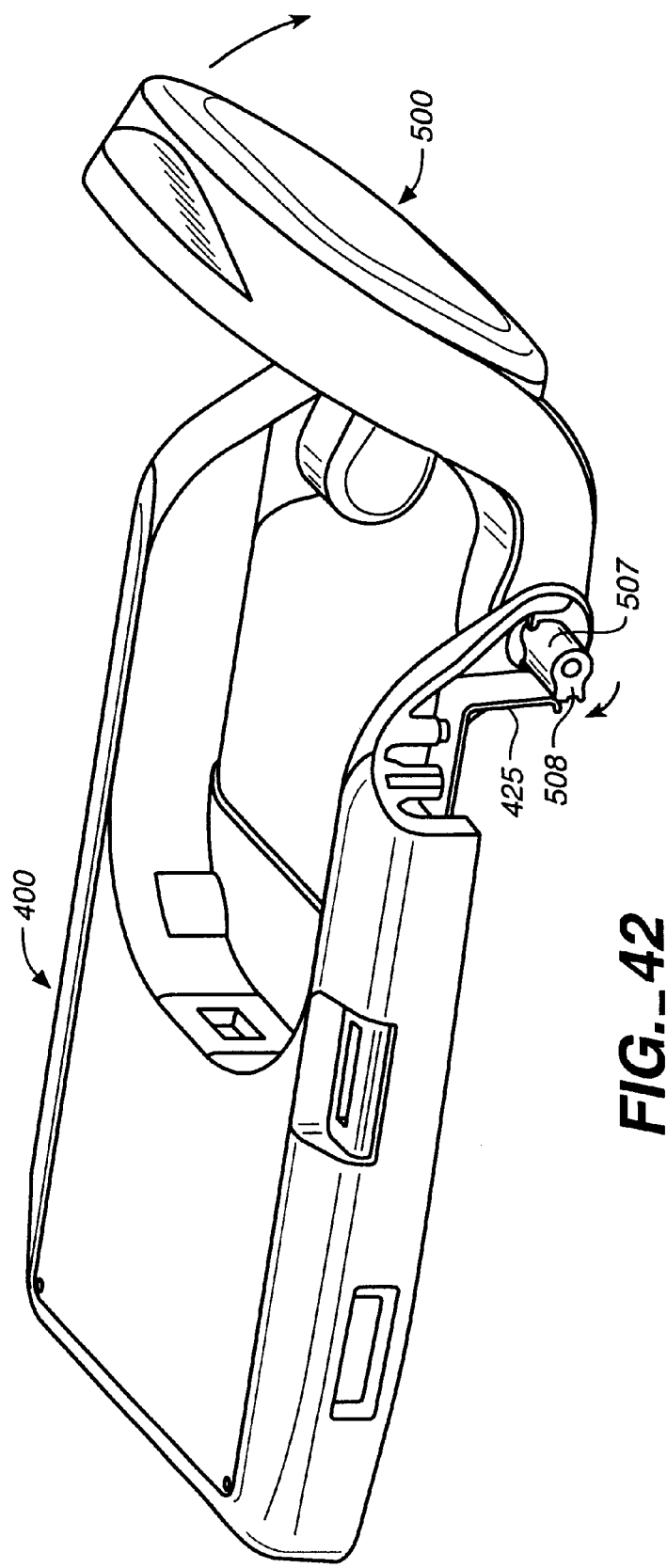
FIG._42

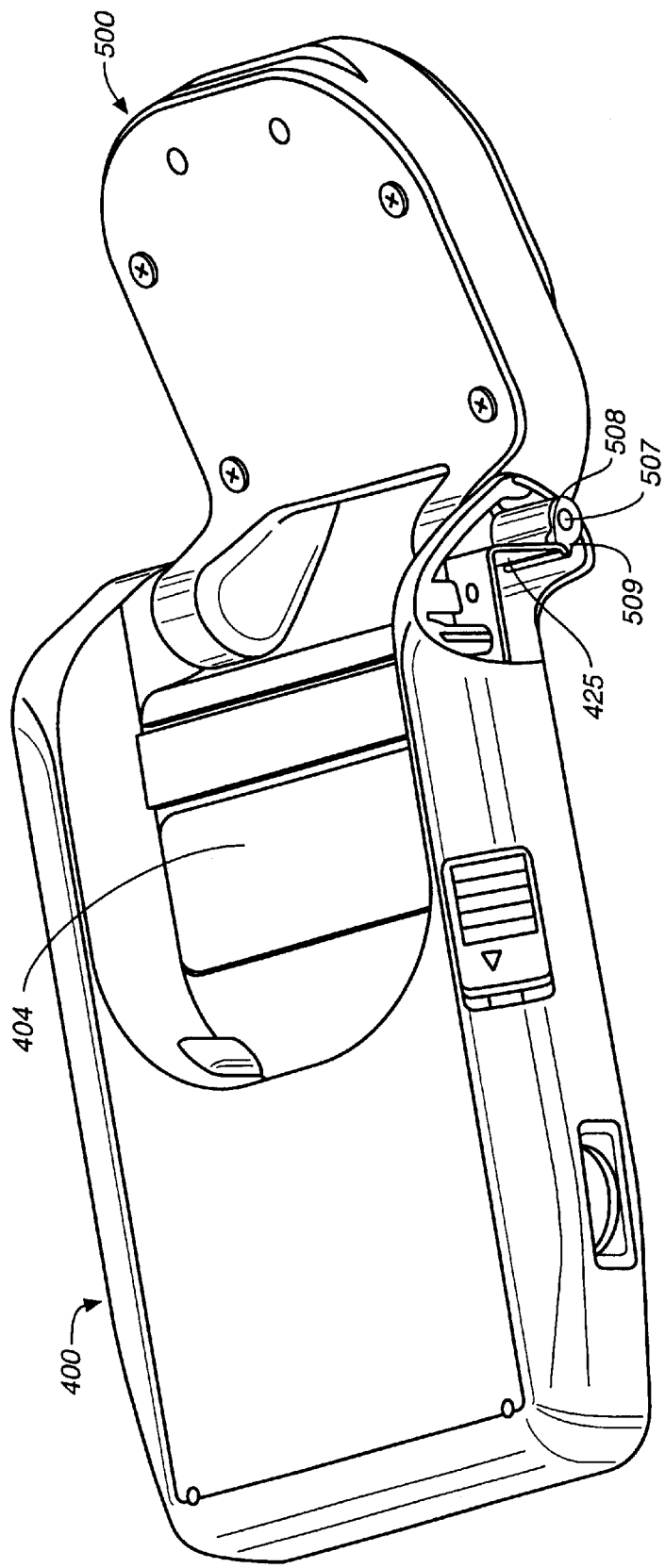
FIG._43

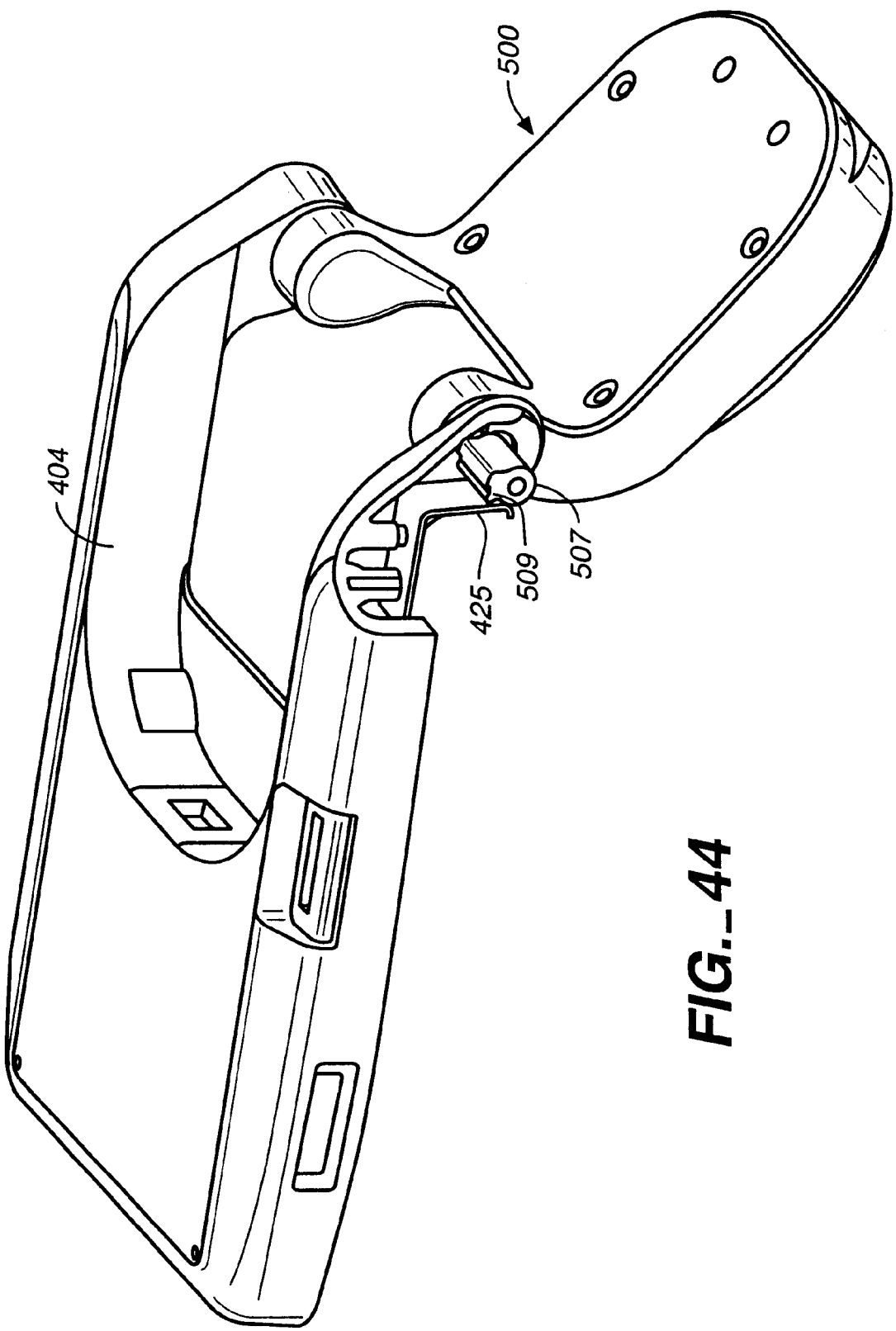
FIG._44

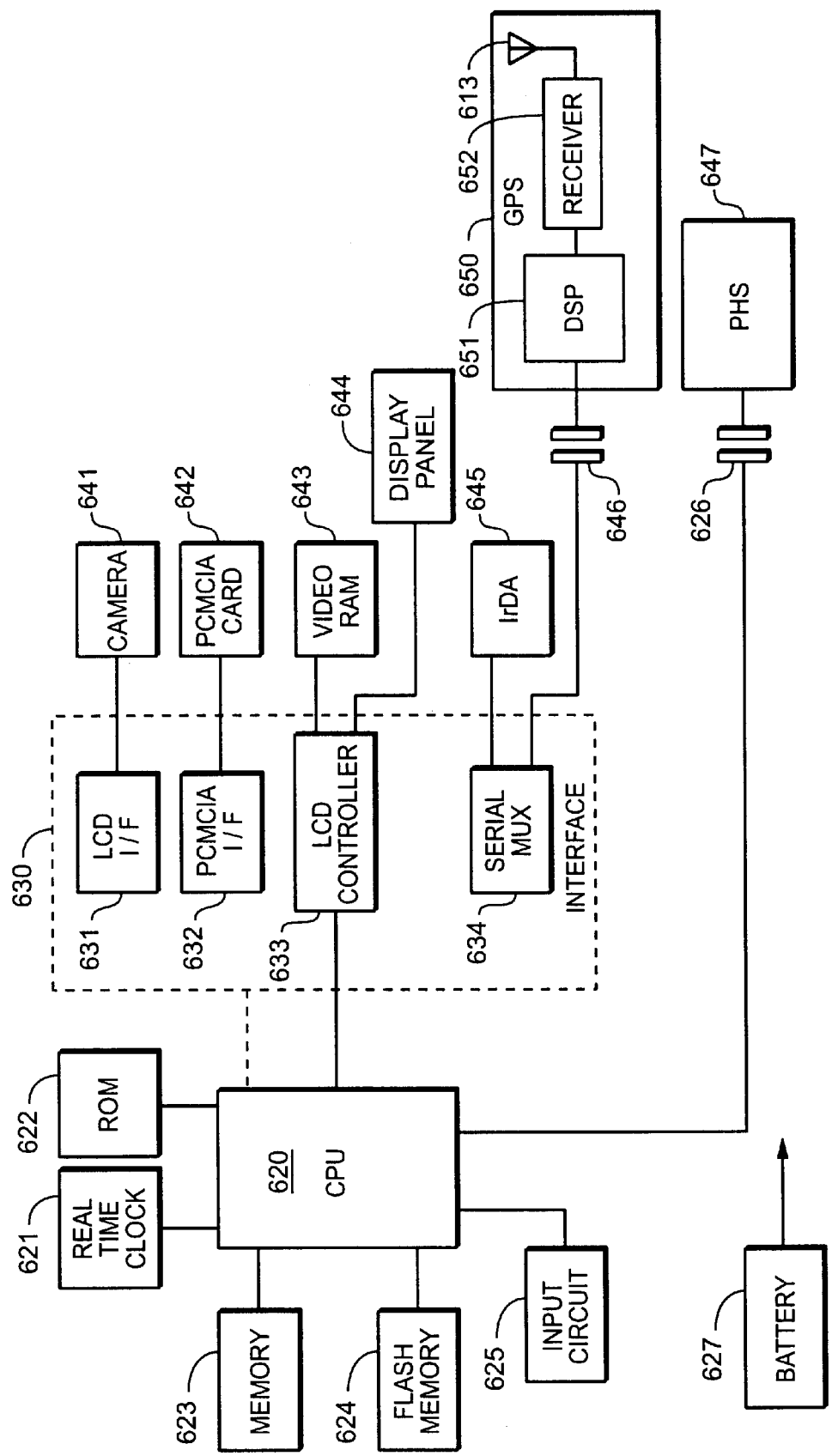
FIG._45

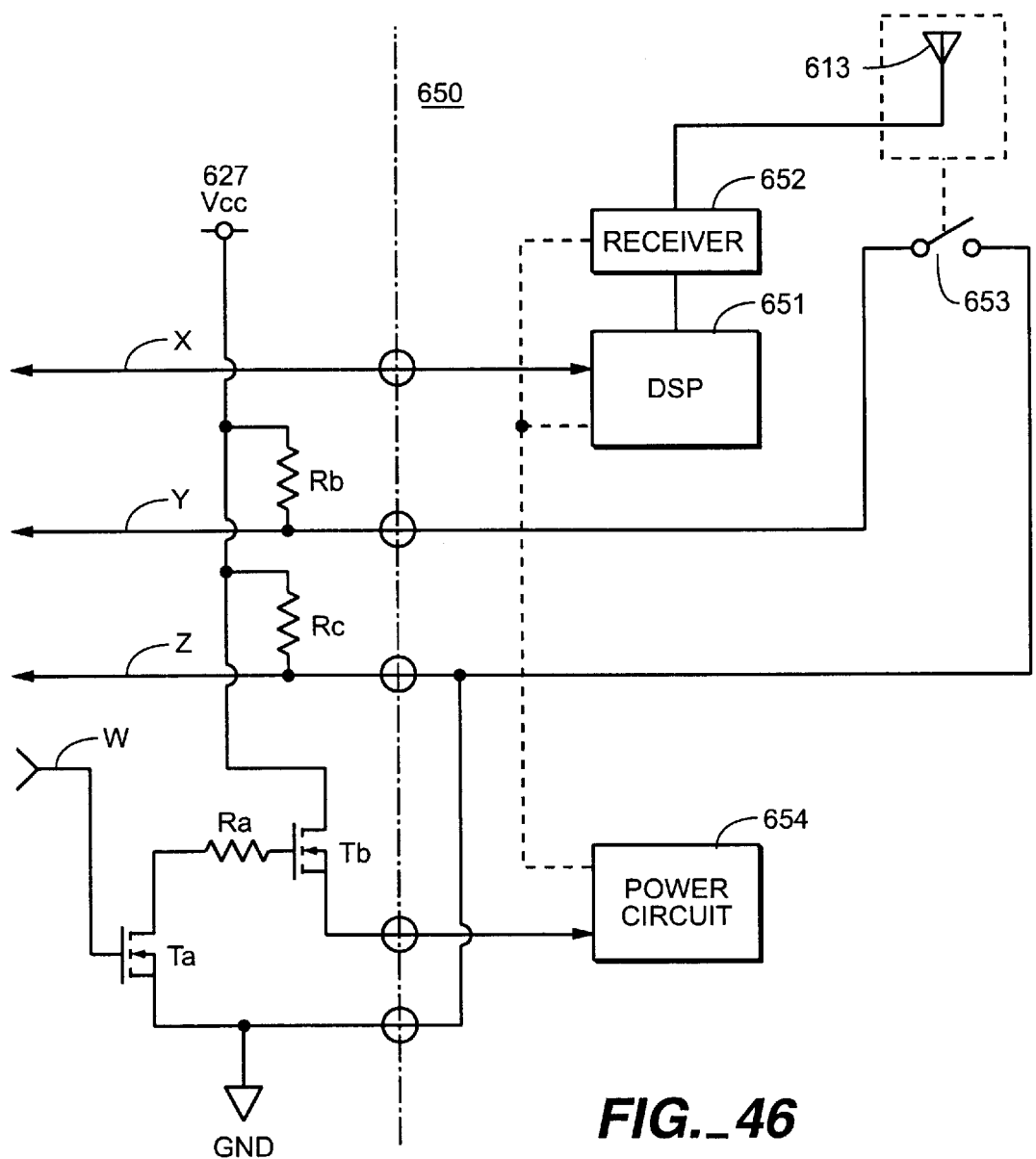
FIG._46
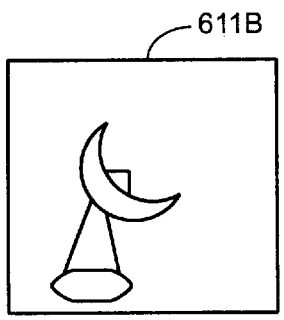
FIG._50A
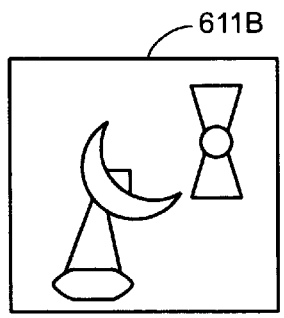
FIG._50B
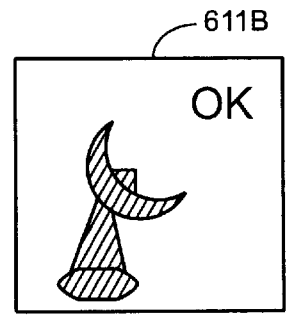
FIG._50C

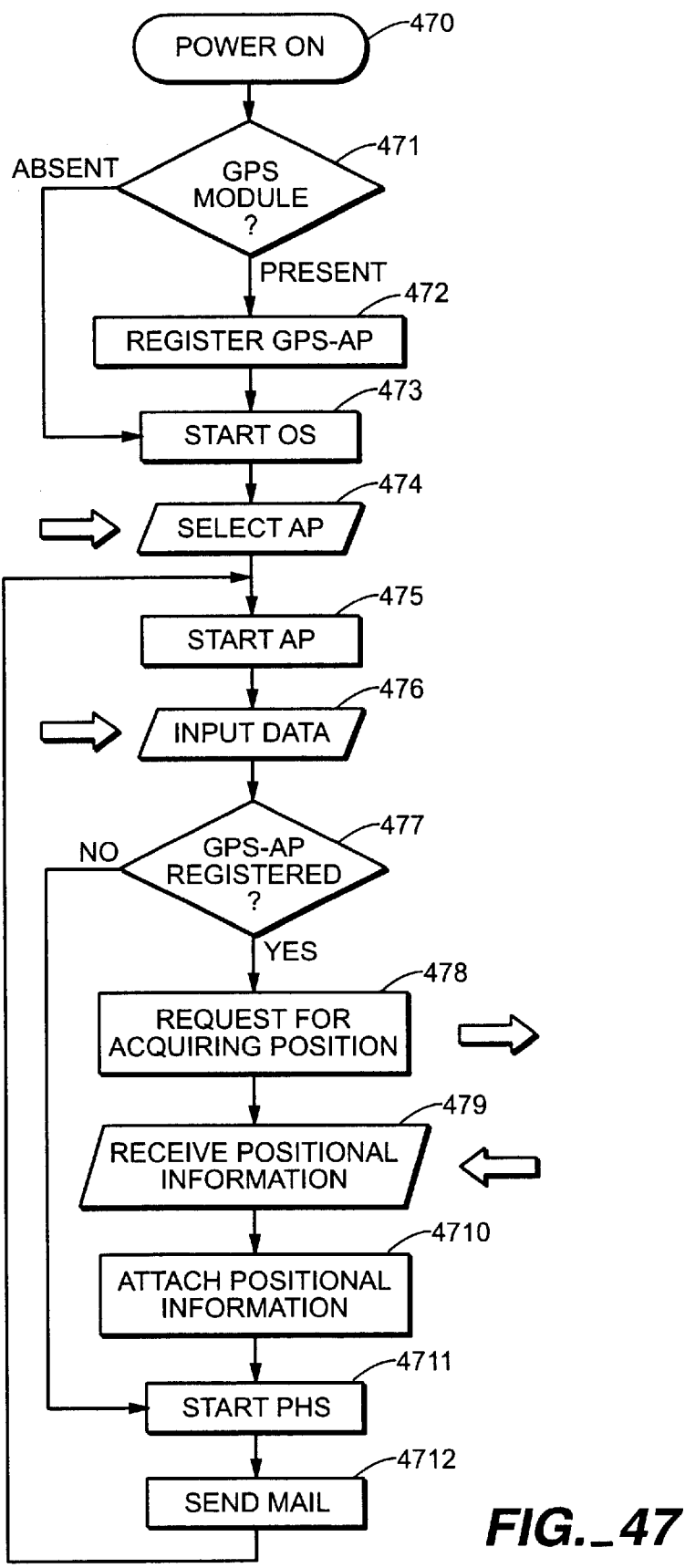
FIG._47

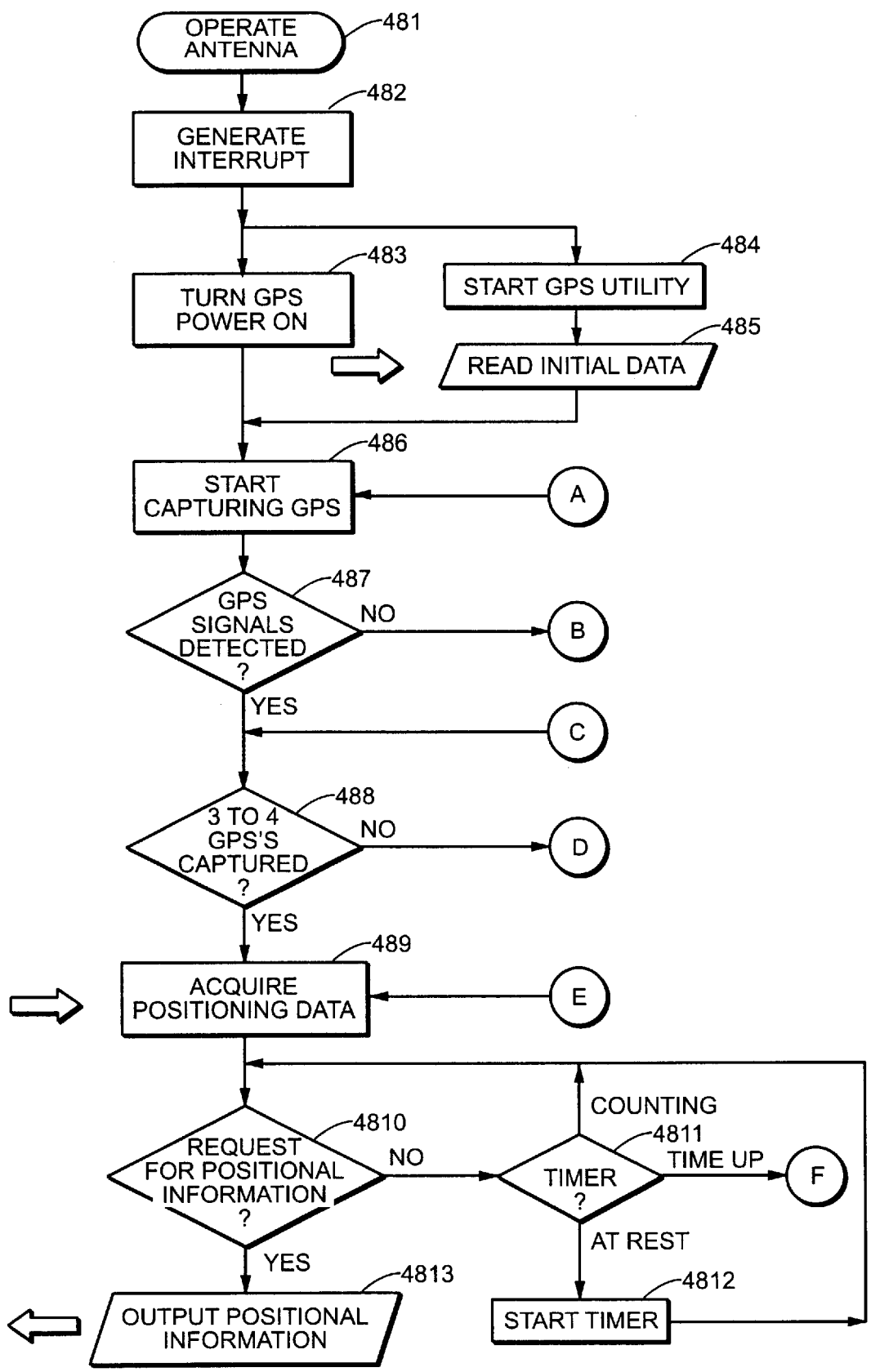
FIG._48

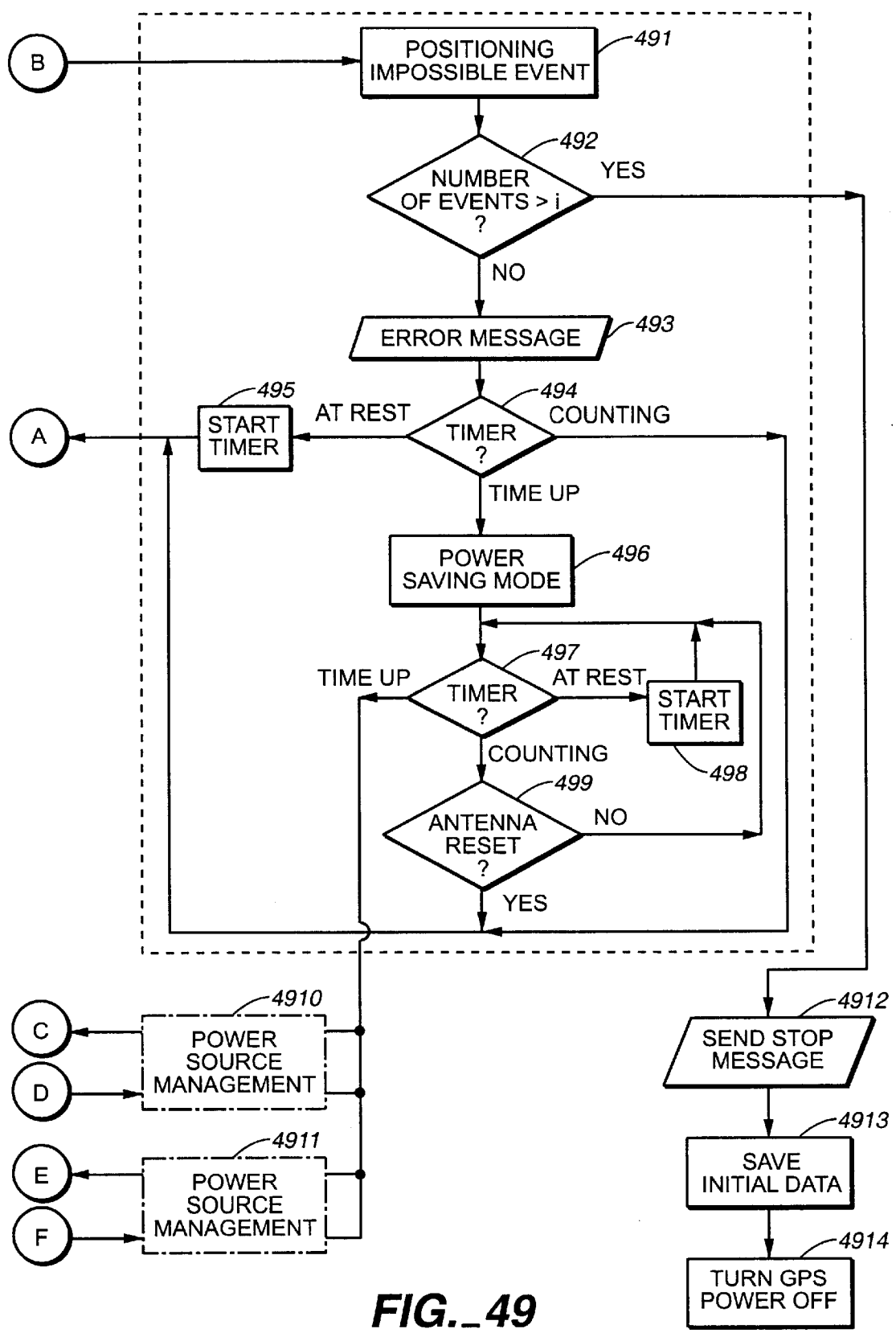
FIG._49

PORTABLE INFORMATION PROCESSING APPARATUS

CONTINUING APPLICATION DATA

This application is a divisional of pending U.S. patent application Ser. No. 09/402,183, filed Sep. 29, 1999, which is incorporated herein in its entirety by reference, and which is a 371 of PCT international application PCT/JP99/00289, filed Jan. 22, 1999, designating the United States.

TECHNICAL FIELD

The present invention relates to a small portable information processing apparatus referred to as a "personal data assistance" or a "mobile computer".

BACKGROUND ART

In a small portable information terminal referred to as a "personal data assistance" or a "mobile computer", the main unit of the apparatus is small, so that various units are externally attached as accessory units.

In general, the usability of small portable information processing apparatuses is improved by enhancing their accessory units. Hitherto, however, there has been a problem in that the usability is still unsatisfactory despite enhanced functionality.

For example, in small portable information terminals, most antenna units for receiving signals transmitted from a GPS satellite are folded against the rear surfaces of the portable information terminals as disclosed in, for instance, Japanese Unexamined Patent Publication No. 7-55910, and the antenna units are pulled out and used only when necessary. However, in the portable information terminals of such a design, the antenna units are inevitably attached even when the portable information terminals are used for other purposes than GPS. This adds to the size of the apparatus, adversely affecting the usability. There is also a danger in that the antenna units are pulled out with an undue force, damaging the antenna units; however, no considerations have been given to the inconvenience. Furthermore, no members are provided to support the antenna units, which have been pulled out, at the rear surface side, so that a small force may damage the antenna units. addition, various accessories are frequently connected to connectors in portable information processing terminals. In such a case, connector covers that cover the connectors are removed from the portable information terminals, so that there is a danger of losing the removed connector covers.

Furthermore, when portable information terminals include digitizing units for input, it is convenient if the portable information terminals are equipped with input pens. However, the input pens that can be attached to the portable information terminals are short; hence, the input pens would be conveniently used if they are retractable in about two steps. Merely attaching such input pens to the portable information terminals, however, requires users take cumbersome two steps of operation, i.e., a step of removing the input pens from the portable information terminals and another step of extending the input pens.

The conventional portable information equipment provided with built-in or installed GPS units or modules as mentioned above suffers consumption of large power by the GPS units in addition to the unsatisfactory usability set forth above. This has been posing a problem in that batteries run out quickly when the GPS units are operated with the power switch of the equipment turned ON or when the GPS units are interlocked with application software using information regarding current positions.

To operate a GPS unit, it is necessary to catch a plurality of GPS signals from radio wave sources such as a plurality of artificial satellites after turning the power of the unit ON, so that a certain time is required to acquire positioning data. Therefore, during use of predetermined application software of the information equipment, it is possible, for example, to turn the power ON to actuate the GPS unit by software when the information regarding a current position becomes necessary. This method, however, requires that a user wait for a certain time before the positional information is acquired, considerably limiting the functionality of the information equipment capable of quick information processing.

DISCLOSURE OF INVENTION

A first object of the present invention is to implement a portable information processing apparatus capable of providing good usability even when various accessories are attached to a portable information terminal.

To this end, a portable information processing apparatus in accordance with the present invention has a portable information terminal equipped with a display surface on a front side thereof, an antenna unit for receiving signals transmitted from a GPS satellite, and an attaching/detaching mechanism that allows the antenna unit to be attached or detached to or from the portable information terminal without changing a projection area from the side of the display surface.

In the specification of the present application, the portable information processing apparatus includes the portable information terminal and accessory units that are to be attached thereto, while the portable information terminal means the terminal alone, excluding the accessory units.

According to the present invention, the antenna unit can be left detached unless the portable information terminal is used for GPS, contributing to improved convenience. Moreover, the projection area from the side of the display surface remains unchanged whether the antenna unit has been removed from or attached to the portable information terminal. This means that the antenna unit does not protrude beyond the portable information terminal sideways even when the antenna unit is installed to the portable information terminal, permitting easy handling of the portable information terminal with the antenna unit attached thereto.

In the present invention, preferably, the antenna unit is equipped with a rotating center axis that permits switching between a folded state, wherein the antenna unit has been folded closely against the rear surface side of the portable information terminal, and an unfolded state wherein the antenna unit has been pulled out from the folded state, while being turned, toward the outer periphery side of the portable information terminal so that it is inclined toward the rear surface with respect to the display surface of the portable information terminal. With this arrangement, the antenna unit can be switched from the folded state to the unfolded state by simple turning the antenna unit. The antenna unit is placed closely against the rear surface of the portable information terminal in the folded state so as not to be obstructive. Furthermore, since the antenna unit is tilted toward the rear surface with respect to the display surface in the unfolded state, the antenna unit will be supported horizontally when the user tilts the portable information terminal for easier viewing of the display surface, thus providing an advantage in that the receiving sensitivity of the antenna unit will be improved.

In the present invention, it is preferable that the antenna unit is folded closely against the rear surface of the portable information terminal, being oriented widthwise, in the folded state as observed from the rotating center position where the antenna unit switches between the folded state and the unfolded state, whereas the antenna unit projects from the distal end side of the portable information terminal when it turns 90 degrees to switch from the above state to the unfolded state. With this arrangement, the antenna unit can be folded and unfolded within an easy-to-handle angle range, namely, 90 degrees, thus contributing to easier use.

In this case, it is preferable that the rotating center axis is inclined at 45 degrees as observed from the side for bisecting an angle range of switching between the folded state and the unfolded state so that the antenna unit remains at the same height widthwise whether it is in the folded state or the unfolded state.

In another mode of the present invention, it is preferable that the turning portion of the antenna unit is provided with a clicking mechanism that switches the magnitude of turning torque between the folded state and the unfolded state so as to inform the user of the completion of the folding and the position immediately before reaching the completion of the unfolding. This arrangement enables the user to adjust his or her applying force according to the clicking feel when he or she turns the antenna unit. Thus, no undue force is applied to the antenna unit, protecting the antenna unit from damage.

In another mode of the present invention, it is preferable to provide the apparatus with a portable information terminal equipped with a display surface on a front surface side thereof, an antenna unit supported by the portable information terminal such that it unfolds from the portable information terminal toward the outer periphery thereof to receive signals transmitted from a GPS satellite, and a spring installed between the antenna unit and the portable information terminal to permit given play in a direction away from the surface of the antenna unit. With this arrangement, even when a force is applied to the antenna unit, the spring absorbs the force to protect the antenna unit and the coupling section thereof from damage. This enables worry-free outdoor use, adding to convenience.

In still another mode of the present invention, a portable information terminal equipped with a display surface on a front surface side thereof and a connector for connecting a unit in an opening in a side surface thereof is provided with a rubber connector cover for covering the opening, the connector cover being retained on the portable information terminal when the connector cover is removed from the opening to release the opening. This obviates the need for removing the connector cover, which covered the connector, from the portable information terminal. Hence, even when various units adapted to be attached as accessories are frequently attached to or detached from a connector, chances of losing the connector cover can be eliminated, contributing to improved usability.

Preferably, the connector cover removed from the opening is placed under the bottom surface of a unit which is attached to the portable information terminal and electrically connected to the connector so that it is used as a rubber foot.

In yet another mode of the present invention, there is provided a portable information processing apparatus having a portable information terminal equipped with a display surface and a digitizing unit for input on a front side thereof, and an input pen housed in an opening of the portable information terminal, wherein the input pen extends while being held in the opening of the portable information terminal when it is subjected to a force for pulling it out of the opening, then it comes off the portable information terminal. With this arrangement, by simply pulling the input pen, the input pen can be removed from the portable information terminal after it has been extended. Thus, only one step of operation is required, adding to convenience.

A further mode of the present invention has a portable information terminal equipped with a display surface on a front side thereof, and a GPS unit detachably installed on the terminal by being folded closely against the rear surface of the terminal, wherein the GPS unit is formed of a support assembly which has a pair of right and left arms extending forward from a main unit and which can be detachably mounted on a rear surface of the portable information terminal, and an antenna unit which is positioned between the paired arms of the support assembly, a rear end portion thereof being rotatably attached to the distal ends of the arms, and which turns toward the support assembly to be folded and held between the paired arms, while it turns in the opposite direction to be brought out to the front of the support assembly. This arrangement of the GPS unit enables the GPS unit to remain detached until it becomes necessary to use the GPS unit, thus contributing to convenience. Moreover, the GPS unit hardly protrudes beyond the portable information terminal, permitting easy handling even when the GPS unit has been attached to the portable information terminal.

Preferably, the portable information processing apparatus has a locking mechanism that locks the antenna unit with a click at a predetermined angle with respect to the support assembly when the antenna unit is turned to the front of the support assembly. With this arrangement, the antenna unit can be stably retained in a position most advantageous from the viewpoint of the receiving characteristic thereof, permitting use with maximum performance displayed.

Preferably, the locking mechanism unlocks if an undue force is applied to the antenna unit so as to allow the antenna unit to turn, and it recovers the locking function when the antenna unit is put back in place. With this arrangement, the antenna unit is not subjected to an undue force and the antenna unit is therefore protected from damage.

To install the rear end of the antenna unit to a distal end of an arm, an insertion hole partly having a larger diameter is formed in an inner side surface of the distal end of the arm of the support assembly, a shaft is protuberantly provided on the side surface of the rear end of the antenna unit, and a cam acting as a part of the locking mechanism is provided on the distal end of the shaft. The outer periphery of the cam is partly provided with locking protuberances. Preferably, the protuberances are aligned with the larger-diameter portion when the antenna unit has been turned to a position where the antenna unit is not normally used, so that the shaft and the cam can be inserted in the insertion hole, and the rear end of the antenna unit is rotatably attached to the distal end of the arm. This arrangement permits easy installation despite the presence of the cam. Furthermore, firm installation is possible because the side surface portion of the arm is clamped between the protuberance of the cam and the side surface of the rear end of the antenna unit, preventing the shaft from shifting in an axial direction (in a direction of insertion in the hole or a pulling-out direction) during normal use.

Further preferably, the distal ends of the paired right and left arms of the support assembly are interconnected with a coupling plate. With this arrangement, the wide spacing between the paired right and left arms can be controlled by the coupling member, thus allowing the antenna unit to be securely held between the paired right and left arms.

A second object of the present invention is to provide a new configuration of a portable information processing apparatus equipped with a central processing unit for performing information processing and a GPS unit for receiving GPS signals, the new configuration permitting minimized power consumption attributable to the GPS unit and also avoiding impairing usability or functionality of the apparatus.

Means taken by the present invention to attain the object mentioned above is a portable information processing apparatus equipped with: a central processing unit; a GPS unit which is provided with an antenna for receiving GPS signals and receives the GPS signals under control by the central processing unit to provide positioning data; power supplying/interrupting means for supplying or interrupting power to the GPS unit; interrupt signal generating means for generating an interrupt signal to the central processing unit when the antenna is operated to a predetermined state; and GPS controlling means for starting supply of power to the GPS unit by the power supplying/interrupting means, when the interrupt signal is generated, so as to actuate the GPS unit.

By this means, the interrupt signal of the central processing unit is generated by operating the antenna to thereby start the supply of power to the GPS unit to actuate the GPS unit, so that the GPS unit can be started in advance by operating the antenna independently of the operation of a main unit (a portable information terminal) so as to acquire positioning data beforehand; hence, the positioning information can be used when it becomes necessary. This makes it possible to suppress power consumption in the GPS unit when not necessary; therefore, the amount of consumed power can be reduced, and when necessary, the GPS unit can be actuated beforehand at an appropriate timing, irrelevantly of the operation of the main unit, permitting a shortened waiting time for acquiring the positional information.

Preferably, the above predetermined state is a state wherein the antenna is ready to receive the GPS signals. By this means, when the antenna is set ready for receiving the signals, power is supplied to the GPS unit by the GPS controlling means and the GPS unit begins operation; hence, the GPS controlling means can be started simply by antenna operation, which is basically required, before the GPS is actuated. This permits improved operability. The antenna is configured so that it can be relatively folded onto or unfolded from the apparatus main unit, and the above predetermined state is preferably a state wherein the antenna has been unfolded from the apparatus main unit to ensure successful reception of the GPS signals.

Preferably, in the means set forth above, the GPS controlling means is configured so that one or a plurality of attempts for capturing the GPS signals by the GPS unit are repeated if the GPS signals are not captured by the GPS unit. By this means, if the GPS signals cannot be captured by the GPS unit for any reason, then the possibility of capturing the signals can be enhanced by the repetition of the capturing operation. In this case, it is further desirable that operation be shifted to a power saving mode or the supply of power be cut off after the operation of capturing the GPS signals is repeatedly attempted a predetermined number of times, as described in claim 18, so as to enhance the possibility of capturing the signals and to suppress power consumption at the same time.

Preferably, in the above means, the GPS controlling means is configured so that it causes the GPS unit to shift from a normal mode to the power saving mode or the supply of power to the GPS unit is cut off if the GPS signals are not captured by the GPS unit. According to this means, if the GPS signals cannot be captured due to an environment where no GPS signals can be captured or for some other reason, then the operation mode is automatically switched to the power saving mode or the supply of power to the GPS unit is cut off, thus avoiding consumption of wasteful power.

Further preferably, in such cases, the GPS controlling means is configured so that, if the GPS signals cannot be captured by the GPS unit, it displays to that effect. By this means, if the GPS signals cannot be captured, then a display to that effect is given to enable an operator to immediately know the capture failure and to easily take an action to deal with the situation.

Further preferably, the GPS controlling means is configured to display the operational suspension of the GPS unit implemented in association with the shift of the GPS unit to the power saving mode or the interruption of the supply of power to the GPS unit. In this case, the operator can immediately recognize the power saving mode or the cutoff of power of the GPS unit, so that he or she can easily take an action to deal with the situation.

Further preferably, the GPS controlling means is configured to display distinguishably whether or not power is being supplied to the GPS unit at any given time at least while the apparatus main unit is in operation. This means enables the operator to easily find whether the antenna has to be actuated again by checking whether power is being supplied to the GPS unit. In this case, it is further desirable that whether power is being supplied is constantly displayed in parallel with the display of the apparatus main unit so as to improve operability.

Further preferably, the GPS controlling means is configured to display the operating state of the GPS unit at any given time at least while the GPS unit is in operation. This means enables the operator to find the possibility of acquiring positional information at will by displaying the operating state of the GPS unit. In this case also, it is further desirable to constantly display the foregoing operating state in parallel with the display of the apparatus main unit so as to improve operability.

In this case, it is further desirable that the GPS controlling means is configured to distinguishably display, as the operating states of the GPS unit, a state wherein the GPS unit is operating in the power saving mode, a state wherein the GPS unit is capturing the GPS signals, and a state wherein the GPS signals have been captured by the GPS unit or the positioning data or the positional information has been acquired.

Preferably, in the three means set forth above, the GPS controlling means is configured to provide the above display regarding the GPS unit in a predetermined display section independent of processing contents or processing results, which are given by the central processing unit, in a display region configured to display the processing contents or the processing results. Thus, the display regarding the GPS unit can be provided independently in the display region for displaying the processing contents or the processing results obtained by the central processing unit, allowing a user to acquire information concerning various states of the GPS unit irrelevantly of the operating state of the apparatus main unit. This makes it possible to take appropriate action for each state of the GPS unit at an appropriate timing convenient to the user.

Further preferably, the GPS unit is configured as an additional unit that can be attached to or detached from the main unit, and the GPS controlling means is configured so that it can be operated by the central processing unit only if the GPS unit has been attached.

In this case, it is desirable to provide unit detecting means for detecting whether the GPS unit has been attached, and it is further desirable to make setting so that whether the actuation of the GPS controlling means implemented by the central processing unit should be performed or not is decided according to a detection state of the unit detecting means. In this case, even if the interrupt signal is generated, the GPS controlling means is not actuated in a state wherein the GPS unit has not been detected by the unit detecting means.

Furthermore, there is provided a portable information processing apparatus equipped with: a central processing unit; a GPS unit which is equipped with an antenna for receiving GPS signals and controlled by the central processing unit to receive the GPS signals so as to acquire positioning data; power supplying/interrupting means for supplying or interrupting power to the GPS unit; interrupt signal generating means for generating an interrupt signal to the central processing unit when the antenna is set to a predetermined state; power saving means for stopping or slowing an internal clock of the GPS unit to place the GPS unit in a power saving mode; and GPS controlling means for clearing the power saving mode and actuating the GPS unit when the interrupt signal is generated.

This means makes it possible to reduce power consumption by placing the GPS unit in the power saving mode by the power saving means. In addition, since the power saving mode is cleared by the GPS controlling means when the GPS antenna is operated, the GPS unit can be operated at an appropriate timing independently of the state of the apparatus main unit. At this time, it is desirable, from the standpoint of power saving, that the GPS unit is normally in the power saving mode implemented by the power saving means, that is, for example, immediately after a start or if the GPS unit is not used for a predetermined time, then the GPS unit is placed in the power saving mode, and the power saving mode is cleared by the GPS controlling means only when the antenna is operated.

BRIEF DESCRIPTION OF THE DRAWINGS

FIG. 1 is a perspective view, as observed from a front surface side, of a handy-type portable information terminal to which the present invention has been applied.

FIG. 2 is a perspective view, as observed from a rear surface side, of the portable information terminal shown in FIG. 1.

FIG. 3 is a schematic representation illustrative of an outline of the portable information terminal shown in FIG. 1 and accessory units that can be attached to the portable information terminal.

FIG. 4 is a block diagram of the portable information terminal shown in FIG. 1.

FIG. 5 is a block diagram illustrating a system configuration of software in the portable information terminal shown in FIG. 1.

FIG. 6 is a perspective view, as observed from a top surface side, of a GPS unit which is attached to the portable information terminal shown in FIG. 1 and against which an antenna unit has been folded.

FIG. 7 is a perspective view, as observed from a bottom surface side, of the GPS unit which is attached to the portable information terminal shown in FIG. 1 and against which the antenna unit has been folded.

FIG. 8 is a perspective view, as observed from the bottom surface side, of the portable information terminal shown in FIG. 1 to which the GPS unit has been attached.

FIG. 9 is a perspective view, as observed from the top surface side, of the GPS unit which is to be attached to the portable information terminal shown in FIG. 1 and from which the antenna unit has been unfolded.

FIG. 10 is a perspective view, as observed from the bottom surface side, of the GPS unit which is to be attached to the portable information terminal shown in FIG. 1 and from which the antenna unit has been unfolded.

FIG. 11 is a perspective view, as observed from the bottom surface side, of the GPS unit which has been attached to the portable information terminal shown in FIG. 1 and from which the antenna unit has been unfolded.

FIG. 12 is a top plan view of the GPS unit which has been attached to the portable information terminal shown in FIG. 1 and from which the antenna unit has been unfolded.

FIG. 13 is a side view illustrating the GPS unit which has been attached to the portable information terminal shown in FIG. 1 and from which the antenna unit has been unfolded.

FIGS. 14(A), (B), (C), (D), and (E) are a top plan view, a rear view, a front view, a right side view, and a sectional view taken along the line Q–Q', respectively, of the antenna unit of the GPS unit to be attached to the portable information terminal shown in FIG. 1.

FIG. 15 is an exploded perspective view of the GPS unit to be attached to the portable information terminal shown in FIG. 1.

FIG. 16 is a perspective view of a rotary unit used for the GPS unit shown in FIG. 15.

FIG. 17 is a perspective view showing an internal structure of the antenna unit of the GPS unit to be attached to the portable information terminal shown in FIG. 1.

FIG. 18 is a sectional view showing a vicinity of a communication connector formed in the portable information terminal shown in FIG. 1.

FIG. 19 is a perspective view of a connector cover covering an opening for access to the communication connector shown in FIG. 18.

FIG. 20 is a sectional view showing a state wherein the opening for access to the communication connector constructed in the portable information terminal shown in FIG. 1 has been released.

FIG. 21 is a perspective view, as observed from above, of a PHS unit which is to be attached to the portable information terminal shown in FIG. 1 and connected to the communication connector.

FIG. 22 is a perspective view, as observed from below, of the PHS unit which is to be attached to the portable information terminal shown in FIG. 1 and connected to the communication connector.

FIG. 23 is a perspective view, as observed from above, of the PHS unit which has been attached to the portable information terminal shown in FIG. 1.

FIG. 24 is a sectional view of the PHS unit which has been attached to the portable information terminal shown in FIG. 1.

FIG. 25 is a sectional view showing a vicinity of a flash card mounting slot in the portable information terminal shown in FIG. 1.

FIG. 26 is a perspective view showing a state wherein a side cover has been opened to mount the flash card in the portable information terminal shown in FIG. 1.

FIG. 27 is a perspective view showing a state wherein the side cover has been opened and a pinch plate of a card attaching/detaching member has been set down outward in order to mount the flash card in the portable information terminal shown in FIG. 1.

FIG. 28 is a perspective view showing a state wherein the side cover has been opened, the pinch plate of a card attaching/detaching member has been set down outward, and the flash card is being pulled out while holding the pinch plate, in order to mount the flash card in the portable information terminal shown in FIG. 1.

FIG. 29 is a perspective view of the card attaching/detaching member used for attaching and detaching the flash card in the portable information terminal shown in FIG. 1.

FIG. 30 is a perspective view of a board unit for receiving the flash card in the portable information terminal shown in FIG. 1.

FIG. 31 is a perspective view showing a state wherein the card attaching/detaching member has been mounted on the board unit for receiving the flash card in the portable information terminal shown in FIG. 1.

FIG. 32 is a perspective view showing a GPS unit of another mode of the present invention.

FIG. 33 is a perspective view showing the GPS unit of FIG. 32 in which the antenna unit has been folded.

FIG. 34 is an exploded perspective view of a support assembly of the GPS unit of FIG. 32.

FIG. 35 is a top plan view showing the interior of the support assembly of the GPS unit of FIG. 32.

FIG. 36 is a perspective view, as observed from a rear surface side, of the GPS unit of FIG. 32.

FIG. 37 is a perspective view showing a state wherein the GPS unit of FIG. 32 has been attached to the portable information terminal, with the antenna unit folded.

FIG. 38 is a perspective view showing a state wherein the GPS unit of FIG. 32 has been attached to the portable information terminal, with the antenna unit in operation.

FIG. 39 is a perspective view showing the details of the support assembly of the GPS unit of FIG. 32 and a mounting portion of the antenna unit.

FIG. 40 is a sectional view showing the details of a part of the mounting portion of FIG. 39.

FIG. 41 is a perspective view showing the details of a locking mechanism of the GPS unit of FIG. 32.

FIG. 42 is a perspective view for explaining the operation of the locking mechanism of FIG. 41.

FIG. 43 is a perspective view for explaining the operation of the locking mechanism of FIG. 41 as in FIG. 42.

FIG. 44 is a perspective view for explaining the operation of the locking mechanism of FIG. 41 as in FIG. 42 and FIG. 43.

FIG. 45 is a schematic block diagram showing an entire configuration of still another working mode of the present invention.

FIG. 46 is a schematic circuit diagram showing the GPS unit in FIG. 45 and a circuit configuration of a connection to the GPS unit.

FIG. 47 is a schematic flowchart illustrating a flow of the operation of a main unit in FIG. 45.

FIG. 48 is a schematic flowchart illustrating a major section of a procedure for acquiring positional information by the GPS unit in FIG. 45 and a CPU of the main unit.

FIG. 49 is a schematic flowchart illustrating contents of a portion related to power management in the procedure for acquiring the positional information by the GPS unit in FIG. 45 and a CPU of the main unit.

FIG. 50 is a schematic representation illustrating display contents of a GPS display section in a display panel provided on the front of the main unit of the working mode shown in FIG. 45, the display contents showing different operational situations of a GPS module.

BEST MODE FOR CARRYING OUT THE INVENTION

Referring to the accompanying drawings, a portable information processing apparatus to which the present invention has been applied will be described.

FIG. 1 is a perspective view, as observed from the front surface side, of a handy-type portable information terminal to which the present invention has been applied, and FIG. 2 is a perspective view thereof as observed from the rear surface side.

FIG. 3 is a schematic representation illustrating an outline of the handy-type portable information terminal to which the present invention has been applied, and accessory units that can be attached to the portable information terminal.

Referring to FIG. 1 through FIG. 3, a portable information terminal 10 of this mode has a flat, box-type main unit housing 9, an LCD unit (liquid crystal display unit) 8 for display output and a digitizing unit (touch panel) 7 for input being disposed in an overlapping fashion at the side of a front surface 9a. A stop 221 for a camera is also disposed on the front surface 9a of the main unit housing 9.

An infrared communication unit 6 capable of exchanging data with another portable information terminal is disposed on an upper side surface 9c of the main unit housing 9. A communication connector 5 conforming to a predetermined standard such as RS232C, USB (universal serial bus), or the like is disposed at a lower side surface 9d such that it is included in the main unit housing 9. Hence, a portable telephone 12 can be connected to the communication connector 5 via an adapter 13, permitting data exchange with another personal computer or the like via a public telephone network. Moreover, connection to a computer network such as the Internet is possible by making dial-up connection. Likewise, connection via a PHS calling device 14 and a connector 15 is also possible. Furthermore, when a PHS unit 16 which is equipped with a PHS feature and exclusively used with the apparatus is attached, the portable information terminal 10 itself of this mode can be used as a PHS calling apparatus by using a speaker 4 and a microphone 3 disposed at the top and the bottom, respectively, of the LCD unit 8, or data can be transmitted and received via a PHS network. In addition, a PC coupling cable 17 can be connected to the communication connector 5 so as to locally exchange data with another personal computer. It is also possible to implement data communication via a modem by connecting a modem coupling cable 18. Furthermore, the portable information terminal 10 of this mode also includes, in the main unit housing 9, a unit 2 serving as a communication unit that permits data exchange by wireless, so that data exchange can be implemented while moving with the main unit alone.

A mounting slot 21 in which a flash card 20 can be installed is disposed inside a side cover 91 on a right side surface 9e of the main unit housing 9. A lens 22 for a camera is disposed beside the mounting slot 21 for the flash card 20, so that pictures of ambient scenery or persons can be taken by a CCD or the like through the lens 22.

A power port 1 through which a built-in battery can be charged from a charger 19 is disposed in a left side surface 9*f* of the main unit housing 9. A power switch 101 is also disposed on the left side surface 9*f* of the main unit housing 9, a multi-controller 102 being disposed beside the power switch 101. By turning the multi-controller 102, a menu can be selected or a parameter can be entered on a screen on the LCD unit 8, and a decision can be confirmed by pressing the multi-controller 102. In other words, the multi-controller 102 also acts as a decision button. Furthermore, a finder 222 for a camera is disposed beside the multi-controller 102.

A GPS unit 11 capable of measuring its own present location by capturing radio waves from a GPS (global positioning system) satellite, which will be discussed in more detail hereinafter, can be attached to or detached from a rear surface 9*g* of the main unit housing 9. A battery pack 501 is housed inside the rear surface 9*g* of the main unit housing 9, reference numeral 103 denoting the surface of the battery pack itself. The rear surface 9*g* of the main unit housing 9 has two protuberances, 104 and 105, for holding the rear surface 9*g* of the main unit housing 9 slightly above a desk surface when the portable information terminal 10 is placed on a desk or the like.

FIG. 4 schematically shows the configuration of the portable information terminal of this mode. The portable information terminal 10 is provided with: a ROM 32 capable of storing an operating system (OS), a shell system, an application program, etc.; a CPU 31 capable of loading and executing the programs stored in the ROM 32; a RAM 33 providing a storing area during execution; and an internal storage (flash memory) 34 providing a storing area for document or image files created using the application program, these components being interconnected by an internal bus 35. Furthermore, the LCD unit 8 acting as a display device and the digitizing unit 7 acting as an input device are also connected via the internal bus 35. As mentioned above, the portable information terminal 10 of this mode is equipped with, in addition to the above components: a communication unit 36 for communicating with another personal computer by using infrared communication, serial communication, and radio communication; the GPS unit 11 capable of capturing radio waves from a satellite to determine its own position; a camera unit 37 permitting image information to be acquired using a camera; and a voice unit 38 having a voice memo feature for recording voice or other sound by using the microphone 3 and the speaker 4, these components being connected to the CPU 31 via the internal bus 35 and controlled by the CPU 31.

FIG. 5 is a block diagram showing system configuration of software in the portable information terminal of this mode. An OS 50 of the portable information terminal of this mode is provided with controllers and drivers for controlling the foregoing units. Through the OS 50, an application program 60 and a shell system 70 are able to control the units. More specifically, the OS 50 is equipped with: a display driver 51 capable of displaying images on the LCD unit 8; a touch panel controller 52 capable of processing data entered through the digitizing unit 7 and supplying the processed data to the application program 60 and the shell system 70; a communication controller 53 capable of data exchange by controlling the communication unit 36 that includes an infrared interface 6, a serial interface 5, and an interface 2 using radio transmission; a GPS controller 54 capable of implementing radio wave positioning by controlling the GPS unit 11; a camera controller 55 capable of supplying image data obtained using the camera unit 37 to the application program 60 or the shell system 70 in an appropriate data format; and a voice controller 56 capable of inputting/outputting and recording voice data by using the voice unit 38 such as the microphone 3 and the speaker 4. The shell system 70 and the application program 60 run on the OS 50 that supports the basic features of the portable information terminal 10.

In the portable information terminal 10 of this mode, five pieces of software, namely, a navigation 61, a browser 62, memo and mail creating software 63, scheduler 64, and an address book 65, are installed as the application software 60 at the time of delivery. The navigation 61 is a map viewer capable of displaying a present location measured by the GPS unit 11 on a map and also displaying various types of position-related information of a neighborhood of the present location, including restaurants, shops, toilets, etc. The browser 62 is capable of displaying information provided by a WWW server opened on the Internet; it acquires information by accessing the Internet via the communication unit 36. The memo and mail creating software 63 is a piece of software equipped with a function as a word processor. The memo and mail creating software 63 in this mode is able to handle image data, voice data, etc. in addition to text data; it is able to edit these types of data and exchange data with other users via the Internet. The scheduler 64 is equipped with a function whereby user's schedules are registered and audio or display notices, or other type of appropriate means of notice is given to the user when a registered time is reached. The address book 65 is capable of managing telephone numbers, Internet addresses, or the like of other users. The address book 65 of this mode is employed to supply the address of an addressee when sending a mail from the mail software 63 via the Internet or to enter a telephone number of the party on the other end when making a call by using the PHS feature.

(Installing the GPS unit to the portable information terminal)

FIG. 6 and FIG. 7 are a perspective view as observed from above and a perspective view as observed from below, respectively, of the GPS unit 11 with the antenna unit folded.

Referring to FIG. 6 and FIG. 7, the GPS unit 11 attached to or detached from the rear surface 9*g* of the portable information terminal 10 is roughly formed of a circuit unit 111, which includes a receiving circuit, and an antenna unit 112 rotatably coupled to the circuit unit 111, an antenna assembly being incorporated in the antenna unit 112. The circuit unit 111 is formed of a rectangular portion 113, wherein mainly a receiving circuit is housed, and a protruding portion 114 that projects from an end of the rectangular portion 113 and has a coupling portion 110 for connection with the antenna unit 112. The antenna unit 112 is placed in the space formed by the protruding portion 114 and the rectangular portion 113, so that the entire GPS unit 11 has a rectangular, flat shape.

In the GPS unit 11, the circuit unit 111 is attached to or detached from the rear surface 9*g* of the main unit housing 9 of the portable information terminal of this mode. To be more specific, in the circuit unit 111, a circuit case 115 is covered with a metallic covering member 116 serving also as a shielding plate. Two hooks 121 and 122 jut out from a side edge of the shielding plate 116, and a hand screw 123 projects from an end on the opposite side of the shielding plate 116, a large-diameter head of the hand screw 123 jutting out of an opening 117 in a side surface of the circuit unit 111. Further, a connector 131 electrically connected to the receiving circuit included in the circuit unit 111 protrudes from the shielding plate 116.

As can be seen in FIG. 2, engaging holes 124 and 125 in which the two hooks 121 and 122 projecting from the circuit unit 111 of the GPS unit 11 are fitted, respectively, are formed in the rear surface 9g of the main unit housing 9 of the portable information terminal 10. In an end on the opposite side, a tapped hole 126 in which the shank of the hand screw 123 projecting from the circuit unit 111 is fitted is formed. Furthermore, a connector hole 132 is formed in the rear surface 9g of the main unit housing 9, at a position aligned to the connector 131 formed on the circuit unit 111. Hence, when the GPS unit 11 is attached to the rear surface 9g of the main unit housing 9 of the portable information terminal 10, with the antenna unit 112 placed in the space formed by the protruding portion 114 and the rectangular portion 113 of the circuit unit 111, the GPS unit 11 is completely hidden behind the rear surface of the main unit housing 9 of the portable information terminal 10. To attach the GPS unit 11 as mentioned above, the top surface (the surface facing the shielding plate 116) of the circuit unit 111 is attached to the rear surface 9e of the main unit housing 9 such that the two hooks 121 and 122 jutting out of the top surface of the circuit unit 111 of the GPS unit 11 are fitted in the engaging holes 124 and 125, respectively, formed in the rear surface 9g of the main unit housing 9 of the portable information terminal 10. This causes the connector 131 to fit in the connector hole 132. The large-diameter portion of the hand screw 123 protruding from the side surface of the circuit unit 111 is turned by a fingertip to lock the hand screw 123 in the tapped hole 126. Thus, the circuit unit 111 of the GPS unit 11 is completely fixed to the rear surface 9g of the main unit housing 9 as shown in FIG. 8. Under this condition, the circuit unit 111 and the antenna unit 112 of the GPS unit 11 are completely attached to the rear surface 9g of the main unit housing 9. The antenna unit 112 in a folded state partly covers the rear surface 9g of the main unit housing 9 widthwise as observed from the coupling portion 110 (rotating center point) for connection with the circuit unit 111. Hence, when only the main body section of the portable information terminal 10 is used without using the GPS unit 11 for a while, the GPS unit 11 is not obstructive. The GPS unit 11 can be easily removed from the rear surface 9g of the main unit housing 9 by loosening the hand screw 123. This means that, in the present mode, an attaching/detaching mechanism that allows the GPS unit 11 (antenna unit 112) to be attached to or detached from the main unit housing 9 is formed by utilizing the hand screw 123, the two hooks 121 and 122, and the engaging holes 124 and 125. Thus, in the portable information terminal 10 of this mode, the GPS unit 11 is mounted only when necessary, so that the advantages, such as the small size and light weight can be gained in daily use of the portable information terminal 10.

In the GPS unit 11 configured as set forth above, the antenna unit 112 placed in the space, which is formed by the protruding portion 114 and the rectangular portion 113 of the circuit unit 111, can be pulled out by turning the antenna unit 112 by approximately 90 degrees around the coupling portion 110 for connection with the circuit unit 111 as shown in FIG. 9 and FIG. 10.

The circuit unit 111 incorporates a microswitch (not shown) that monitors the folding and unfolding of the antenna 112 by a protuberance 141 which is formed on a side surface of the antenna unit 112 and which moves into or out of an opening 142 of the circuit unit 111 as the antenna unit 112 is folded or unfolded. Therefore, the moment the antenna unit 112 is unfolded, the receiving circuit in the circuit unit 111 turns ON, permitting radio waves from a satellite to be received immediately.

When the antenna unit 112 is unfolded as mentioned above, the antenna unit 112 projects from the upper side surface 9c of the main unit housing 9 of the portable information terminal 10 as shown in FIG. 12 and FIG. 13. Furthermore, when the antenna unit 112 is expanded outside the upper side surface 9c of the main unit housing 9, the antenna unit 112 is tilted approximately 20 degrees toward the rear surface with respect to the front surface 9a (the display surface of the LCD unit 8) of the main unit housing 9. Hence, as shown in FIG. 13, when the user holds the portable information terminal 10 in his or her hand and tilts it for easier viewing of the display surface of the LCD unit 8, the antenna unit 112 is positioned exactly horizontally, which is ideally suited for receiving radio waves (signals) from the satellite.

To perform the turning, in the GPS unit 11 of the present mode, a turn central axis L of the antenna unit 112 is inclined as it will be described with reference to FIG. 14. More specifically, the turn central axis L of the antenna unit 112 is inclined with respect to a normal line relative to the bottom surface of the antenna unit 112 which is parallel to the rear surface 9g of the main unit housing 9, with the GPS unit 11 attached to the rear surface 9g of the main unit housing 9, as observed from side (refer to FIGS. 14(A), (B), and (C)) or as observed from front (refer to FIGS. 14(A) and (D)) FIGS. 14A–14E. Accordingly, the turn central axis L is inclined at 45 degrees as observed from a direction for bisecting an angle range in which switching is made between the folded state (refer to FIG. 6, FIG. 7, and FIG. 8) and the unfolded state (refer to FIG. 9, FIG. 10, FIG. 11, FIG. 12, and FIG. 13). Hence, the antenna unit 112 is held at the same height widthwise whether it is in the folded state or the unfolded state; it does not tilt widthwise. More specifically, differently from this mode, if the turn central axis of the antenna unit 112 is inclined merely sideways or front, then the drawing out the antenna unit 112 while turning it rightward would cause the antenna unit 112 to be drawn out in a state where the antenna unit 112 lowers on the right side, preventing the antenna unit 112 from being oriented directly above, although the GPS unit 11 (the antenna unit 112) may partly cover the rear surface 9g of the main unit housing 9.

To set the turn central axis L, the GPS unit 11 is designed as follows in this mode.

FIG. 15 is an exploded perspective view of the GPS unit 11. In FIG. 15, the antenna unit 112 is formed of an aluminum covering member 151 serving also as a reflector, a rotary unit 160, an antenna member 152, and an antenna case 153, while the circuit unit 111 is formed of the circuit case 115, a circuit board 157, and an aluminum covering member 116 serving also as a shielding plate.

To form the GPS unit 11 by using the members mentioned above, the rotary unit 160 shown in FIG. 16 is fixed in the main body of the antenna unit 112 by two screws as shown in FIG. 17. The rotary unit 160 has a plate 164 fixed to the antenna unit 112 and a round cap 165 fixed to the circuit unit 111. The portion between the cap 165 and the plate 164 acts as a rotary portion that rotatably couples the antenna unit 112 and the circuit unit 111. The plate 164 has two coupling portions 161 and 162 that protrude in parallel from the rotary portion overlapping the cap 165, the distal ends of the coupling portions 161 and 162 being fixed in the antenna case 153 by screws. In this state, the cap 165 of the rotary unit 160 is positioned in a round hole 169 formed in the main body of the antenna unit 112, being exposed through the hole 169. After the antenna member 152 and the rotary unit 160 are installed in the antenna case 153, the covering member 151 is fixed to the antenna cap 165 by a screw.

In the circuit unit 111, the circuit board 157 is housed in the circuit case 115, then the covering member 116 is placed thereover and secured using a screw. At this time, the hand screw 123 is placed inside the main body of the circuit unit 111, then the covering member 116 is installed onto the circuit unit 111.

Next, the circuit unit 111 is set on the antenna unit 112 so that the distal end of the protruding portion 114 of the circuit unit 111 meets the hole in the antenna unit 112. Two holes are formed in each of the circuit unit 111 and the covering member 116 so that they are aligned with the two tapped holes in the cap 165 of the rotary unit 160 positioned in the hole of the antenna unit 112; hence, two screws are inserted in these holes and secured in the tapped holes of the cap 165 to couple the circuit unit 111 and the antenna unit 112. In this state, the circuit unit 111 and the antenna unit 112 are connected via the rotary unit 160, so that switching can be made from the state wherein the antenna unit 112 is folded in the space formed between the protruding portion 114 of the circuit unit 111 and the rectangular portion 113 to the state wherein the antenna unit 112 has been unfolded by turning the antenna unit 112 by approximately 90 degrees.

Furthermore, in the antenna unit 112, the actual portions wherein the antenna unit 112 and the rotary unit are coupled are the screwed distal ends of the two coupling portions 161 and 162, while the portion wherein the rotary unit 160 and the circuit unit 111 are coupled is the cap 165, these coupling locations being away from each other. In addition, these coupling locations are connected by the coupling portions 161 and 162 functioning as leaf springs. Therefore, even after the circuit unit 111 has been fixed to the main unit housing 9, the antenna unit 112 is coupled to the circuit unit 111 with a certain level of elasticity because of the presence of the leaf springs. Hence, even if the antenna unit 112 is subjected to a load that causes a change in the position thereof while the portable information terminal 10 is in use with the GPS unit 11 attached thereto, such a positional change is absorbed by the coupling portions within the antenna unit 112. This minimizes a chance of damage to the antenna unit 112.

Furthermore, in this mode, the rotary unit 160 is equipped with a clicking mechanism that changes the magnitude of torque in the middle of turning of the antenna unit 112 from the folded position to the unfolded position thereby to indicate the position where the retraction is completed and the position immediately before reaching the position where the unfolding is completed.

Therefore, the force applied can be adjusted according to the clicking feel when turning the antenna unit 112. This prevents an undue force from being applied to the antenna unit 112, protecting the antenna unit 112 from damage. The clicking mechanism can be implemented by a spring held between the plate 164 and the cap 165 in the rotary unit 160, and a disc or the like for setting the force of the spring to a predetermined magnitude at a rotational angle position.

(Attaching the PHS unit to the portable information terminal)

FIG. 18 is a longitudinal sectional view of a bottom side surface of the portable information terminal. FIG. 19 is a perspective view of a connector cover.

Referring to FIG. 18, a communication connector 5 is disposed on the lower side surface 9d of the main unit housing 9 to allow a PHS unit 16 or the like, which is exclusively used for the apparatus equipped with the PHS feature, to be installed thereto. The communication connector 5 is formed in the main unit housing 9, an opening 90 thereof being closed by a soft-rubber connector cover 80. As shown in FIG. 19, the connector cover 80 has a flat plate 81 closing the opening of the main unit housing 9, and an anchor 82 which projects from the bottom edge of the flat plate 81 into the main unit housing 9 and which is held between a lower case 901 of the main unit housing 9 and a frame 902 in the main unit housing 9 in order to prevent coming off. The flat plate 81 of the connector cover 80 is formed to be slightly larger than the opening 90 of the main unit housing 9, so that the opening 90 is plugged by pushing the flat plate 81 into the opening 90. Thus, by pulling the flat plate 81 out of the opening 90 by placing fingers or finger nails in recesses 83 formed inwardly on both sides of the flat plate 81 of the connector cover 80, the flat plate 81 can be removed from the opening 90 to release the opening 90 as shown in FIG. 20; therefore, a connector 260 of the PHS unit 16 shown in FIG. 21 and FIG. 22 can be inserted toward the communication connector 5 inside through the opening 90. Furthermore, the PHS unit 16 can be connected to the portable information terminal 10 as shown in FIG. 23 and FIG. 24 by turning a hand screw 261 formed on the PHS unit 16 so as to lock a shank 262 of the hand screw 261 in a tapped hole formed in the lower side surface 9d of the main unit housing 9. A circuit board 85, etc. are disposed inside the main unit housing 9.

As shown in FIG. 22, a recess 265 that is slightly wider than the width of the connector cover 80 is formed in the bottom surface of the PHS unit 16. In the present mode, since the connector cover 80 is formed of a soft rubber, the connector cover 80 can be bent downward to place it in the space formed by the recess 265 of the PHS unit 16 as shown in FIG. 24 when connecting the PHS unit 16. Hence, the connector cover 80, when it has been drawn out of the opening 90, does not become obstructive, enabling the connector cover 80 to be retained in the main unit housing 9. Thus, unlike a construction wherein the connector cover 80 is removed each time, the danger of losing the connector cover 80 is eliminated. In addition, an edge of the connector cover 80 is placed under the bottom surface of the PHS unit 16; therefore, when the portable information terminal 10 is put on a desk or the like with the PHS unit 16 connected thereto, the connector cover 80 functions as a rubber foot positioned between the surface of the desk and the PHS unit 16.

(Attaching an input pen to the portable information terminal)

In the present mode, as described with reference to FIG. 1, the portable information terminal 10 is provided with the digitizing unit 7 for input, and an input pen 86 used with it is placed in an opening 87, which has an exit 88 in the right side surface 9a of the housing 9, as shown in FIG. 18. When a force is applied to the input pen 86 for pulling it out of the opening 87, the input pen 86 extends while still retained in the opening 87, then it leaves the opening 87. This enables a user to merely pull out the input pen 86 to remove it from the opening 87 to cause the input pen 86 to come out in an extended state. Thus, an extra step for extending the input pen 86 after pulling it out can be eliminated, adding to convenience.

Such a configuration can be implemented by, for example, employing the input pen 86 designed to extend or retract in two steps, and applying an elastic force for retaining the input pen 86 in the opening 87, the force being slightly larger than the force required to extend or retract the input pen 86.

(Attaching a memory card to the portable information terminal)

FIG. 25 is a sectional view taken along a line passing through the mounting slot of a flash card of the portable information terminal. As shown in FIG. 25, the mounting slot 21 in which the flash card 20 can be installed is disposed in the right side surface 9e of the main unit housing 9, the mounting slot 21 being normally closed by the side cover 91;

hence, to remove the flash card 20, the side cover 91 is opened first, then the flash card 20 is drawn out. In the present mode, however, the flash card 20 is installed or uninstalled by using a card installing/uninstalling member 95 rather than directly drawing out the flash card 20. More specifically, when the side cover 91 on the right side surface 9e of the main unit housing 9 is opened, a pinch plate 96 of the card installing/uninstalling member 95 rather than the flash card 20 is exposed as shown in FIG. 26. The pinch plate 96 is coupled to the main body of the card installing/uninstalling member 95 via a hinging mechanism and it is installed upright in the main unit housing 9 as will be described hereinafter; therefore, the pinch plate 96 is exposed upright when the side cover 91 is opened. To remove the flash card 20, first, the pinch plate 96 is set down outward as illustrated in FIG. 27, and the pinch plate 96 is pulled out. This pulls out the flash card 20 together with the pinch plate 96 as illustrated in FIG. 28. Thus, the user is able to easily remove the flash card 20 from the mounting slot 21 without struggling to force his or her fingertips into the small mounting slot 21.

To install the flash card 20, the foregoing procedure is reverse. To be more specific, when the side cover 91 is opened, the pinch plate 96 is exposed upright. The pinch plate 96 is set down outward, then the pinch plate 96 is pulled out. Next, the flash card 20 is inserted in the mounting slot 21, the pinch plate 96 is set up, then the card installing/uninstalling member 95 is pushed into the main unit housing 9. As a result, the flash card 20 is pushed, together with the card installing/uninstalling member 95, into the main unit housing 9.

The card installing/uninstalling member 95 used in the mechanism for installing and uninstalling the flash card 20 is formed of a main body portion 97 having both side edges 971 bent to match the outline of the flash card 20, the pinch plate 96, and a hinging mechanism 98 that couples the pinch plate 96 and the main body portion 97 as shown in FIG. 29. In the card installing/uninstalling member 95, the main body portion 97 has its both side edges 971 bent vertically to provide a space therein for holding the memory card 20. The main body portion 97 has a large round hole 973 to achieve lighter weight and enhanced strength.

Furthermore, as shown in FIG. 30 and FIG. 31, a board unit 94 provided in the main unit housing 9 has a card holding member 941 for receiving the flash card 20 supplied by being attached to the card installing/uninstalling member 95. At the back of the card holding member 941, a connector 942 electrically connected to the flash card 20 is disposed. Guides 944 for guiding both sides of the card installing/uninstalling member 95 pushed in the card holding member 941 are formed like rails on both sides of the card holding member 941.

Thus, in the portable information processing apparatus, the antenna unit can be attached to or detached from the portable information terminal; hence, the antenna unit can be left removed unless the portable information terminal is used for GPS, contributing to improved convenience. In addition, the antenna unit does not extend sideways beyond the portable information terminal when the antenna unit is mounted on the portable information terminal, permitting easy handling when the antenna unit has been installed to the portable information terminal.

Furthermore, configuring the antenna unit so that it may be unfolded from the rear surface of the portable information terminal by being turned permits the antenna unit to be unfolded or folded easily. Moreover, the antenna unit is folded closely against the rear surface of the portable information terminal when it is in the folded state, so that the antenna unit is not obstructive. Furthermore, in the unfolded state, the antenna unit is inclined toward the rear surface with respect to the front surface; hence, when the user tilts the portable information terminal for easier viewing of the display surface, the antenna unit will be automatically supported horizontally, providing an advantage of improved receiving sensitivity of the antenna unit. Furthermore, even when the opening is released, the connector cover is retained on the portable information terminal, eliminating the danger of losing the connector cover. In addition, when the input pen is pulled off, it extends while it is still in the opening of the portable information terminal, then it comes off the portable information terminal; therefore, the input pen can be removed from the portable information terminal in an extended state when the user pulls it, thus providing an advantage in that only one step is required.

FIG. 32 shows a GPS unit of another mode of the present invention. A GPS unit 300 is constituted by a support assembly 400 which contains a receiving circuit and corresponds to the circuit unit 111 of the GPS unit 11 of FIG. 6, and an antenna unit 500 that contains an antenna. The support assembly 400 has a pair of right and left arms 402 and 403 that extend forward from the front edge of a rectangular plate-like main body 401, the distal ends of the arms 402 and 403 being inclined toward the rear surface. The antenna unit 500 has a pair of right and left feet 502 and 503 that extend to the rear edge from a main body 501 shaped like a thin box, the distal ends of the feet 502 and 503 being inclined toward the rear surface. The antenna unit 500 is positioned between the pair of arms 402 and 403, and the distal ends of the feet 502 and 503 are rotatably attached to the distal ends of the arms 402 and 403 (the mounting structure will be discussed hereinafter). Hence, the antenna unit 500 can be turned toward the support assembly 400 so as to be folded in a cavity 404 (refer to FIG. 32) located between the pair of arms 402 and 403 as shown in FIG. 33, or it can be turned in the opposite direction to be unfolded to the front of the support assembly 400 at a predetermined angle as shown in FIG. 32.

As shown in FIG. 32, at the front edge of the main body 401 of the support assembly 400, the bottom surface of the cavity 404 is provided with a bottom plate 405 made integral with the main body 401 and the arms 402 and 403. Hence, when the antenna unit 500 is fitted in the cavity 404, the front edge of the main body 501 of the antenna unit 500 is rested on the bottom plate 405. Furthermore, a recess 504 is provided at the front end side surface of the main body 501 of the antenna unit 500. In association with this, a protuberance 407 is provided, projecting from an opening 406 at the front end side surface of the main body 401 of the support assembly 400. Thus, when the antenna unit 500 is fitted in the cavity 404 as illustrated in FIG. 33, the protuberance 407 engages with the recess 504 formed in the front end side surface of the main body 501 of the antenna unit 500 thereby to retain the antenna unit 500 in the cavity 404. Furthermore, as shown in FIG. 32, in the front end side surface of the main body 401 of the support assembly 400, a control section 408 of a power switch is led out of an opening 421. Therefore, when the antenna unit 500 is placed in the cavity 404, the control section 408 is pushed by the front edge of the main body 501 of the antenna unit 500. As a result, the power switch is turned OFF, thereby cutting off the supply of power to a receiving circuit, not shown, in the support assembly 400. On the other hand, when the antenna unit 500 is turned toward the front of the support assembly 400 to set it in a serviceable mode, the control section 408 that has been pushed by the front edge of the main body 501 of the antenna unit 500 is released, so that the power switch is turned ON, starting the supply of power to the receiving circuit.

As shown in FIG. 32, the distal ends of the pair of arms 402 and 403 are mutually connected by a coupling plate 409 at the bottom surface of the cavity 404. This will control the wide spacing between the pair of right and left arms 402 and 403 by the coupling plate 409, allowing the antenna unit 500 to be securely retained between the pair of right and left arms 402 and 403. As illustrated in FIG. 34, the support assembly 400 is formed of a front case 410 and a rear cover 411, and the coupling plate 409 is formed on the rear cover 411. Furthermore, a shielding plate 412 is mounted on the inner surface of the rear cover 411.

As shown in FIG. 35, an L-shaped lever 414 that is slidable in the longitudinal direction of the support assembly 400 as indicated by an arrow a is provided in the support assembly 400 (in the front case 410). The L-shaped lever 414 is normally tensioned toward the front edge of the support assembly 400 by a coil spring 413 attached to one end thereof; it is coupled to an operating member rear edge of the support assembly 400 by operating the operating member 415. The protuberance 407 for retaining the antenna unit 500 in the folded state in the cavity 404 is provided integrally with the other end of the L-shaped lever 414. Hence, when the operating member 415 on the front surface of the support assembly 400 is slid to simultaneously slide the L-shaped lever 414 toward the rear end of the support assembly 400, the protuberance 407 retracts into the support assembly 400 and comes off the recess 504 of the main body 501 of the antenna unit 500, allowing the antenna unit 500 to turn toward the front of the support assembly 400. When the antenna unit 500 is placed back in the cavity 404, the elasticity at the other end of the L-shaped lever 414 in a direction of an arrow b acts on the protuberance 407, allowing the protuberance 407 to engage with the recess 504 at the front edge of the main body 501 of the antenna unit 500. More specifically, when the main body 501 of the antenna unit 500 abuts against the protuberance 407, the protuberance 407 withdraws, and when the recess 504 meets the protuberance 407, the protuberance 407 juts out to engage with the recess 504.

As shown in FIG. 36, two hooks 416 are provided on one side on the rear surface of the main body 401 of the support assembly 400. Furthermore, a hand screw 417 protrudes on the other side opposing the aforesaid one side on the rear surface of the main body 400. A large-diameter knob 418 of the hand screw 417 is partly exposed through an opening 419 in the side surface of the main body 401. Moreover, in the vicinity of the hand screw 417 on the rear surface of the main body 401, a connector 420 electrically connected to the receiving circuit in the main body 401 is protuberantly provided. Hence, as in the case of the GPS unit 11 of FIG. 6, the support assembly 400 and the antenna unit 500 can be detachably mounted in an overlapping fashion on the rear surface of a portable information terminal 350 similar to the one shown in FIG. 1 by engaging the pair of hooks 416 of the support assembly 400 in the engaging holes of the portable information terminal and by screwing the hand screw 417 into a tapped hole in the portable information terminal as shown in FIG. 37 and FIG. 38. At this time, the connector 420 is connected to a connector (not shown) of the portable information terminal 350 SO as to electrically connect the receiving circuit in the support assembly 400 to a circuit in the portable information terminal 350.

Thus, the GPS unit 300 of the present mode can be attached to the portable information terminal 350 only when the unit 300 is used, and it can be removed from the portable information terminal 350 when not used, contributing to improved convenience. In addition, when the GPS unit 300 is attached to the portable information terminal 350 on an assumption in that the antenna unit 500 has been folded between the pair of arms 402 and 403 of the support assembly 400, only the distal ends of the arms 402 and 403 and the distal ends of the feet 502 and 503 extend beyond the portable information terminal 350 as shown in FIG. 37, permitting easy handling even when the GPS unit 300 has been attached to the portable information terminal 350. Furthermore, when the antenna unit 500 is turned toward the front of the support assembly 400 to use it, the antenna unit 500 is moved to the front of the portable information terminal 350 as shown in FIG. 38 so as to place itself in a position advantageous for receiving. At this time, the antenna unit 500 is inclined approximately 20 degrees toward the rear surface with respect to the front surface of the portable information terminal 350 by a locking mechanism which will be discussed hereinafter. Hence, when the user holds the portable information terminal 350 in his or her hand and tilts a display surface 351 of the LCD unit for easier viewing, the antenna unit 500 is positioned horizontally, which is ideal for receiving radio waves (signals) from a satellite.

As shown in FIG. 39, an insertion hole 422 is formed in the inner side surface of the distal end of the one arm 402 of the support assembly 400. Furthermore, a cylindrical portion 505 is formed on the outer side surface of the distal end of the one foot 502 of the antenna unit 500. Inserting the cylindrical portion 505 in the insertion hole 422 allows the one foot 502 of the antenna unit 500 to be rotatably attached to the one arm 402 of the support assembly 400.

As shown in the drawing, an insertion hole 424 partly having a larger-diameter portion 423 is formed in the inner side surface of the distal end of the other arm 403 of the support assembly 400. Furthermore, a shaft 506 is protuberantly provided on the outer side surface of the distal end of the other foot 503 of the antenna unit 500. A cam 507 acting as a part of the locking mechanism is provided on the distal end of the shaft 506, the cam 507 being provided with a first protuberance 508 and a second protuberance 509 for locking on a part of the outer periphery thereof. Regarding the shaft 506 having the cam 507, when the antenna unit 500 has been turned to the position where it is not normally in use, the first and second protuberances 508 and 509 of the cam 507 fit in the larger-diameter portion 423 of the insertion hole 424, enabling the shaft 506 and the cam 507 to be inserted in the insertion hole 424. Thus, the other foot 503 of the antenna unit 500 is rotatably attached to the other arm 403 of the support assembly 400.

After inserting the shaft 506 having the cam 507 into the insertion hole 424, the antenna unit 500 is turned to the position, where it is normally in use, causing the shaft 506 and the cam 507 to turn simultaneously. This causes the first and second protuberances 508 and 509 of the cam 507 to come off the larger-diameter portion 423 of the insertion hole 424, and a side surface 403a of the arm 403 is clamped between the first and second protuberances 508 and 509 of the cam 507 and the side surface of the foot 503 of the antenna unit 500 as shown in FIG. 40; hence, the shaft 506 does not shift in an axial direction (in the direction of insertion in or removal from the hole 424), permitting the foot 503 and the arm 403 to be firmly installed.

As shown in FIG. 41, in the other arm 403 of the support assembly 400, an L-shaped metal elastic member 425 is fixed in the vicinity of the cam 507 inserted in the other arm 403. The elastic member 425 together with the cam 507 constitute the locking mechanism of the antenna unit 500. When the antenna unit 500 is turned toward the front of the support assembly 400 from the state wherein the antenna unit 500 was placed in the cavity 404, the first protuberance 508 of the cam 507 that is integrally turned abuts against the L-shaped distal end of the elastic member 425 immediately before the antenna unit 500 reaches a predetermined angle with respect to the support assembly 400 as illustrated in FIG. 42. However, the abutting surface of the first protuberance 508 is a gentle slope; hence, a slightly large torque applied to the antenna unit 500 causes the first protuberance 508 to overcome the distal end of the elastic member 425. Thus, the cam 507 rotates and the antenna unit 500 integrally turns. Immediately after the first protuberance 508 overcomes the distal end of the elastic member 425, the second protuberance 509 of the cam 507 abuts against the distal end of the elastic member 425 as shown in FIG. 43. The abutting surface of the second protuberance 509 is a relatively steep slope. Therefore, when the second protuberance 509 abuts against the distal end of the elastic member 425, the cam 507 no longer rotates, and the rotation in the returning direction is blocked because the first protuberance 508 providing resistance, thus fixing the antenna unit 500 integrally onto the support assembly 400 at a predetermined angle. In other words, the locking mechanism is able to hold the antenna unit 500 at the predetermined angle with respect to the support assembly 400 with a click when the first protuberance 508 of the cam 507 overcomes the distal end of the elastic member 425.

The surface of the second protuberance 509 of the cam 507 that abuts the distal end of the elastic member 425 is the steep slope; hence, if a large torque is applied to the antenna unit 500 in a direction opposite from the accommodating cavity 404, then the second protuberance 509 overcomes the distal end of the elastic member 425, allowing the cam 507 and the antenna unit 500 to turn freely as illustrated in FIG. 44. As a result, the antenna unit 500 is not subjected to an undue force, and the antenna unit 500 is therefore protected from damage. Turning the antenna unit 500 from this state back toward the accommodating cavity 404 causes the distal end of the elastic member 425 to engage with the second and first protuberances 509 and 508 of the cam 507 again as shown in FIG. 43, enabling the antenna unit 500 to be fixed at the predetermined angle in relation to the support assembly 400.

As set forth above, according to the GPS unit of FIG. 32, the GPS unit can be left uninstalled unless the GPS unit is used, contributing to improved convenience. In addition, the GPS unit hardly extends beyond the portable information terminal, permitting easy handling even when the GPS unit has been attached to the portable information terminal. Furthermore, the locking mechanism that locks with a click stably holds the antenna unit in the position most advantageous from the viewpoint of receiving characteristics so as to enable maximum performance to be displayed. Moreover, when an undue force should be applied to the antenna unit, the locking mechanism unlocks to protect the antenna unit from damage. The locking mechanism is able to restore its locking function when the antenna unit is moved back. By setting the cam of the locking mechanism in the large-diameter portion of the insertion hole, the feet of the antenna unit and the distal ends of the arms can be easily installed despite the presence of the cam of the locking mechanism. Furthermore, in normal use, the side surface of the arm is clamped between the protuberances of the cam and the side surface of the foot of the antenna unit, preventing the shaft from moving in the axial direction (in the direction of insertion in or removal from the hole), permitting firm installation. In addition, the wide spacing between the pair of right and left arms is controlled by the coupling plate to enable the antenna unit to be securely held between the pair of right and left arms.

FIG. 45 is a schematic block diagram illustrating all functional blocks of another working mode. A central processing unit (CPU) 620 for performing logical operation processing is contained in a portable information terminal. A real-time clock 621, a mask ROM 622 for storing programs, an execute memory 623 formed of a SRAM or DRAM for running programs, a flash memory 624 for storing data, an input circuit 625 connected to a control panel (or a touch panel, a mouse, or a keyboard), a serial port 626 (to which communications equipment such as a personal handy phone system (PHS) 647 shown in the drawing is connected), and an interface integrated circuit 630 formed of an ASIC are connected to the CPU 620. A battery pack 627 is contained in the portable information terminal to supply power to the internal component.

The interface integrated circuit 630 is equipped with a CCD interface circuit 631 for connecting a CCD camera 641 or the like, a PCMCIA interface circuit 632 for connecting a PCMCIA card 642, an LCD controller 633 connected to a video RAM 643 or a liquid crystal display 644 including a display panel, and a serial multiplexer 634 for selectively connecting an IrDA (infrared communication) unit 645 and a GPS connector 646 to a serial line linked to the CPU 620.

A GPS unit 650 is connected to the GPS connector 646. In the GPS unit 650, a digital signal processing circuit 651 and a receiving circuit 652 are interconnected, and the receiving circuit 652 is connected to an antenna 613.

FIG. 46 is a schematic circuit diagram showing the GPS unit 650 connected to the GPS connector 646 and a peripheral circuit thereof. In the drawing, an area on the right from the two-dot chain line indicates an internal configuration of the GPS unit 650, while an area on the left from the two-dot chain line indicates an equivalent circuit system in the GPS connector 646 and the interface integrated circuit 630 between the GPS unit and the CPU 620.

The digital signal processing circuit 651 is provided with a predetermined internal clock and a built-in CPU operated by the internal clock. The built-in CPU exchanges a variety of command signals, status signals, data signals, etc. with the CPU 620 via a serial line X. The digital signal processing circuit 651 is connected to the receiving circuit 652 to constitute a receiving device of GPS signals; it receives GPS signals transmitted from the receiving circuit 652, converts them into positioning data, and sends the converted data to the CPU 620.

Inside the GPS unit 650, an interlocking switch 653 operated in synchronization with the operation of the GPS antenna 613 is provided. Terminals of the interlocking switch 653 are closed when the GPS antenna 613 is in operation, while the terminals thereof remain open while the GPS antenna 613 is in the folded state.

Two signal lines Y and Z connected to the interlocking switch 653 are also connected to the CPU 620. The signal line Y is connected to a high-value resistor Rb connected to a power source potential Vcc formed in a power source circuit (not shown) by the power supplied from the battery pack 627, thereby pulling up a line potential thereof. The signal line Z is connected to a ground potential GND and also connected to a high-value resistor Rc connected to the power source potential Vcc as in the same manner mentioned above.

The GPS unit 650 includes a GPS power circuit 654. The GPS power circuit 654 receives the power source potential Vcc is supplied or cut off by a switching circuit to which a signal line W connected to the CPU 620 is applied. In the switching circuit, a control transistor Ta and a power transistor Tb, which are interconnected, are provided. The signal line W is connected to the gate of the control transistor Ta, the source of the control transistor Ta is connected to the ground potential GND, and the drain of the control transistor Ta is connected to the gate of the power transistor Tb via a resistor Ra. The source and the drain of the power transistor Tb are connected between the power source potential Vcc and the GPS power circuit 654. The GPS power circuit 654 supplies power to the digital signal processing circuit 651 and the receiving circuit 652.

The functions and operations of the GPS unit 650 shown in FIG. 46 will now be described. In the GPS unit 650, when the GPS antenna 613 is in the folded state, the interlocking switch 653 is open; hence, the signal line Y is maintained at a high potential in the vicinity of the power source potential Vcc, while the signal line Z is maintained at a low potential in the vicinity of the ground potential GND. The signal line Z is a signal line for detecting the GPS unit 650, and it stays at a low potential in the vicinity of the ground potential GND when the GPS unit 650 is connected as illustrated, while it is set at a high potential in the vicinity of the power source potential Vcc if the GPS unit 650 is not connected. Thus, the CPU 620 can recognize the presence of the GPS unit from the potential of the signal line Z.

When the GPS antenna 613 is turned to place it in a serviceable mode, the interlocking switch 653 closes, causing the signal line Y to be in conduction with the signal line Z and switched to a low potential. This enables the CPU 620 to recognize that the antenna 613 has been set in the serviceable mode.

Then, the CPU 620 issues a control output to the signal line W. When the signal line W is set at a high potential by the control output from the CPU 620, the control transistor Ta conducts, causing the gate signal of the power transistor Tb to lower, so that the power transistor Tb conducts, and the power source potential Vcc is supplied to the GPS power circuit 654. When the power source potential is supplied to the GPS power circuit 654, power is supplied to the digital signal processing circuit 651 and the receiving circuit 652 on the basis of the supplied power.

Referring now to FIG. 47 through FIG. 50, the functions and operations of the present entire working mode. As shown in FIG. 47, when the power switch of the main unit (the portable information terminal shown in FIG. 1 or FIG. 37) is turned ON, (step 470 the CPU 620 reads a program from the mask ROM 622 and detects whether the GPS unit 650 is connected by checking the potential of the signal line Z (step 471) If the GPS unit 650 is connected, then the CPU 620 reads a GPS application program recorded in the mask ROM 622 and registers it on an operating system (step 472), and also registers it on another general-purpose application program as necessary, adding a GPS program startup menu to each of them. If the GPS unit 650 is not detected, then the foregoing registration is not carried out, and the GPS application program is not run. However, even if the GPS unit is attached at an arbitrary point while the apparatus is in operation, it is possible to detect it and load the GPS application program.

Next, an operation menu for starting up the general-purpose application program is displayed (step 474). If an operator selects a predetermined general-purpose application program (step 474), e.g. mailing software, then the mailing software is started up (step 475). When the operator completes entering data (typing a mail, selecting a mail, etc.) (step 476) on this software, it is detected whether the GPS application program has been registered; (step 477) if it has been registered, then processing for acquiring a present location is implemented, (step 478) and a request for acquiring information regarding the present location is issued. This causes positioning data to be sent from the GPS unit 650 as it will be discussed hereinafter, (step 479) and if the information regarding the location has been obtained, the information regarding the location is transferred to the mailing software and attached to a mail selected by the operator, (step 4710) and sent by starting up the PHS 647 (step 4711). If the GPS application program has not been registered, then the PHS is directly started up to perform sending (step 4712). Furthermore, if the GPS unit is not in operation, then a choice can be made so that either a message to that effect is displayed and the GPS unit is operated, waiting until the positional information is acquired, or attaching the positional information is cancelled.

FIG. 48 and FIG. 49 illustrate the operation of the GPS unit 650 carried out in parallel with the execution of the general-purpose application program by the foregoing CPU 620. In the GPS unit 650, merely turning the power switch of the main body ON does not supply power to the GPS power circuit 654 shown in FIG. 46, so that the unit is not actuated. When the power switch of the main body is ON and if the GPS antenna 613 is turned to be set in the serviceable mode (step 481), then the interlocking switch 653 closes, and the signal line Y is set at a low potential, causing an interrupt signal to be sent to the CPU 620 (step 482), so that the GPS application program is run by interrupt processing.

In the interrupt processing, the GPS application program first sets the potential of the signal line W at a high potential to supply power to the GPS power circuit 654 so as to render the GPS unit 650 serviceable (step 483). In parallel with this, the CPU 620 starts up a GPS utility program (step 484) to read initial data recorded in the flash memory 624 (step 485). The initial data includes the time when the previous measurement of a location was made, information on the location, an orbital history in relation to an artificial satellite, a satellite history, etc. The CPU 620 sends out an instruction for capturing GPS signals to the digital signal processing circuit 651, and transmits the initial data in an appropriate format to the digital signal processing circuit 651 via the serial line X.

Upon reception of the initial data, the digital signal processing circuit 651, which has received the instruction for capturing GPS signals (step 486), refers to the initial data and starts capturing GPS signals. More specifically, the digital signal processing circuit 651 captures GPS signals by using the previous positional information, the orbital history, the satellite history, etc. When one GPS signal is detected as a result, another GPS signal is detected (step 487). If three or four GPS signals are captured at the end (step 488), then positioning data is determined based on the GPS signals and the obtained positioning data is sent to the CPU 620 via the serial line X (step 489). The CPU 620 stores the positional information, which has been acquired based on the positioning data, in the flash memory 624 as initial data. The positional information is transferred to the mailing software (step 4813) when a request for the positional information is issued by the general-purpose application program (mailing software) as illustrated in FIG. 47(step 4810).

When the GPS antenna 613 is turned, the GPS application program is normally actuated simultaneously in parallel with (or at the background) other application program. Or, the CPU returns to the original application program immediately after issuing the instruction to the digital signal processing circuit 651. Hence, the user will merely see the display indicating that the GPS has been started up, and will be able to continue operating other application program almost without the need for interrupting various types of work.

The flowchart of FIG. 48 shows the interrupt processing by the CPU 620 and the positioning by the digital signal processing circuit 651 of the GPS unit 650. In this case, the load of the processing shared by the CPU 620 and the GPS unit 650 (the digital signal processing circuit 651 thereof) is not limited to the case set forth above; the load sharing may be appropriately designed, considering the processing load involved in the interrupt processing of the CPU 620 and the functional setting of the GPS unit 650. For instance, the functionality of the GPS unit 650 may be limited to the function for acquiring GPS signals and the function for transferring the GPS signals to the main unit, leaving acquisition of positioning data to the CPU 620, or the entire processing shown in FIG. 48 may be controlled by the interrupt processing of the CPU 620.

FIG. 49 shows a processing portion related to the management of a power source when the positioning data is obtained by the digital signal processing circuit 651 shown in FIG. 48. Characters A through F of FIG. 48 correspond to characters A through F of FIG. 49. Referring to FIG. 48, in a case (character B) where the detection of GPS signals is not performed for a predetermined time (1 millisecond to a few tens of seconds), it is determined that positioning cannot be performed, and a signal indicating occurrence of the event wherein the positioning cannot be performed is sent out from the digital signal processing circuit to the CPU 620 (step 491). Upon reception of this signal, the CPU 620 checks how many times the event has taken place (the total concerning the present positioning) (step 492).

If the number of times the event has occurred is a predetermined value or less, then an error message is displayed on the display panel for a predetermined time (e.g. a few seconds) (step 493). After that, the operating state of a timer in the CPU 620 is checked; (step 494) if the timer is operating, then no additional processing is implemented, or if the timer is not operating, then the timer is actuated (step 495). Returning to FIG. 48 (character A), the instruction for capturing GPS signals is sent out again to the digital signal processing circuit 651.

If the timer reaches a preset time after the error message is displayed, then the CPU 620 shifts the mode (step 496) of the digital signal processing circuit 651 to a power saving mode. The power saving mode is a mode for minimizing the power consumed by the digital signal processing circuit 651 and the receiving circuit 652. In the power saving mode, such processing as stopping the internal clock of the digital signal processing circuit 651, slowing the internal clock, or stopping the supply of power to an amplifier circuit in the receiving circuit 652 is implemented. The instant the operation is shifted to the power saving mode, the CPU 620 resets the timer.

Following the shift to the power saving mode, the CPU checks the operating state of the timer; (step 497) if the timer is in the reset state and not operating, then the CPU actuates the timer (step 498), or if the timer is already operating, then the CPU maintains the power saving mode as it is and waits until the timer reaches a preset time. Meanwhile, if the operator resets the GPS antenna 613 (if the GPS antenna is reset in the folded position, then placed back in the service-able mode again) (step 499), the CPU returns to the capturing operation again as in the case denoted by character A. When the timer reaches the preset time, the CPU 620 displays a message indicating that the GPS unit will be stopped on the display panel for a predetermined time, (step 4911) and stops the supply of power to the GPS power circuit 654 (step 4910). As an alternative method, for instance, if the number of times the event has occurred does not exceed the predetermined value, the timer is started and the foregoing power saving mode is maintained until a time set on the timer is up, then the program returns to the capturing operation again as in the case indicated by character A after the time is up.

When the foregoing event wherein the positioning cannot be carried out occurs, if the number of times the event has occurred exceeds the predetermined value, then the CPU 620 displays a message indicating that the GPS unit will be stopped on the display panel for a predetermined time, and stops the supply of power to the GPS power circuit 654.

Next, as shown in FIG. 48, if three or four types of GPS signals cannot be captured (character D), then the processing for power source management is carried out with respect to the event, in which positioning cannot be performed, as in the case of processing in the area enclosed by the dotted line that is implemented for the case denoted by mark B as shown in FIG. 49. If the event has already occurred for a number of times exceeding the predetermined value concerning the event, in which positioning cannot be carried out, then a message indicating that the GPS unit 650 will be stopped will be displayed, and the supply of power to the GPS power circuit 654 is stopped. If the number of times the event has occurred is the predetermined number or less, then the timer is actuated to try the capturing operation again as described above, or the mode is shifted to the power saving mode.

Referring to FIG. 48, if it is determined by the timer that a request for positional information has not been received from the general-purpose application program for a predetermined time even when the positioning data has been acquired, then almost the same processing as that given in the area enclosed by the dotted line of character B shown in FIG. 49 will be implemented as described above. In this case, however, the event in which the positioning is impossible does not occur; instead, the program moves to the processing that is carried out when a time set on the timer is up and no request for positional information is issued for a predetermined time. Furthermore, in this case, since three or four GPS signals have been captured, no recapturing is performed; instead, the processing for acquiring positioning data is carried out again, the operation is switched to the power saving mode, or the supply of power to the GPS power circuit 654 is stopped as described above. In these cases, when stopping the supply of power at the end, the positional information based on the positioning data obtained last is stored as initial data in the flash memory 624.

In the present working mode, the descriptions have been given of the method wherein the GPS antenna is unfolded or folded for a restart after the supply of power to the GPS power circuit is stopped; however, there is another method as set forth below. For instance, the power of the GPS power circuit is turned ON at the moment the power of the main unit to which the GPS unit is connected is turned ON, then the power saving mode is immediately set. When the GPS antenna is turned, an interrupt is generated, and the power saving mode is cleared, causing the GPS unit to begin operation. Alternatively, a means may be provided so that, when the GPS antenna has been turned and set in the position where GPS signal can be received, a restart icon is brought on the display panel, and the restart icon is pressed to start the power supply for GPS or to clear the power saving mode.

FIG. 50 shows an example of the display contents of an independent GPS display section 611B on the display panel that are shown in parallel with the processing operation concerning the GPS unit 650 to display the positioning data acquiring situation of the GPS unit 650. If the supply of power to the GPS power circuit 654 has been cut off or the operation is in the power saving mode even when the GPS unit 650 has been attached, then an antenna-shaped GPS unit mark is faintly displayed in the GPS display section 611B as shown in FIG. 1. If power is being supplied to the GPS power circuit 654 and the GPS unit 650 is ready for operation as it is, then a mark of the GPS unit 650 is sharply displayed as shown in FIG. 50(a). Furthermore, if the GPS unit 650 is capturing GPS signals, then a mark of a satellite is displayed next to the mark of the GPS unit 650 as shown in FIG. 50(b). If the GPS unit 650 has captured three to four GPS signals, enabling acquisition of positioning data, then "OK" will be displayed in place of the satellite mark as illustrated in FIG. 50(c).

In the working mode set forth above, when the operator turns the GPS antenna 613, the GPS application program is executed, power is supplied to the GPS power circuit 654, GPS signals are captured by the GPS unit 650, and positioning data is obtained based on the GPS signals in this order. Meanwhile, the operator can see the display in the GPS display section 611B that changes in sequence as shown in FIGS. 50(a) to (c). Hence, unless the operator turns the GPS antenna 613, no power is supplied to the GPS unit 650, so that the GPS unit 650 is not actuated no matter how other application program is used, thus contributing a prolonged service life of the internal battery pack 27.

Furthermore, the GPS antenna 613 is separate from the operating members on the control panel of the main body and can be operated independently of the operating state of the main unit. Accordingly, the GPS unit 650 can be actuated by turning the GPS antenna 613 whenever necessary, irrelevantly of the operating state of the CPU 620 of the main unit. This provides an advantage in that the operator can turn the GPS antenna 613 at an appropriate timing beforehand to prepare for immediate use when it actually becomes necessary to acquire positioning data or positional information.

Moreover, if GPS signals cannot be obtained (e.g. at a location where no signals can be received) or the positioning data is not required (e.g. when no positioning data or positional information is requested) after the GPS unit 650 has been actuated by turning the GPS antenna 613, then the operation or an attempt can be carried out again as necessary to try capturing GPS signals to thereby enhance the possibility of positioning. In addition, if the attempt of capture fails, or if positional information is not requested, then wasteful power consumption can be suppressed by implementing such processing as setting the operation to the power saving mode or cutting off the power supplied to the GPS power circuit.

What is claimed is:

1. A portable information processing apparatus comprising:

a portable information terminal including a display surface on a front surface side thereof;

an antenna unit to receive a signal transmitted from a GPS satellite; and an attaching/detaching mechanism to attach said antenna unit to or detach said antenna unit from said portable information terminal while maintaining a projection area from the front side of said display surface;

wherein said antenna unit includes a rotating center axis (L) to switch between a folded state wherein said antenna unit has been folded closely against a rear surface of said portable information terminal and an unfolded state wherein said antenna unit has been turned and pulled out from the folded state toward an outer periphery side of said portable information terminal so that said antenna unit is inclined toward the rear surface side with respect to said display surface of said portable information terminal; and wherein said rotating center axis (L) has an axial direction substantially perpendicular to said display surface.

2. The portable information processing apparatus according to claim 1, wherein said antenna unit is folded closely against the rear surface of said portable information terminal, being oriented widthwise, in the folded state as observed from a rotating center position where said antenna unit turns between the folded state and the unfolded state, whereas said antenna unit projects from a distal end side of said portable information terminal when said antenna unit turns substantially 90 degrees to switch from the folded state to the unfolded state.

3. The portable information processing apparatus according to claim 2, wherein said rotating center axis (L) is inclined at substantially 45 degrees as observed from a direction for bisecting an angle range of switching between the folded state and the unfolded state so that said antenna unit remains at the same height widthwise whether said antenna unit is in the folded state or the unfolded state.

4. The portable information processing apparatus according to claim 1, wherein a turning portion of said antenna unit comprises a clicking mechanism that switches magnitude of turning torque between the folded state and the unfolded state so as to indicate completion of folding and a position immediately before reaching completion of unfolding.

5. A portable information processing apparatus comprising:

a portable information terminal including a display surface on a front surface side thereof;

an antenna unit supported by said portable information terminal such that said antenna unit extends from said portable information terminal toward an outer periphery thereof to receive a signal transmitted from a GPS satellite, the extending movement of said antenna defining a plane of motion; and a spring disposed between said antenna unit and said portable information terminal to permit given play in a direction intercepting said plane of motion.

6. The portable information processing apparatus of claim 5, wherein said spring is a leaf spring.

\* \* \* \* \*